US012795169B2

(12) United States Patent
Pfaff et al.

(10) Patent No.: US 12,795,169 B2
(45) Date of Patent: Nov. 10, 2026

(54) TRUSTWORTHINESS OF A VIDEO DATA STREAM

(71) Applicant: Fraunhofer-Gesellschaft zur Foerderung der angewandten Forschung e.V., Munich (DE)

(72) Inventors: Jonathan Pfaff, Berlin (DE); Tobias Hinz, Berlin (DE); Karsten Sühring, Berlin (DE); Heiko Schwarz, Berlin (DE); Karsten Grüneberg, Berlin (DE); Robert Skupin, Berlin (DE); Yago Sánchez De La Fuente, Berlin (DE); Cornelius Hellge, Berlin (DE); Thomas Schierl, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 19/258,560

(22) Filed: Jul. 2, 2025

(65) Prior Publication Data

US 2026/0012358 A1 Jan. 8, 2026

(30) Foreign Application Priority Data

Jul. 5, 2024 (EP) .................................... 24186914

(51) Int. Cl.
*H04N 19/70* (2014.01)
*H04L 9/08* (2006.01)
(Continued)

(52) U.S. Cl.
CPC ........... *H04N 19/70* (2014.11); *H04L 9/0825* (2013.01); *H04L 9/3236* (2013.01);
(Continued)

(58) Field of Classification Search
CPC ..... H04L 63/12; H04L 9/0825; H04L 9/3236; H04L 9/3247; H04L 9/3263; H04N 19/70;
(Continued)

(56) References Cited

U.S. PATENT DOCUMENTS 7,434,052 B1 10/2008 Rump et al.
8,185,742 B2 5/2012 Kim et al.
(Continued)

FOREIGN PATENT DOCUMENTS

CN 108551582 A 9/2018
CN 111385102 A 7/2020
(Continued)

OTHER PUBLICATIONS

Marpe, D. et al., "Context-Based Adaptive Binary Arithmetic Coding in the H.264/AVC Video Compression 1 Standard", IEEE Transactions on Circuits and Systems for Video Technology, vol. 13, No. 7, Jul. 2003 (17 pages).
(Continued)

*Primary Examiner* — Matthew T Henning
(74) *Attorney, Agent, or Firm* — Ashurst Perkins Coie US LLP; Michael A. Glenn

(57) ABSTRACT

In. a first aspect of a trustworthiness check of a video data stream, a unique identifier which identifies a media asset to which a portion of a video data stream to be checked on trustworthiness belongs, is included into the trustworthiness check. According to a second aspect, a certificate of a content provider for performing the trustworthiness check is retrieved from a track of editors stored at an external resource. A third aspect provides a method for identifying a portion of a video data stream to be checked on trustworthiness using a digital signature. According to a fourth
(Continued)

aspect, a digital signature for checking a portion of a video data stream is retrieved from an external resource.

10 Claims, 15 Drawing Sheets

(51) Int. Cl.

| | |
|---|---|
| ***H04L 9/32*** | (2006.01) |
| ***H04N 19/129*** | (2014.01) |
| ***H04N 19/13*** | (2014.01) |
| ***H04N 19/176*** | (2014.01) |
| ***H04N 19/18*** | (2014.01) |
| ***H04N 19/46*** | (2014.01) |
| ***H04N 19/50*** | (2014.01) |
| ***H04N 19/60*** | (2014.01) |

(52) U.S. Cl.
CPC .......... *H04L 9/3247* (2013.01); *H04L 9/3263* (2013.01); *H04N 19/129* (2014.11); *H04N 19/13* (2014.11); *H04N 19/176* (2014.11); *H04N 19/18* (2014.11); *H04N 19/46* (2014.11); *H04N 19/50* (2014.11); *H04N 19/60* (2014.11)

(58) Field of Classification Search
CPC .... H04N 19/13; H04N 19/129; H04N 19/176; H04N 19/18; H04N 19/46; H04N 19/50; H04N 19/60
See application file for complete search history.

(56) References Cited

U.S. PATENT DOCUMENTS

| | | | | |
|---|---|---|---|---|
| 9,647,846 | B1 | 5/2017 | Schulman | |
| 11,449,584 | B1 | 9/2022 | Pamucci | |
| 11,770,260 | B1 | 9/2023 | Pamucci | |
| 12,445,307 | B1 | 10/2025 | Suter et al. | |
| 2002/0157002 | A1 | 10/2002 | Messerges et al. | |
| 2004/0091111 | A1 | 5/2004 | Levy et al. | |
| 2008/0037783 | A1 | 2/2008 | Kim et al. | |
| 2008/0249961 | A1 | 10/2008 | Harkness et al. | |
| 2009/0070590 | A1 | 3/2009 | Hoffstein et al. | |
| 2013/0051475 | A1 | 2/2013 | Joshi et al. | |
| 2013/0064370 | A1 | 3/2013 | Gouge et al. | |
| 2015/0163545 | A1 | 6/2015 | Freed et al. | |
| 2016/0080742 | A1* | 3/2016 | Kirchhoffer | H04N 19/18 |
| 2017/0078199 | A1 | 3/2017 | Mosko et al. | |
| 2019/0322426 | A1 | 10/2019 | Verma et al. | |
| 2020/0267403 | A1 | 8/2020 | Lasserre et al. | |
| 2020/0267521 | A1 | 8/2020 | Bruner | |
| 2020/0372184 | A1 | 11/2020 | Meirosu | |
| 2021/0266600 | A1 | 8/2021 | Seregin et al. | |
| 2021/0329003 | A1 | 10/2021 | Segal et al. | |
| 2022/0051690 | A1 | 2/2022 | Davis et al. | |
| 2022/0368534 | A1 | 11/2022 | Lundberg et al. | |
| 2023/0020655 | A1 | 1/2023 | Xu et al. | |
| 2023/0325473 | A1 | 10/2023 | Buffard et al. | |
| 2023/0370683 | A1 | 11/2023 | Panchagnula | |
| 2024/0048394 | A1 | 2/2024 | Bjorn et al. | |
| 2024/0205002 | A1 | 6/2024 | Storelli et al. | |
| 2024/0338486 | A1 | 10/2024 | Kalva et al. | |
| 2025/0106038 | A1 | 3/2025 | Wachtendorf et al. | |
| 2025/0254403 | A1 | 8/2025 | Hannuksela et al. | |
| 2025/0330576 | A1 | 10/2025 | Huo et al. | |
| 2026/0012358 | A1 | 1/2026 | Pfaff et al. | |
| 2026/0012359 | A1 | 1/2026 | Pfaff et al. | |
| 2026/0012648 | A1 | 1/2026 | Pfaff et al. | |

FOREIGN PATENT DOCUMENTS

| | | | |
|---|---|---|---|
| CN | 111917558 | A | 11/2020 |
| EP | 0963637 | B1 | 7/2007 |
| RU | 2260918 | C2 | 9/2005 |
| WO | 9303562 | A1 | 2/1993 |
| WO | 2020197547 | A1 | 10/2020 |

OTHER PUBLICATIONS

Anonymous, "Context-adaptive variable-length coding—Wikipedia", Jan. 23, 2024 (Jan. 23, 2024), XP093280326, 3 pages.
England, et al., "AMP: Authentication of Media via Provenance", arxiv.org, Cornell University Library, 201 Olin Library Cornell University Ithaca, NY 14853, Jun. 20, 2020 (Jun. 20, 2020), XP081681975, 21 pages.
Mokhtarian, et al., "End-to-end secure delivery of scalable video streams", Proceedings of the 18th International Workshop on Network and Operating Systems Support for Digital Audio and Video, NOSSDAV '09, ACM Press, New York, New York, USA, Jun. 3, 2009 (Jun. 3, 2009), pp. 79-84, XP058175356.
Xu, et al., "AHG9: Digital signature SEI message", 20. JVET Meeting; Oct. 7, 2020-Oct. 16, 2020; Teleconference; (The Joint Video Exploration Team of ISO/IEC JTC1/SC29/WG11 and ITU-T SG. 16), No. JVET-T0090, Oct. 1, 2020 (Oct. 1, 2020), XP030289905, XP030289905; retrieved from the Internet: URL:http://phenix.int-evry.fr/jvet/doc_end_user/documents/20_Teleconference/wg11/JVET-T0090-v1.zip JVET-T0090.docx, [retrieved on Oct. 1, 2020] (5 pages).

* cited by examiner

TRUSTWORTHINESS OF A VIDEO DATA STREAM

CROSS-REFERENCE TO RELATED APPLICATION

This application claims priority from European Application No. 24186914.8, which was filed on Jul. 5, 2025, and is incorporated herein by reference in its entirety.

TECHNICAL FIELD

Embodiments of the invention relate to an apparatus for checking a video data stream on trustworthiness, an apparatus for rendering a video data stream having a video encoded thereinto checkable on trustworthiness, a video decoder, a video encoder, a method for checking a video data stream on trustworthiness, a method for rendering a video data stream having a video encoded thereinto checkable on trustworthiness, a method for decoding a video, a method for encoding, a video, and/or a video data stream.

BACKGROUND OF THE INVENTION

Content Authentication is crucial to avoid media tampering. Rapid AI advancements have sparked the creation of sophisticated deepfakes, blurring the lines between real and fake content and raising significant cybersecurity and copyright concerns. Therefore, being able to verify the authenticity of the media is becoming crucial nowadays.

Examples of methods to carry out such authentication comprise, or consist in, providing digital signatures for the media by first hashing a media asset and then signing it with the private key of the content generator so that at the client side, given a public key of the content generator, the client can compare the provided signature with the value of a hash computed based on the received media asset by itself. Should the values coincide, the client can safely assume that the media has not been tampered.

Existing concepts for trustworthiness checks of video data streams still leave room for improvement, for example, in terms of their adaptability to application scenarios, e.g., their usability in streaming scenarios, as well as in terms of their compatibility with the structure of video data streams.

It is an objective of embodiments of the present invention to provide a concept for a trustworthiness check of video data streams, which provides an improved trade-off between a low bitrate in the video data stream required for providing the checkability of trustworthiness, a high degree of adaptability to video codex, and a high compatibility to a large number of application scenarios such as streaming scenarios, for example, in allowing the extraction of substreams of the video data stream.

SUMMARY

Embodiments of a first aspect of the invention rely on the idea to perform a trustworthiness check of a portion of a video data stream by including a unique identifier into the trustworthiness check, the unique identifier uniquely identifying a media asset to which the portion to be checked belongs. In particular, the trustworthiness check may be performed by subjecting the portion to a hash function to obtain a hash value and checking whether a combination of values and the unique identifier fit to a digital signature for checking the portion of the video data stream. In other words, the digital signature may be used for verifying the combination of the portion and the unique identifier. To this end, for example, the digital signature may be obtained by jointly signing a combination of the hash value derived by hashing the portion and the unique identifier. When using a similar approach for other components of the media asset, such as audio or subtitles, a client may verify the combination of media components which the client processes.

Embodiments according to the first aspect of the invention provide an apparatus for checking a video data stream, having a video encoded thereinto, on trustworthiness. The apparatus is configured for: subjecting a predetermined portion of the video data stream, or data derived therefrom, to a hash function to obtain a hash value; obtaining a unique identifier (e.g., from the video data stream or from a reference, e.g., using a URI), which uniquely identifies a media asset to which the predetermined portion belongs; obtaining a digital signature based on the video data stream (e.g., from the video data stream, e.g., twcv_signature, or from a metadata file or manifest file, e.g., a C2PA file); and checking whether a combination of the hash value and the unique identifier (e.g., a combination of multiple pieces of information comprising the hash value and the unique identifier) fits to the digital signature to determine whether the video data stream is trustworthy.

Further embodiments according to the first aspect of the invention provide an apparatus for decoding a video data stream, having a video encoded thereinto. The apparatus is configured for: decoding a syntax structure from the video data stream, which comprises information for checking the video data stream for trustworthiness based on a predetermined portion of the video data stream, which predetermined portion is to be subjected to a hash function, or is to be used to derive data to be subjected to a hash function, for deriving a hash value to serve for checking the trustworthiness of the video data stream, decoding a unique identifier, or a reference which points to a unique identifier, from the video data stream, the unique identifier uniquely identifying a media asset to which the predetermined portion belongs; decoding an indication of a digital signature from the video data stream (e.g., from the video data stream, e.g., twcv_signature, or from a metadata file or manifest file, e.g., a C2PA file), the digital signature being based on a combination of the hash value and the unique identifier (e.g., a combination of multiple pieces of information comprising the hash value and the unique identifier).

Further embodiments according to the first aspect of the invention provide an apparatus for rendering a video data stream having a video encoded thereinto checkable on trustworthiness. The apparatus is configured for: subjecting a predetermined portion of the video data stream, or of data from which the video data stream is derived, to a hash function to obtain a hash value; assigning a unique identifier to the predetermined portion, which uniquely identifies a media asset to which the predetermined portion belongs; signing a combination of the hash value and the unique identifier (e.g., a combination of multiple pieces of information comprising the hash value and the unique identifier) to obtain a digital signature.

Method for checking a video data stream, having a video encoded thereinto, on trustworthiness, wherein the method comprises: subjecting a predetermined portion of the video data stream, or data derived therefrom, to a hash function to obtain a hash value; obtaining a unique identifier (e.g., from the video data stream or from a reference, e.g., using a URI), which uniquely identifies a media asset to which the predetermined portion belongs; obtaining a digital signature based on the video data stream (e.g., from the video data stream, e.g., twcv_signature, or from a metadata file or manifest file, e.g., a C2PA file); and checking whether a combination of the hash value and the unique identifier (e.g., a combination of multiple pieces of information comprising the hash value and the unique identifier) fits to the digital signature to determine whether the video data stream is trustworthy.

Method for decoding a video data stream, having a video encoded thereinto, wherein the method comprises: decoding a syntax structure from the video data stream, which comprises information for checking the video data stream for trustworthiness based on a predetermined portion of the video data stream, which predetermined portion is to be subjected to a hash function, or is to be used to derive data to be subjected to a hash function, for deriving a hash value to serve for checking the trustworthiness of the video data stream, decoding a unique identifier, or a reference which points to a unique identifier, from the video data stream, the unique identifier uniquely identifying a media asset to which the predetermined portion belongs; decoding an indication of a digital signature from the video data stream (e.g., from the video data stream, e.g., twcv_signature, or from a metadata file or manifest file, e.g., a C2PA file), the digital signature being based on a combination of the hash value and the unique identifier (e.g., a combination of multiple pieces of information comprising the hash value and the unique identifier).

Method for rendering a video data stream having a video encoded thereinto checkable on trustworthiness, wherein the method comprises: subjecting a predetermined portion of the video data stream, or of data from which the video data stream is derived, to a hash function to obtain a hash value; assigning a unique identifier to the predetermined portion, which uniquely identifies a media asset to which the predetermined portion belongs; signing a combination of the hash value and the unique identifier (e.g., a combination of multiple pieces of information comprising the hash value and the unique identifier) to obtain a digital signature.

Embodiments according to a second aspect of the invention rely on the idea to provide a concept that allows changes of a video data stream while maintaining the checkability of trustworthiness. To this end, embodiments of the second aspect of the invention the video data stream to be checked on trustworthiness may comprise an indication of an external resource, which holds a track of editors of the video data stream. For checking the trustworthiness of the video data stream, an entity may query the track of editors on the external resource for a certificate of a content provider that is the last editor, e.g., the most recent editor, of the video data stream and derive, from the external resource, a key of this last editor, which can be used for performing the trustworthiness check of the video data stream. For example, the track of editors comprises a track of all editors, which contributed to the video data stream, e.g., from an editor that generated the video data stream in the first place to any editors that performed changes on the video data stream. Thus, the track of editors may provide a seamless track of changes, in which each of the editors is verifiable, e.g., by a respective certificate of guarantee of the respective editor. This concept allows, for example, a trustworthy transcoder to extract a portion of the video data stream, e.g., by selecting one or more substreams out of a video data stream. For example, a video data stream may comprise a plurality of substreams, each of which may represent the video and at a certain resolution and/or a certain frame rate. Further parameters of data stream scalability may be the extraction of some pictures, or, in case of multi-view data streams, the extraction of certain views. A transcoder may extract a substream from a video data stream, e.g., on behalf of a client requesting the video data stream at a certain bitrate. A trustworthy transcoder may check any incoming video data stream or trustworthiness, extract the required portion of the video data stream, and render the extracted video data stream checkable on trustworthiness. The trustworthy transcoder may then end its certificate to the track of changes of the video data stream, so that a receiver of the extracted video data stream may verify the extracted video data stream using the certificate of the trustworthy transcoder.

Embodiments according to the second aspect of the invention provide an apparatus for checking a video data stream having a video encoded thereinto on trustworthiness. The apparatus is configured for: subjecting a predetermined portion of the video data stream, or data derived therefrom, to a hash function to obtain a hash value; checking whether the hash value fits to a digital signature (e.g., derived from the video data stream of derived from a reference indicated in the video data stream) to determine whether the video data stream is trustworthy, by decrypting the digital signature using a public key of an asymmetric decryption scheme to obtain a check value, and by checking whether the hash value matches the check value; wherein the apparatus is configured for checking whether the video data stream comprises an indication of an external resource (e.g., a metadata structure, e.g., a manifest file, at an external resource) comprising a track of editors (e.g., a track or record of editions or amendments performed from generation to the current version of the video data stream and/or the corresponding editor's identities) of the video data stream, and if the video data stream comprises an indication of an external resource comprising a track of editors of the video data stream, querying (or looking up) the track of editors for a certificate of a content provider being the last editor of the video data stream and deriving the public key based on the certificate of the content provider.

Further embodiments according to the second aspect of the invention provide an apparatus for transcoding a video data stream having a video encoded thereinto. The apparatus is configured for: receiving an input video data stream and checking the input video data stream on trustworthiness; transcoding the input video data stream to derive an output data stream; subjecting a predetermined portion of the output video data stream, or data from which the output data stream is derived, to a hash function to obtain a hash value; signing the hash value using a private key of an asymmetric encryption scheme to obtain a digital signature; providing, in a track of editors (e.g., a track or record of editions or amendments performed from generation to the current version of the video data stream and/or the corresponding editor's identities) of the output video data stream, the track of editors being provided on an external resource (e.g., a metadata structure, e.g., a manifest file, at an external resource), a certificate of a content provider (e.g., identifying the apparatus), the certificate comprising, or pointing to, a public key for the asymmetric encryption scheme; providing the digital signature in the output video data stream (e.g., in an SEI message) or to the external resource (e.g., inserting the digital signature in the metadata structure or a further metadata structure and provide same on the external resource) or a further external resource.

Further embodiments according to the second aspect of the invention provide an apparatus for rendering a video data stream having a video encoded thereinto checkable on trustworthiness. The apparatus is configured for: subjecting a predetermined portion of the video data stream, or of data from which the video data stream is derived, to a hash function to obtain a hash value; signing the hash value using a private key of an asymmetric encryption scheme to obtain a digital signature; providing, in a track of editors (e.g., a track or record of editions or amendments performed from generation to the current version of the video data stream and/or the corresponding editor's identities) of the video data stream, the track of editors being provided on an external resource (e.g., a metadata structure, e.g., a manifest file, at an external resource), a certificate of a content provider (e.g., identifying the apparatus), the certificate comprising, or pointing to, a public key for the asymmetric encryption scheme; providing the digital signature in the video data stream (e.g., in an SEI message) or to the external resource (e.g., inserting the digital signature in the metadata structure or a further metadata structure and provide same on the external resource) or a further external resource.

Method for checking a video data stream having a video encoded thereinto on trustworthiness, wherein the method comprises: subjecting a predetermined portion of the video data stream, or data derived therefrom, to a hash function to obtain a hash value; checking whether the hash value fits to a digital signature (e.g., derived from the video data stream of derived from a reference indicated in the video data stream) to determine whether the video data stream is trustworthy by decrypting the digital signature using a public key of an asymmetric decryption scheme to obtain a check value; and checking whether the hash value matches the check value; wherein the method comprises checking whether the video data stream comprises an indication of an external resource (e.g., a metadata structure, e.g., a manifest file, at an external resource) comprising a track of editors (e.g., a track or record of editions or amendments performed from generation to the current version of the video data stream and/or the corresponding editor's identities) of the video data stream, and if the video data stream comprises an indication of an external resource comprising a track of editors of the video data stream, querying (or looking up) the track of editors for a certificate of a content provider being the last editor of the video data stream and deriving the public key based on the certificate of the content provider.

Method for transcoding a video data stream having a video encoded thereinto, wherein the method comprises: receiving an input video data stream and checking the input video data stream on trustworthiness; transcoding the input video data stream to derive an output data stream; subjecting a predetermined portion of the output video data stream, or data from which the output data stream is derived, to a hash function to obtain a hash value; signing the hash value using a private key of an asymmetric encryption scheme to obtain a digital signature; providing, in a track of editors (e.g., a track or record of editions or amendments performed from generation to the current version of the video data stream and/or the corresponding editor's identities) of the output video data stream, the track of editors being provided on an external resource (e.g., a metadata structure, e.g., a manifest file, at an external resource), a certificate of a content provider (e.g., identifying the apparatus), the certificate comprising, or pointing to, a public key for the asymmetric encryption scheme; providing the digital signature in the output video data stream (e.g., in an SEI message) or to the external resource (e.g., inserting the digital signature in the metadata structure or a further metadata structure and provide same on the external resource) or a further external resource.

Method for rendering a video data stream having a video encoded thereinto checkable on trustworthiness, wherein the method comprises: subjecting a predetermined portion of the video data stream, or of data from which the video data stream is derived, to a hash function to obtain a hash value; signing the hash value using a private key of an asymmetric encryption scheme to obtain a digital signature; providing, in a track of editors (e.g., a track or record of editions or amendments performed from generation to the current version of the video data stream and/or the corresponding editor's identities) of the video data stream, the track of editors being provided on an external resource (e.g., a metadata structure, e.g., a manifest file, at an external resource), a certificate of a content provider (e.g., identifying the apparatus), the certificate comprising, or pointing to, a public key for the asymmetric encryption scheme; providing the digital signature in the video data stream (e.g., in an SEI message) or to the external resource (e.g., inserting the digital signature in the metadata structure or a further metadata structure and provide same on the external resource) or a further external resource.

Embodiments according to a third aspect of the invention provide concepts for determining a portion of a video data stream to be checked on trustworthiness, to which portion a digital signature for performing the trustworthiness check refers, which provides an improved tradeoff between a bitrate required for signaling an indication, which identifies the portion within the video data stream, and a high degree of adaptability of the concept to the structure of the video data stream.

Embodiments according to a first type of the third aspect of the invention rely on the idea that the identification of the portion of the video data stream, to which the digital signature for performing the trustworthiness check refers, is performed based on one or more syntax elements, which define a structure of the video data stream, in particular, based on one or more of a temporal layer identifier, one or more layer identifiers, a combination of the temporal layer identifier and the layer identifier, a time frame identifier, a priority level identifier and a nal_ref_id of AVC.

Exploiting syntax elements, which define a structure of the video data stream by assigning units of the video data stream, such as pictures, to specific subportions of the video data stream, such as temporal layers, layers, time frames, or priority levels, allows for an identification of the portion used for the trustworthiness check without the need of additional associations between units of the video data stream and the portion used for the trustworthiness check.

Embodiments according to the first type of the third aspect provide an apparatus for checking a video data stream having a video encoded thereinto on trustworthiness. The apparatus is configured for: subjecting a predetermined portion of the video data stream, or data derived therefrom, to a hash function to obtain a hash value; checking whether the hash value fits to a digital signature (e.g., derived from the video data stream of derived from a reference indicated in the video data stream) to determine whether the video data stream is trustworthy. The apparatus is configured for determining the predetermined portion based on one or more of: a temporal layer (e.g., temporal_id) identifier associated with a picture of the video data stream, the temporal layer identifier identifying a subset of time frames of the video data stream to which subset the respective picture belongs; one or more layer identifiers (e.g., layer_id in HEVC/VVC; dependency_id and/or quality_id in AVC) associated with a picture of the video data stream, the layer identifier identifying a layer of the video data stream, to which layer the respective picture belongs (e.g., the video data stream is a layered video data stream, e.g., comprising multiple layers, e.g. a base layer and one or more enhancement layers, representing the video in different resolutions, or representing the video from different perspectives); a combination of the temporal layer identifier and the layer identifier; a time frame identifier (e.g., the picture order count, POC); a priority level identifier (e.g., AVC priority_id) indicating a priority level of a picture; and nal_ref_id of AVC.

Further embodiments according to the first type of the third aspect provide an apparatus for rendering a video data stream having a video encoded thereinto checkable on trustworthiness. The apparatus is configured for: subjecting a predetermined portion of the video data stream, or of data from which the further portion of the video data stream is derived, to a hash function to obtain a hash value; signing the hash value to obtain a digital signature (e.g. by use of a private key of an asymmetric encryption scheme). The apparatus is configured for determining the predetermined portion based on one or more of a temporal layer (e.g., temporal_id) identifier associated with a picture of the video data stream, the temporal layer identifier identifying a subset of time frames of the video data stream to which subset the respective picture belongs; one or more layer identifiers (e.g., layer_id in HEVC/VVC; dependency_id and/or quality_id in AVC) associated with a picture of the video data stream, the layer identifier identifying a layer of the video data stream, to which layer the respective picture belongs (e.g., the video data stream is a layered video data stream, e.g., comprising multiple layers, e.g. a base layer and one or more enhancement layers, representing the video in different resolutions, or representing the video from different perspectives); a combination of the temporal layer identifier and the layer identifier; a time frame identifier (e.g., the picture order count, POC); a priority level identifier (e.g., AVC priority_id) indicating a priority level of a picture; and nal_ref_id of AVC.

Further embodiments according to the first type of the third aspect provide a method for checking a video data stream having a video encoded thereinto on trustworthiness, wherein the method comprises: subjecting a predetermined portion of the video data stream, or data derived therefrom, to a hash function to obtain a hash value; checking whether the hash value fits to a digital signature (e.g., derived from the video data stream of derived from a reference indicated in the video data stream) to determine whether the video data stream is trustworthy: The method comprises determining the predetermined portion based on one or more of: a temporal layer (e.g., temporal_id) identifier associated with a picture of the video data stream, the temporal layer identifier identifying a subset of time frames of the video data stream to which subset the respective picture belongs; one or more layer identifiers (e.g., layer_id in HEVC/VVC; dependency_id and/or quality_id in AVC) associated with a picture of the video data stream, the layer identifier identifying a layer of the video data stream, to which layer the respective picture belongs (e.g., the video data stream is a layered video data stream, e.g., comprising multiple layers, e.g. a base layer and one or more enhancement layers, representing the video in different resolutions, or representing the video from different perspectives); a combination of the temporal layer identifier and the layer identifier; a time frame identifier (e.g., the picture order count, POC); a priority level identifier (e.g., AVC priority_id) indicating a priority level of a picture; and nal_ref_id of AVC.

Further embodiments according to the first type of the third aspect provide a method for rendering a video data stream having a video encoded thereinto checkable on trustworthiness, wherein the method comprises: subjecting a predetermined portion of the video data stream, or of data from which the further portion of the video data stream is derived, to a hash function to obtain a hash value; signing the hash value to obtain a digital signature (e.g. by use of a private key of an asymmetric encryption scheme). The method comprises determining the predetermined portion based on one or more of: a temporal layer (e.g., temporal_id) identifier associated with a picture of the video data stream, the temporal layer identifier identifying a subset of time frames of the video data stream to which subset the respective picture belongs; one or more layer identifiers (e.g., layer_id in HEVC/VVC; dependency_id and/or quality_id in AVC) associated with a picture of the video data stream, the layer identifier identifying a layer of the video data stream, to which layer the respective picture belongs (e.g., the video data stream is a layered video data stream, e.g., comprising multiple layers, e.g. a base layer and one or more enhancement layers, representing the video in different resolutions, or representing the video from different perspectives); a combination of the temporal layer identifier and the layer identifier; a time frame identifier (e.g., the picture order count, POC); a priority level identifier (e.g., AVC priority_id) indicating a priority level of a picture; and nal_ref_id of AVC.

Embodiments according to a second type of the third aspect of the invention rely on the idea to provide an indication within a syntax structure of the video data stream, which indication indicates a manner of determining a portion of the video data stream, based on which the trustworthiness check is performed. By signaling the indication, a high degree of flexibility in defining the portion for the trustworthiness check is achieved. For example, the indication may distinguish between different modes of determining the portion for the trustworthiness check, which may include modes of using one or more of syntax elements defining a structure of the video data stream, such as described with respect to the first type of the third aspect of the invention, or a mode which applies dedicated indications within the video data stream, which assign units of the video data stream to the portion for the trustworthiness check. Thus, providing the indication indicating a manner of determining the portion for the trustworthiness check provides an improve tradeoff between a low bitrate for identifying the portion, e.g., as it is the case if using one or more of the syntax elements defining a structure of the video data stream, and a high flexibility defining the portion for the trustworthiness check, e.g., as it is the case for providing dedicated indications associating units of the video data stream with the portion.

Embodiments according to the second type of the third aspect of the invention provide an apparatus for checking a video data stream having a video encoded thereinto on trustworthiness. The apparatus is configured for: subjecting a predetermined portion of the video data stream, or data derived therefrom, to a hash function to obtain a hash value; checking whether the hash value fits to a digital signature (e.g., derived from the video data stream of derived from a reference indicated in the video data stream) to determine whether the video data stream is trustworthy; deriving an indication from the video data stream, which indication indicates a manner of determining the predetermined portion.

Further embodiments according to the second type of the third aspect of the invention provide an apparatus for decoding a video data stream having a video encoded thereinto. The apparatus is configured for: deriving a syntax structure from the video data stream, which comprises information for checking the video data stream for trustworthiness based on a predetermined portion of the video data stream (e.g., which predetermined portion is to be subjected to a hash function, or is to be used to derive data to be subjected to a hash function for deriving a hash value to serve for checking the trustworthiness of the video data stream). The syntax structure comprises an indication, which indicates a manner of determining the predetermined portion of the video data stream.

Further embodiments according to the second type of the third aspect of the invention provide an apparatus for rendering a video data stream having a video encoded thereinto checkable on trustworthiness. The apparatus is configured for: subjecting a predetermined portion of the video data stream, or of data from which the further portion of the video data stream is derived, to a hash function to obtain a hash value; signing the hash value to obtain a digital signature (e.g. by use of a private key of an asymmetric encryption scheme); inserting an indication into the video data stream, which indication indicates a manner of determining the predetermined portion.

Further embodiments according to the second type of the third aspect of the invention provide a method for checking a video data stream having a video encoded thereinto on trustworthiness. The method comprises: subjecting a predetermined portion of the video data stream, or data derived therefrom, to a hash function to obtain a hash value; checking whether the hash value fits to a digital signature (e.g., derived from the video data stream of derived from a reference indicated in the video data stream) to determine whether the video data stream is trustworthy; deriving an indication from the video data stream, which indication indicates a manner of determining the predetermined portion.

Further embodiments according to the second type of the third aspect of the invention provide a method for decoding a video data stream having a video encoded thereinto, wherein the method comprises: deriving a syntax structure from the video data stream, which comprises information for checking the video data stream for trustworthiness based on a predetermined portion of the video data stream (e.g., which predetermined portion is to be subjected to a hash function, or is to be used to derive data to be subjected to a hash function for deriving a hash value to serve for checking the trustworthiness of the video data stream). The syntax structure comprises an indication, which indicates a manner of determining the predetermined portion of the video data stream.

Further embodiments according to the second type of the third aspect of the invention provide a method for rendering a video data stream having a video encoded thereinto checkable on trustworthiness. The method comprises: subjecting a predetermined portion of the video data stream, or of data from which the further portion of the video data stream is derived, to a hash function to obtain a hash value; signing the hash value to obtain a digital signature (e.g. by use of a private key of an asymmetric encryption scheme); inserting an indication into the video data stream, which indication indicates a manner of determining the predetermined portion.

Embodiments according to a fourth aspect of the invention rely on the idea to store the digital signature for verifying a video data stream on an external resource, e.g., instead of signaling the digital signature within the video data stream. For example, the digital signature stored on the external resource may provide a verification of a temporal consistency of multiple portions of the video data stream. For example, the digital signature may be obtained by signing a combination of a plurality of hashes obtained from respective portions of the video data stream. For checking trustworthiness of the video data stream, a client may retrieve the digital signature from the external resource and check whether a hash value obtained from a portion of the video data stream fits to the digital signature, e.g., by comparing the hash value to a check value, the authenticity of which is guaranteed by the digital signature. For example, the check value may be part of a check value obtained by decrypting the digital signature, or may be verifiable by the digital signature.

Embodiments according to the fourth aspect of the invention provide an apparatus for checking a video data stream having a video encoded thereinto on trustworthiness. The apparatus is configured for: subjecting a predetermined portion (e.g., an access unit, e.g., video data associated with a time frame) of the video data stream, or data derived therefrom, to a hash function to obtain a hash value; deriving a digital signature associated with the predetermined portion from an external resource (e.g., a server); checking whether the hash value fits to the digital signature to determine whether the video data stream is trustworthy.

Further embodiments according to the fourth aspect of the invention provide an apparatus for decoding a video data stream having a video encoded thereinto. The apparatus is configured for: deriving a syntax structure from the video data stream, which comprises information for checking the video data stream for trustworthiness based on a predetermined portion of the video data stream (e.g., which predetermined portion is to be subjected to a hash function, or is to be used to derive data to be subjected to a hash function for deriving a hash value to serve for checking the trustworthiness of the video data stream). The syntax structure comprises a reference to an external resource (e.g., a metadata structure or a manifest file) for retrieving a digital signature associated with the predetermined portion.

Further embodiments according to the fourth aspect of the invention provide an apparatus for rendering a video data stream having a video encoded thereinto checkable on trustworthiness. The apparatus is configured for: subjecting a predetermined portion of the video data stream, or of data from which the predetermined portion of the video data stream is derived, to a hash function to obtain a hash value; signing the hash value to obtain a digital signature (e.g. by use of a private key of an asymmetric encryption scheme), and providing the digital signature in an external resource; inserting an indication of the external resource (e.g., a reference to the digital signature on the external resource) (e.g., a URI of the external resource or the digital signature) into the video data stream.

Further embodiments according to the fourth aspect of the invention provide a method for checking a video data stream having a video encoded thereinto on trustworthiness. The method comprises: subjecting a predetermined portion (e.g., an access unit, e.g., video data associated with a time frame) of the video data stream, or data derived therefrom, to a hash function to obtain a hash value; deriving a digital signature associated with the predetermined portion from an external resource (e.g., a server); checking whether the hash value fits to the digital signature to determine whether the video data stream is trustworthy.

Further embodiments according to the fourth aspect of the invention provide a method for decoding a video data stream having a video encoded thereinto. The method comprises: deriving a syntax structure from the video data stream, which comprises information for checking the video data stream for trustworthiness based on a predetermined portion of the video data stream (e.g., which predetermined portion is to be subjected to a hash function, or is to be used to derive data to be subjected to a hash function for deriving a hash value to serve for checking the trustworthiness of the video data stream). The syntax structure comprises a reference to an external resource (e.g., a metadata structure or a manifest file) for retrieving a digital signature associated with the predetermined portion.

Further embodiments according to the fourth aspect of the invention provide a method for rendering a video data stream having a video encoded thereinto checkable on trustworthiness, wherein the method comprises: subjecting a predetermined portion of the video data stream, or of data from which the predetermined portion of the video data stream is derived, to a hash function to obtain a hash value; signing the hash value to obtain a digital signature (e.g. by use of a private key of an asymmetric encryption scheme), and providing the digital signature in an external resource; inserting an indication of the external resource (e.g., a reference to the digital signature on the external resource) (e.g., a URI of the external resource or the digital signature) into the video data stream.

Further embodiments of the invention provide a video data stream, e.g., stored on a non-transitory digital storage medium, comprising a video data stream obtained by any of the previously described methods.

BRIEF DESCRIPTION OF THE DRAWINGS

Embodiments of the present disclosure are described in more detail below with respect to the figures, among which.

DETAILED DESCRIPTION OF THE INVENTION

Embodiments of the present invention are now described in more detail with reference to the accompanying drawings, in which the same or similar elements or elements that have the same or similar functionality have the same reference signs assigned or are identified with the same name. In the following description, a plurality of details is set forth to provide a thorough explanation of embodiments of the disclosure. However, it will be apparent to one skilled in the art that other embodiments may be implemented without these specific details. In addition, features of the different embodiments described herein may be combined with each other, unless specifically noted otherwise.

Figure 1:
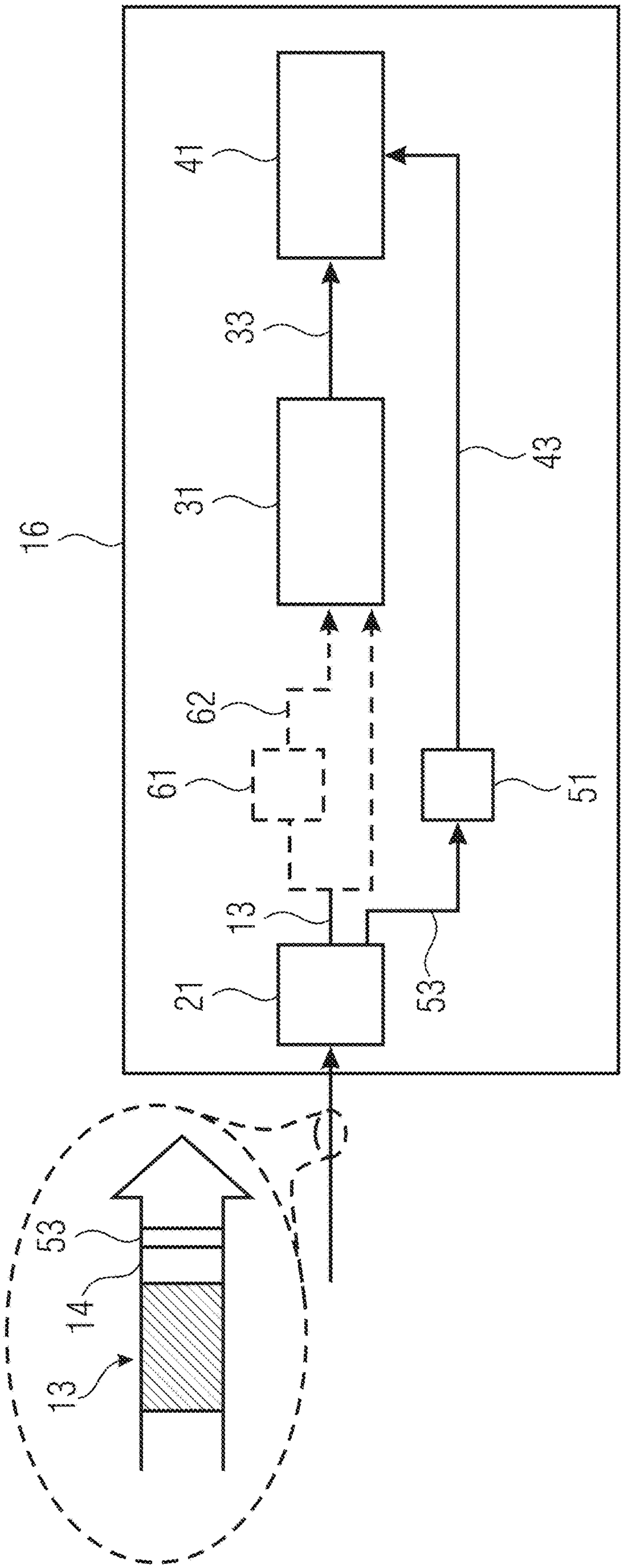
FIG. 1 illustrates an apparatus for checking a video data stream on trustworthiness according to an embodiment.
Figure 2:
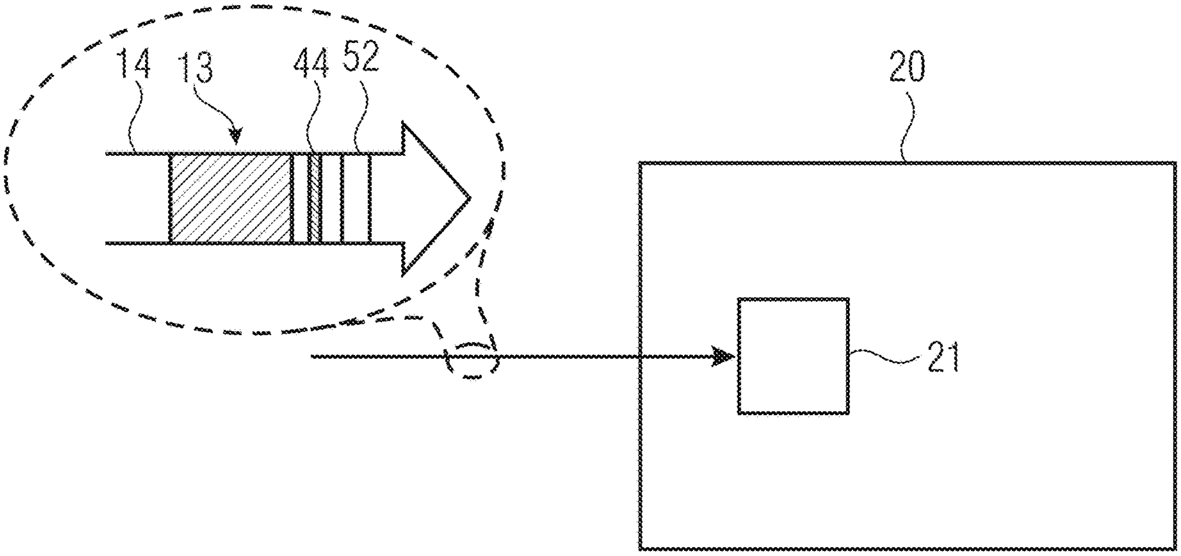
FIG. 2 illustrates an apparatus for decoding a video according to embodiments.
Figure 3:
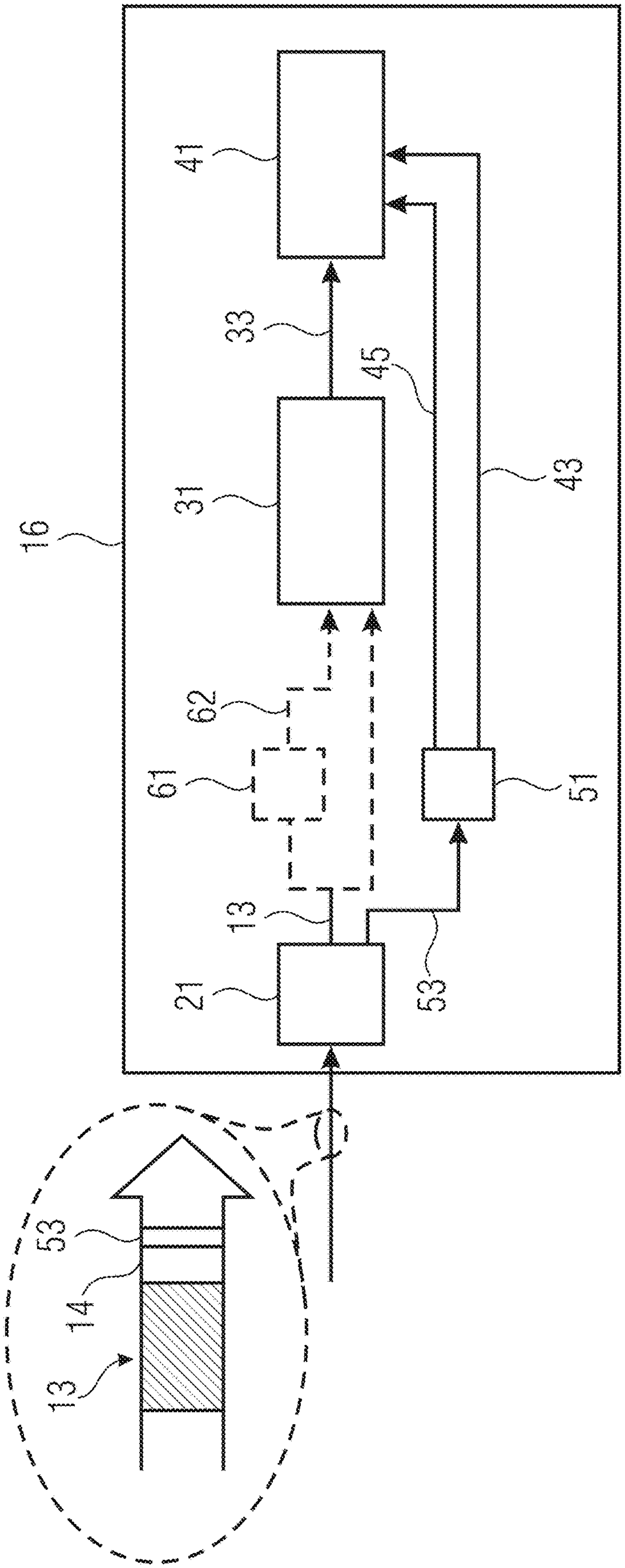
FIG. 3 illustrates an apparatus for checking a video data stream on trustworthiness according to an embodiment of the first aspect.
Figure 4:
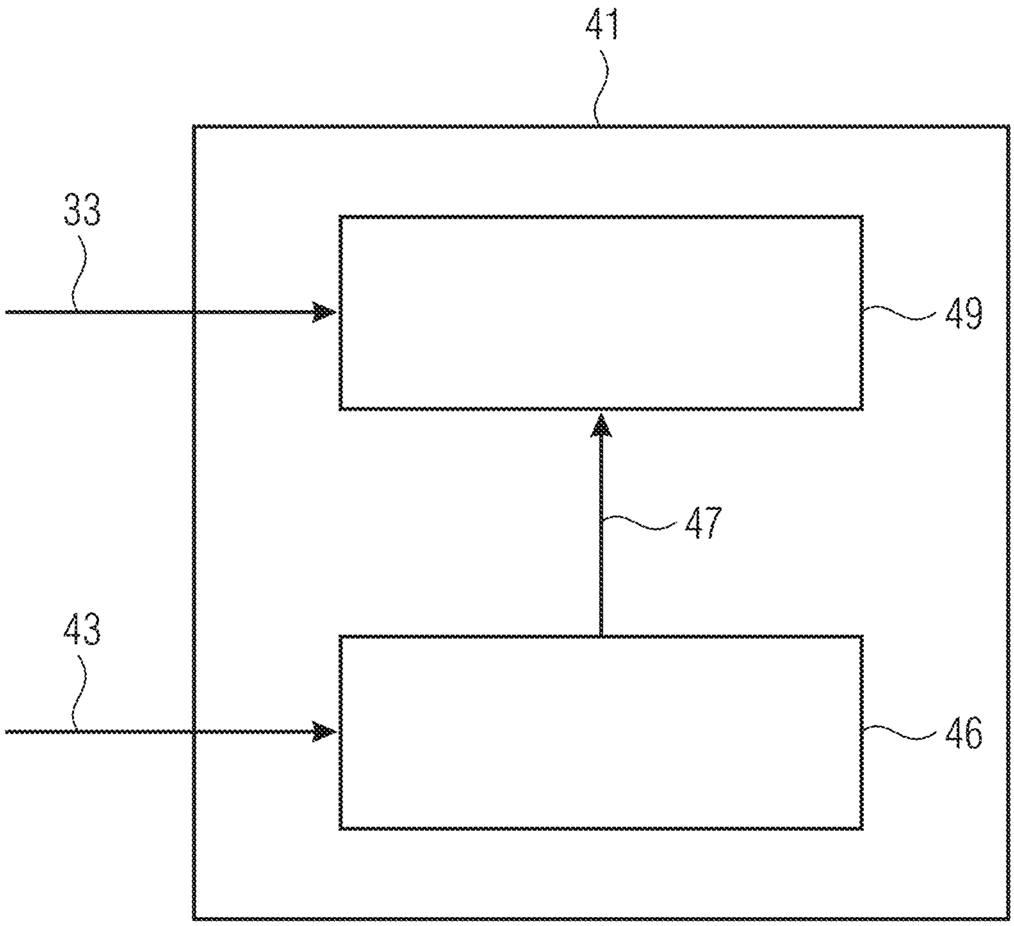
FIG. 4 illustrates a verification module according to an embodiment.

The description starts with the description of an apparatus for checking a video data stream on trustworthiness with reference to FIG. 1 and a decoder with reference to FIG. 2, with further optional details being described with respect to FIG. 3. FIG. 4 describes an apparatus for rendering a video data stream checkable on trustworthiness. The apparatuses of FIG. 1 and FIG. 2 and FIG. 4 may provide a framework, in which aspects of the invention may be implemented. In other words, any of the features and functionalities described with respect to FIG. 1 to FIG. 4 may optionally apply to of the embodiments described later on, wherein the features described with respect to FIG. 1 to FIG. 4 may optionally be combined with any of the subsequent embodiments individually or in combination.

FIG. 1 illustrates an apparatus 16 for checking a video data stream 14 on trustworthiness.

For example, trustworthiness may mean that the content and/or the content provider of the data stream or of the predetermined portion are verified as being authentic. The video data stream 14 has a video encoded thereinto. Apparatus 16 is configured for subjecting a predetermined portion 13 of the video data stream 14 to a hash function 31 to obtain a hash value 33. Alternatively, instead of subjecting the predetermined portion 13 to the hash function, apparatus 16 may subject data 62 derived from the predetermined portion 13 to the hash function 31 to obtain the hash value 33. The latter option is exemplarily visualized in FIG. 1 by the optional block 61, which may derive the data 62, which is to be subjected to the hash function 31, from the predetermined portion 13. Apparatus 16 comprises an extractor 21, which extracts the predetermined portion 13 from the video data stream 14.

Apparatus 16 further comprises a verification information deriver 51, which obtains a digital signature 43 based on the video data stream 14. E.g., the digital signature may be included in the data stream 14, or data stream 14 may include a reference to the digital signature.

Apparatus 16 further comprises a verification module 41, which checks whether a the hash value 33 fits to the digital signature 43 to determine whether the data stream 14 is trustworthy.

For example, extractor 21 may extract verification information 53 from the data stream 14, which may be used by verification information deriver 51 for deriving information used in the verification process 41, e.g., the digital signature 43 or a reference to the digital signature 43.

For example, the verification information 53 may include, or consist of, one or more syntax elements and/or one or more syntax structures. For example, the verification information 53 may include one or more SEI messages.

For example, the video data stream 14 may comprise a plurality of payload packets, e.g., called network abstraction layer (NAL) units, e.g., at an H.264, H.265 or H.266. The payload packets may include coded video payload packets, e.g., called video coded layer (VCL) NAL units, and, additionally, supplemental information payload packets, e.g., called supplemental enhancement information (SEI) NAL units, which carry information on the coded video data and/or for the decoding process of the coded video data, and/or for coding options for decoding the coded video data. A supplemental information payload packet may include one or more supplemental information messages, e.g., called SEI message.

For example, the verification information deriver 51 may derive the digital signature 43 from the data stream 14, e.g., from a syntax element that carries the digital signature 43. Alternatively, verification information 53 may be indicative of a reference to a metadata file or a manifest file, e.g., a C2PA file, and verification information deriver 51 may derive the digital signature from that reference.

According to an embodiment, apparatus 16 is configured for deriving the digital signature 43 from the video data stream 14, e.g., from a payload packet which is interspersed in the video data stream between video payload packets carrying encoded video data. For example, apparatus 16 may derive the digital signature 43 from an SEI message of the video data stream, e.g., trustworthy_content_verification SEI message.

According to an alternative embodiment, apparatus 16 is configured for deriving an indication of an external resource, e.g., a URI, from the video data stream 14, e.g., from an SEI message of the video data stream, e.g., trustworthy_content_verification SEI message. Apparatus 16 may derive the digital signature 43 from the external resource.

In other words. according to an embodiment, the indication of the external resource is a uniform resource identifier pointing to a manifest file stored on a server.

According to an embodiment, the hash value 33 depends on every bit of the predetermined portion 13 of the video data stream.

According to an embodiment, the hash value 33 depends on every bit of the predetermined portion 13 of the video data stream in an encoded domain (e.g., in a domain, in which at least a portion of the video data stream is entropy encoded).

According to an embodiment, the predetermined portion 13 of the video data stream extends over more than one access unit (or time frame) of the video data stream so that the hash value 33 depends on bits of the more than one access unit. Alternatively, the predetermined portion 13 comprises video data of only one access unit (or time frame).

As far as block 61 is concerned, block 61 may, for example, include a reconstruction of a portion of the video, which portion is represented by the predetermined portion 13. In other words, according to an embodiment, apparatus 16 may, in subjecting the predetermined portion 13 of the video data stream, or data derived therefrom, to a hash function 31 to obtain the hash value 33, reconstruct the video with respect to the predetermined portion 13 to obtain a reconstructed portion of the video, and subjecting the reconstructed portion to the hash function 31.

According to an embodiment, apparatus 16 may be a decoder for decoding the video data stream 14, e.g., for reconstructing the video encoded into the video data stream. For example, apparatus 16 may reconstruct the predetermined portion 13 to obtain a reconstructed portion of the video. For example, the reconstruction of the predetermined portion may be part of block 61, which provides the data 62 to be subjected to the hash function 31. For example, data 62 may correspond to the reconstructed portion reconstructed based on the predetermined portion 13. Alternatively, block 61 may derive the data 62 from the reconstructed portion of the predetermined portion 13. In other words, data 62 derived from the predetermined portion 13 may be the reconstructed portion of the video or even data derived from the reconstructed portion.

For example, the extractor 21 may comprise a decoding module for decoding the indication of the digital signature from the video data stream. In other words, apparatus 16 may be a decoder.

According to an embodiment, the apparatus 16 is a decoder for decoding the video data stream (e.g., a decoder compliant to H.264/AVC or H.265/HEVC or H.266/VVC) (e.g., the decoder is configured for decoding the video from the video data stream by block based predictive decoding and transform based residual decoding).

FIG. 2 illustrates an apparatus 20 for decoding a video data stream 14 having a video encoded thereinto according to an embodiment. Apparatus 20 may be referred to as decoder 20. Decoder 20 comprises a decoding module 21, which may optionally correspond to extractor 21 of FIG. 1. Decoding module 21 is configured for decoding a syntax structure 52 from the video data stream, which comprises information for checking the video data stream for trustworthiness based on a predetermined portion 13 of the video data stream, which predetermined portion is to be subjected to a hash function 31, or is to be used to derive data to be subjected to a hash function 31, for deriving a hash value 33 to serve for checking the trustworthiness of the video data stream. Decoding module 21 is further configured for decoding an indication 44 of a digital signature 43 from the video data stream (e.g., from the video data stream, e.g., twcv_signature, or from a metadata file or manifest file, e.g., a C2PA file).

For example, the syntax structure 52 and the indication 44 may be part of the verification information 53 of FIG. 1.

For example, the syntax structure 52 may be included in, or correspond to, a payload packet interspersed between coded video data payload packets, e.g., a supplemental information message as described with respect to FIG. 1, e.g., a first payload packet, which may be referred to as first SEI message in the following. For example, the indication 44 may be included in a further payload packet interspersed between coded video data payload packets, e.g., a supplemental information message, e.g., the twsc_content_verification SEI message. In other words, the syntax structure 52 and the indication 44 may be included in different payload packets of SEI messages.

Decoder 20 may optionally include the functionality of apparatus 60 of FIG. 1. Additionally, decoder 20 comprises a decoding module 63 which decodes the video 11 and, in particular, the predetermined portion 13.

FIG. 3 illustrates an example of the verification module 41 according to an embodiment. According to this embodiment, verification module 41 comprises a decrypting module 46, which decrypts the digital signature 43 to obtain a check value 47. Verification module 41 according to this embodiment further comprises a verification block 49 which checks whether the hash value 33 fits to the check value 47.

For example, decryption block 46 may use an asymmetric decryption scheme for decrypting the digital signature 43. For example, decryption block 46 may use a public key of the asymmetric decryption scheme to decrypt the digital signature 43 to obtain the check value 47.

According to an embodiment, verification block 49 performs the checking whether the hash value fits to the check value by forming a verification string based on the hash value 33 and based on further information. E.g., as described later, according to embodiments of the first aspect of the invention, the further information includes the unique identifier 45. Verification block 49 then compares the verification string to the check value 47. In examples, comparing the verification string to the check value 47 may include a further hashing of the verification string, as it will be explained in more detail later.

In other words, according to an embodiment, verification module 41 performs the checking whether the hash value 33 fits to the digital signature 43 by forming a verification string based on the hash value and based on further information, and comparing the verification string to the digital signature 43 using a public key (wherein comparing the verification string to the digital signature may include the decrypting performed by decrypting block 46).

For example, the generation of the digital signature 43 may be performed on encoder side by forming a verification string and signing it using a private key of an asymmetric encryption scheme.

For example, the singing may include a further hashing, i.e., hashing the verification string using a further hash function to obtain a further hash value and signing the further hash value. In this example, it may be impossible to reconstruct the verification string from the digital signature 43 on decoder side, but instead, it can only be checked, if a check value formed using the hash value 33 fits to the digital signature, e.g., by deriving the check value by forming the verification string and hashing the verification string using the further hash function. In other words, in this case, the verification by verification module 41 may include a hashing of the verification string using the further hash function to obtain a further hash value, and checking, if the further hash value fits to the digital signature, e.g., by decrypting the digital signature using the public key and checking if the resulting check value equals the further hash value.

In other words, according to an embodiment, the checking whether the hash value 33 fits or matches the check value 47 may include forming a verification string using the hash value 33, e.g., by concatenating the hash value 33 with further information, such as a further hash value or a hash function identifier as will be described below, and hashing the verification string, e.g., using a further hash function. Verification module 41 may then check, whether the hashed verification string equals the check value 47 decrypted from the digital signature. On encoder side, according to this embodiment, the digital signature may be generated by forming the verification string as on decoder side, hashing it using the further hash function, and signing the hashed verification string to obtain the digital signature 43.

According to alternative embodiments, the check value 47 may correspond to the verification string, e.g., the hash value 33 or the concatenation of the hash value 33 with further information, such as a further hash value or a hash function identifier. In other words, the decryption of the digital signature in this case may yield the hash value 33 as part of the check value 47 (or the entire check value 47). In this case, due to the omittance of a further hashing, the digital signature may be larger.

For example, if one or the other of the above alternatives is employed may depend on the selected hash function.

According to an embodiment, apparatus 16 derives an indication of an external resource, e.g., a URI, for retrieving the public key from the video data stream 14. According to this embodiment, verification information deriver 51 derives a public key from the external resource indicated in the video data stream 14.

FIG. 4 illustrates an apparatus 15 according to an embodiment. The apparatus 15 is for rendering a video data stream 14 having a video encoded thereinto checkable on trustworthiness. Apparatus 15 is configured for subjecting a predetermined portion 13 of the video data steam 14, or of data 62 from which the video data stream 14 is derived, to a hash function 31 to obtain a hash value 33. For example, data 62 is data from which the predetermined portion 13 is derived. In this respect, the description of apparatus 16 of FIG. 1 applies in an equivalent manner, e.g., as described with respect to the optional block 61. In particular, the data subjected to the hash function 31 for obtaining the hash value 33 may be the same as used by apparatus 16 for deriving the hash value 33. Apparatus 15 comprises a signing module 71, configured for determining the digital signature 43 based on the hash value 33. To this end, signing module 71 may sign the hash value 33, individually or in combination with further data. In other words, signing module 71 may sign a combination, e.g., a concatenation, of one or more pieces of information including the hash value 33. Apparatus 15 further comprises an inserter 77, configured for inserting an indication of the digital signature 43 into the data stream 14, e.g., in form of, or as part of, the verification information 51 described with respect to FIG. 1. In other words, inserter 77 may insert the indication of the digital signature 43 of inserting the digital signature 43, e.g., encoding the digital signature 43, into the video data stream 14, or, alternatively, by inserting, e.g., encoding, an indication of a reference from which the digital signature 43 may be derived into the data stream 14.

Any description of apparatus 16 may optionally equivalently apply to apparatus 15 in the sense that an information derived from data steam 14 where apparatus 16 may be inserted into data stream 14 by apparatus 15. Furthermore, any hash function, such as hash function 31, used by apparatus 15 may be equivalent to the corresponding hash function used by apparatus 16. Same applies to the input of corresponding hash functions, such as hash function 31 used for deriving the hash value 33. For example, the signing 71 to obtain the digital signature 43 and the verification 41 of the digital signature 43 performed by apparatus and apparatus 16, respectively, may be part of an asymmetric encryption/decryption scheme and may be performed by means of a pair of private and public keys, respectively, wherein at least the private key is used for signing and wherein the public key is used for decrypting.

As far as block 61 is concerned, according to embodiments, apparatus 15 reconstructs a video with respect to the previous determined portion 13 to obtain a reconstructed portion of the video, and the data 62 to be subjected to the hash function 31 may correspond to the reconstructed portion, or may be derived from the reconstructed portion.

According to an embodiment, apparatus 15 is an encoder configured for encoding the video into the data stream 14.

According to an embodiment, assigning module 71 forms a verification string based on the hash value 33 and based on one or more further pieces of information. According to this embodiment, signing module 71 further signs the verification string using a private key, e.g., using a signing algorithm, to obtain the digital signature 43.

With respect to embodiments of apparatus 16, according to which apparatus 16 derives information from an external resource or from a reference, apparatus 15 may be configured for providing this information to the external resource or the reference.

Embodiments of the first aspect of the invention are described in the following.

Figure 5:
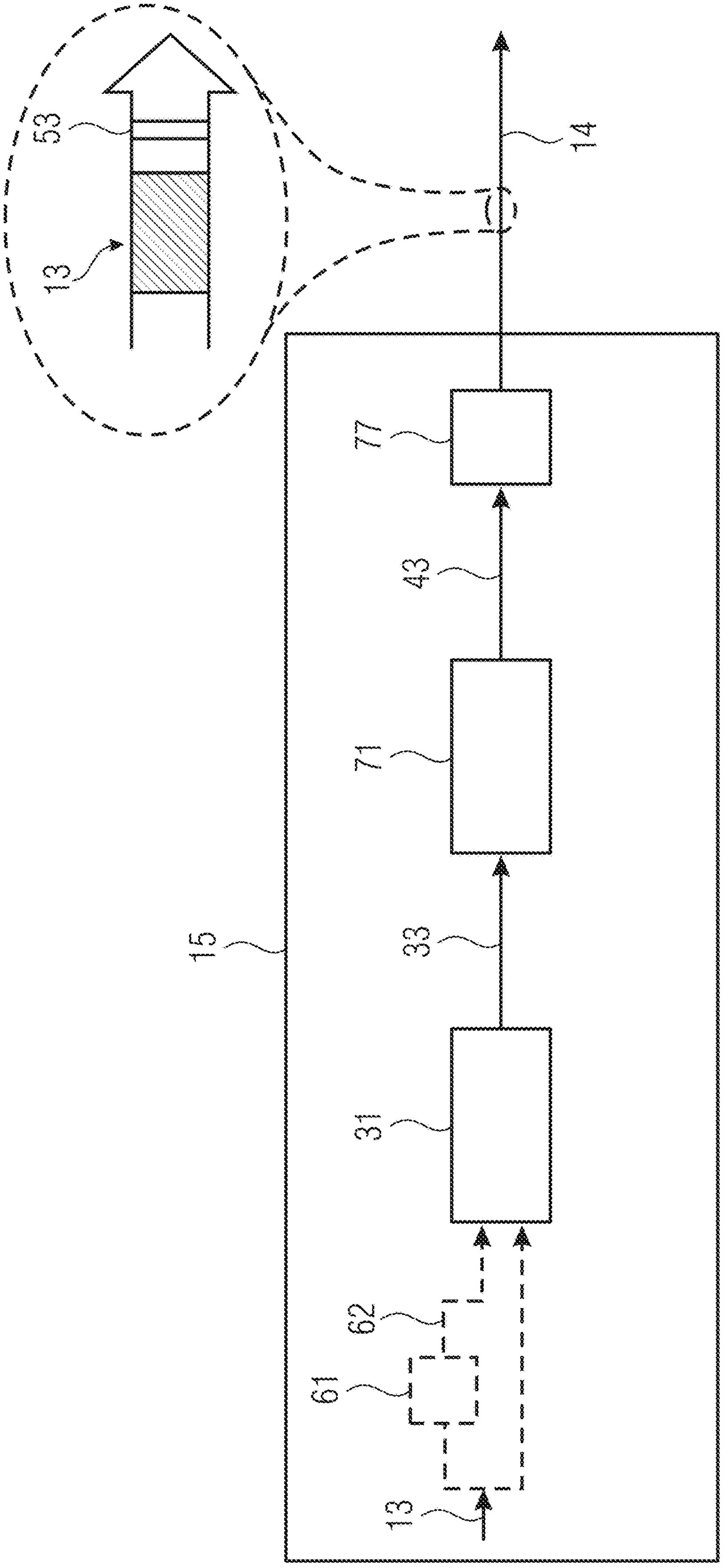
FIG. 5 illustrates an apparatus for rendering a video data stream checkable on trustworthiness according to embodiments.

FIG. 5 illustrates an apparatus 16 for checking video data stream 14 on trustworthiness according to an embodiment of the first aspect of the invention. Apparatus 16 of FIG. 5 may optionally correspond to apparatus 16 of FIG. 1, that is, apparatus 16 of FIG. 5 may be based on any of the embodiments described with respect to FIG. 1. Furthermore, embodiments described below may optionally be combined with any of the embodiments descried with respect to the first aspect.

Apparatus 16 of FIG. 5 obtains a unique identifier 45, which uniquely identifies a media asset to which the predetermined portion 13 belongs.

For example, verification information deriver 51 may derive the unique identifier 45 from the video data stream 14, e.g., from a syntax element, e.g., a dedicated syntax element, which carries the unique identifier, e.g., which has a value corresponding to the unique identifier.

Alternatively, verification information deriver 51 may derive the unique identifier from a reference, which is indicated in the video data stream 14 e.g., by means of a unique resource identifier (URI). In other words, the verification information 53 may comprise an indication of a reference, e.g., a URI, from which apparatus 16 may derive the unique identifier.

In other words, according to an embodiment, apparatus 16 derives a unique identifier from the video data stream 14.

According to an embodiment, apparatus 16 derives the unique identifier 45 from a payload packet, e.g., an SEI message, signaled in the video data stream 14.

For example, the SEI message may further comprise one or more of an indication of the hash function, an indication of a number of portions of the video data stream, for which a digital signature for verifying the trustworthiness of the video data stream is available, and an indication, which indicates a manner of retrieving a public key for checking whether the combination of the hash value and the unique identifier fits to the digital signature.

According to the embodiments of FIG. 5, verification module 41 checks whether a combination of the hash value 33 and the unique identifier 45 fits to the digital signature 43 to determine whether the data stream 14 is trustworthy.

In other words, according to embodiments of the first aspect of the invention, the apparatus 16 obtains a unique identifier which uniquely identifies a media asset to which the predetermined portion 13 belongs. Furthermore, verification module 41 checks whether a combination of the hash value and the unique identifier 45 fits to the digital signature 43 to determine whether the video data stream is trustworthy.

In other words, according to embodiments of the first aspect, the unique identifier of the media assets to which the predetermined portion belongs is included in the verification of the trustworthiness. Doing so not only verifies the authenticity of the predetermined portion 13 itself but also its association with the media asset. Thus, a combination of media belonging to the media asset can be verified as being the combination of media as provided by the content provider that provided the digital signature. Accordingly, embodiments of the first aspect allow for verifying that the combination of different media substreams of a media asset is authentic, so that it can be discovered if, for example, a video is combined with an audio stream that differs from the one provided by the content provider. Furthermore, using a unique identifier for the purpose of verifying the combination of media components of the media asset allows a verification even in cases in which only a subset of components of the media asset is available, e.g., in case that only one of multiple available audio streams is streamed along with the video stream. If the video and audio was assigned together to obtain a digital signature, it would either not be possible to remove individual components such as individual audio streams so that it would be necessary to always stream the entire media asset or, alternatively, it would be required to provide various combinations of the different components of the media asset which are jointly signed. Instead, using the unique identifier allows an individual verification that the video data stream belongs to the media asset. A similar process could be performed for any further component of the media asset, such as one or more audio streams and/or subtitles.

According to an embodiment, apparatus 16 is configured for checking whether a combination of multiple pieces of information comprising the hash value 33, the unique identifier 45, and an indication of the hash function 31 fits to the digital signature 43 to determine whether the video data stream is trustworthy, e.g., verification module 41 may use these pieces of information to build the verification string.

According to embodiments of the first aspect, verification block 49 of FIG. 3 checks whether the combination of the hash value 33 and the unique identifier 45 fits to the check value 47 or matches the check value 47.

For example, verification block 49 may form a verification string based on the hash value 33 and the unique identifier 45, and verification module 41 may compare a verification string to the digital signature 43 using a public key. For example, comparing the verification string to the digital signature may include decrypting the digital signature 43, e.g., as described with respect to decrypting block 46.

Figure 15:
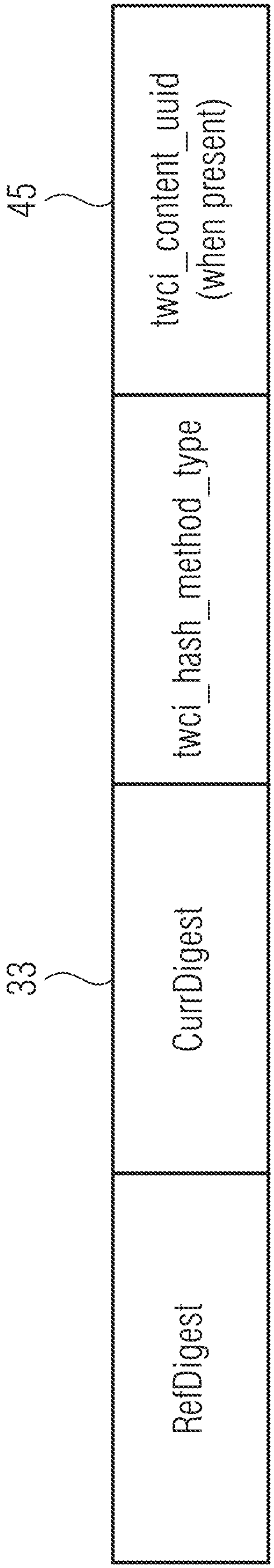
FIG. 15 illustrates a construction of identification string IdString according to an embodiment.

An example of a construction of a verification string is illustrated in FIG. 15, according to which the verification string comprises the hash value 33, optionally, the unique identifier 45, and further, a hash value of a previous portion of the video data stream to verify temporal consistency and an identifier of the hash function 31.

As already described above, apparatus 16 may derive an indication of an external resource for retrieving the public key from the video data stream and derive the public key from the external resource. According to an embodiment of the first aspect, apparatus 16, e.g., verification information deriver 51, may derive the unique identifier 45 from the external resource, e.g., the same external resource from which the public key is derived.

For example, verification information deriver 51 may derive the public key and the unique identifier based on the same piece of information derived from video data stream 14. For example, verification information 53 may include an indication of the external resource, and verification information deriver 51 may derive the unique identifier 45 and the public key from the external resource.

According to an embodiment, apparatus 16 checks whether the unique identifier 45 matches a unique identifier associated with one or more further media components, e.g., audio or subtitles. For example, the further media components may be signaled in a data stream comprising the video data stream. For example, checking whether a unique identifier matches the unique identifier associated with one or more further media components may be performed by checking whether the unique identifier equals the unique identifier associated with the one or more further video components.

According to an embodiment, apparatus 16 performs the checking the video data stream 14 on trustworthiness sequentially with respect to a plurality of portions of the video data stream. The plurality of portions may comprise the predetermined portion 13. According to this embodiment, apparatus 16 subjects the predetermined portion 13, or data 62 derived therefrom, to the hash function 31 to obtain the hash value 33. Further, apparatus 16 subjects a further portion of the video data stream 14, or further data derived from the further portion of the video data stream, to the hash function 31 to obtain a further hash value. For example, the further portion is a previous portion with respect to the predetermined portion 13, e.g., a portion which precedes the predetermined portion in the video data stream. According to this embodiment, verification module 41 checks whether a combination of the hash value, the further hash value and the unique identifier fits to the digital signature 43. In other words, the combination of multiple pieces of information may comprise the hash value and the unique identifier. Optionally, the combination may include further pieces of information, such as an identifier of the hash function, as will be described below.

In other words, according to examples, the verification string, which may be formed by verification block 49, may comprise the further hash value derived by subjecting a further portion of the video data stream to the hash function 31.

Regarding decoder 20 of FIG. 2, according to embodiments of the first aspect, decoder 20 decodes a unique identifier 45, or a reference which points to a unique identifier 45, from the video data stream, the unique identifier 45 uniquely identifying a media asset to which the predetermined portion 13 belongs. Furthermore, the digital signature 43 decoded by decoder 20 may be based on a combination of the hash value 33 and the unique identifier (e.g., a combination of multiple pieces of information comprising the hash value and the unique identifier 45).

According to an embodiment, the unique identifier 45 is signaled in the syntax structure 52.

Figure 6:
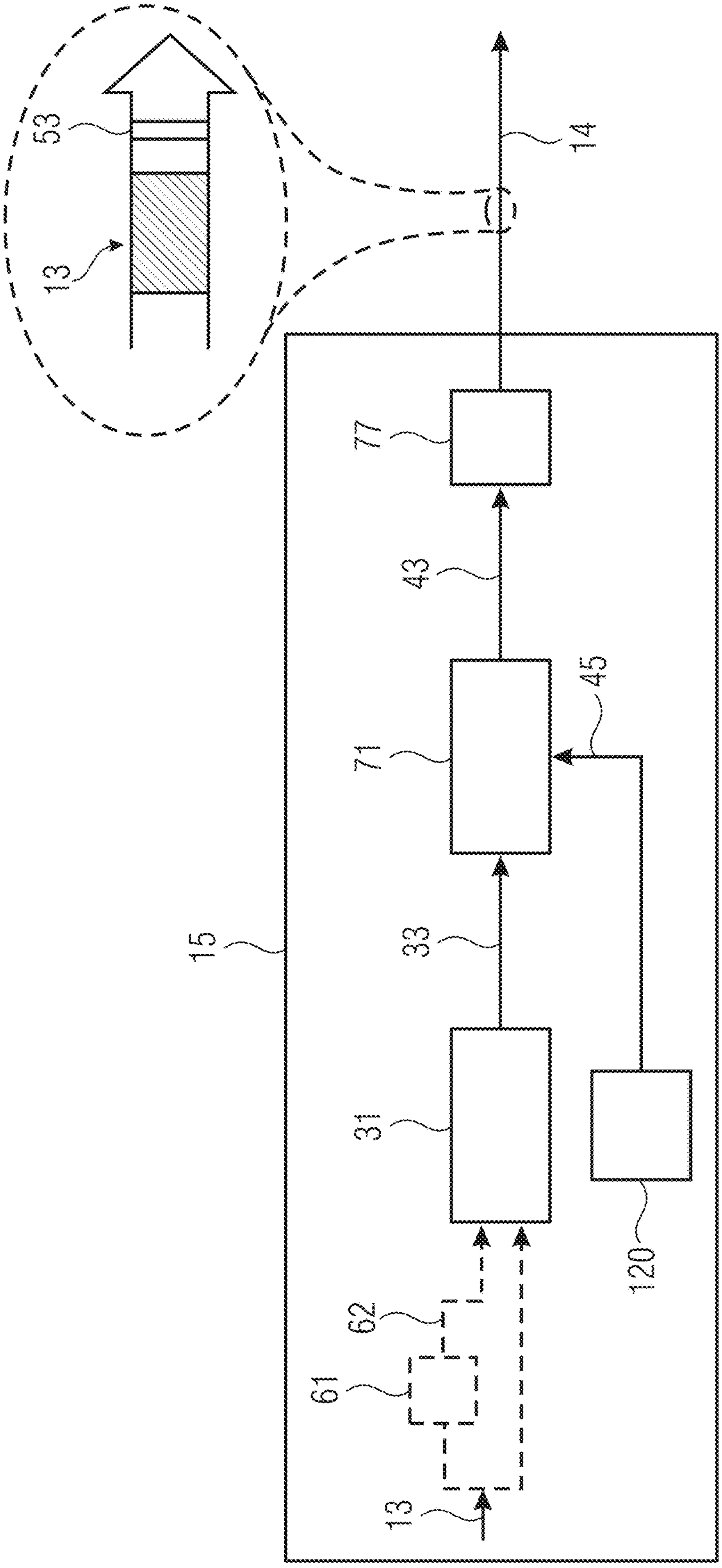
FIG. 6 illustrates an apparatus for rendering a video data stream checkable on trustworthiness according to an embodiment of the first aspect.

FIG. 6 illustrates an apparatus 15 for rendering a data stream 14 checkable on trustworthiness according to an embodiment of the first aspect of the invention. Apparatus of FIG. 6 may correspond to apparatus 15 of FIG. 4. That is, apparatus 15 of FIG. 6 may be implemented based on any of the embodiments described with respect to FIG. 4. According to embodiments of the first aspect, apparatus 15 comprises a media asset identification module 120, which assigns a unique identifier to the predetermined portion 13. The unique identifier 45 uniquely identifies a media asset to which the predetermined portion 13 belongs. According to this embodiment, the signing module 71 signs a combination of the hash value and the unique identifier to obtain the digital signature 43. For example, the combination comprises multiple pieces of information comprising the hash value and the unique identifier and optionally one or more further pieces of information such as an identifier of the hash function 31 and/or one or more further hash values.

According to an embodiment, signing module 71 forms a verification string based on the hash value 33 and the unique identifier 45 and, optionally, based on one or more of the further pieces of information already mentioned above.

Embodiments of the second aspect of the invention are described in the following.

Figure 7:
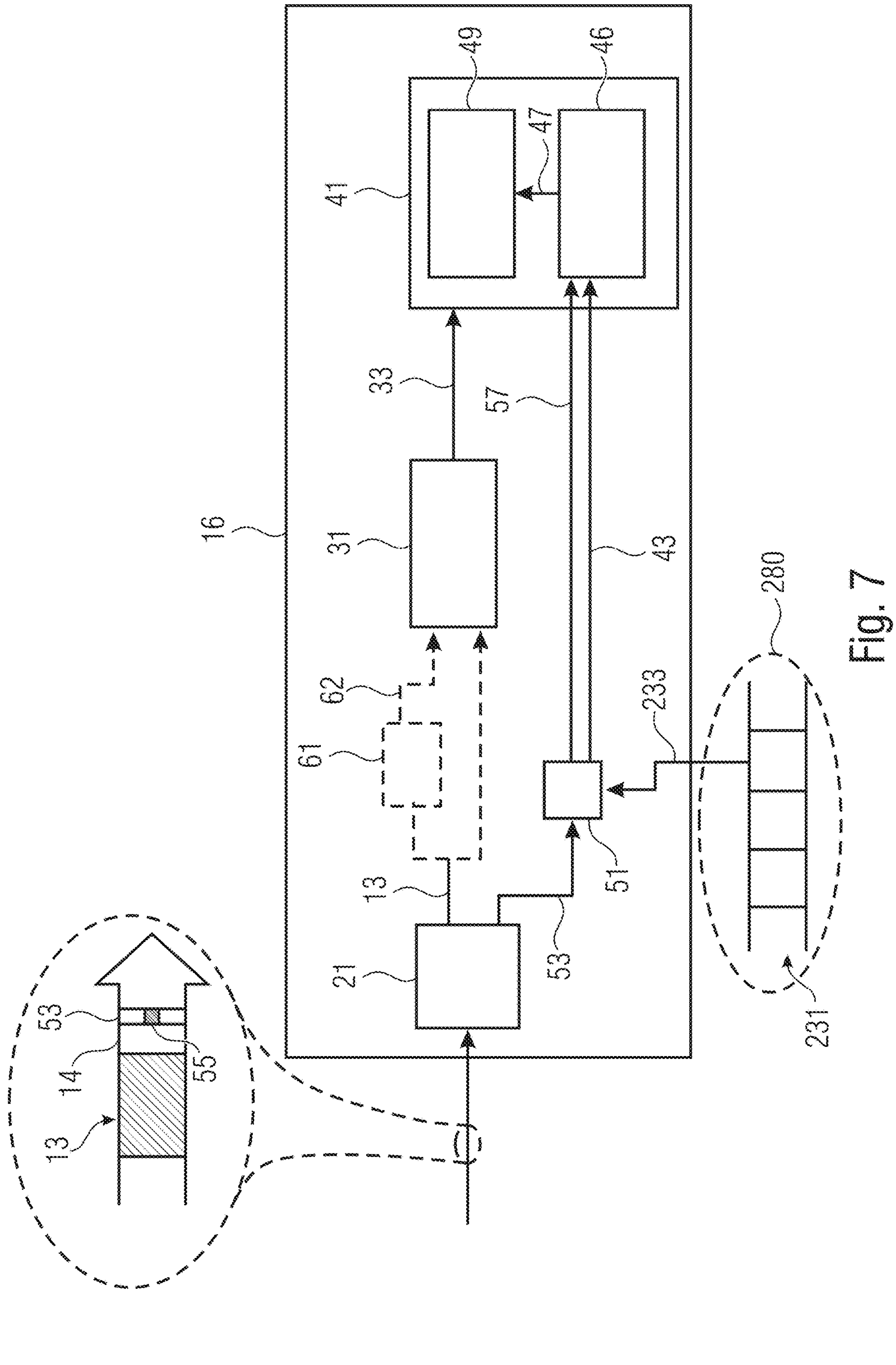
FIG. 7 illustrates an apparatus for checking a video data stream on trustworthiness according to an embodiment of the second aspect.

FIG. 7 illustrates an apparatus 16 for checking video data stream 14 on trustworthiness according to an embodiment of the second aspect of the invention. Apparatus 16 of FIG. 7 may optionally correspond to apparatus 16 of FIG. 1, that is, apparatus 16 of FIG. 7 may be based on any of the embodiments described with respect to FIG. 1. Furthermore, embodiments described below may optionally be combined with any of the embodiments descried with respect to the first aspect.

According to embodiments described with respect to FIG. 7 verification module 41 performs the checking whether the hash value 33 fits to the digital signature 43 to determine whether the data stream 14 is trustworthy by decrypting 46 the digital signal channel 43 using a public key 57 of an asymmetric decryption scheme to obtain a check value 47, and checking whether the hash value 33 fits to or matches the check value 47.

For example, verification module 41 may be implemented as described with respect to FIG. 3.

According to embodiments described with respect to FIG. 7, apparatus 16 checks whether the video data stream 14 comprises an indication 55 of an external resource 280 comprising a track 231 of editors of the video data stream 14. If the video data stream 14 comprises an indication 55 of an external resource comprising a track 231 of editors of the video data stream 14, apparatus 16 queries, or looks up, the track 231 of editors for a certificate 233 of a content provider being the last editor of the video data stream, e.g., according to the track 231 of editors. If video data stream 14 comprises the indication 55, apparatus 16 derives the public key 57 based on the certificate 231 of the content provider being the last editor of the video data stream.

For example, the indication 55 may be part of the verification information 53. For example, the check whether the indication 55 is included in the video data stream 14 may be performed by the verification information deriver 53.

According to an embodiment, apparatus 16 performs the checking whether the video data stream 14 comprises the indication 55 of the external resource comprising the track 231 of editors of the video data stream 14 by deriving a syntax element from the video data stream, which syntax element indicates whether, or distinguishes between 1) the video data stream comprises
   A) URI directly pointing to the certificate of the content provider, or
   B) a URI pointing to a register of certificates of content providers and an index into the register pointing to the content provider of the video data stream 14, or
2) the video data stream 14 comprises the indication of the external resource comprising the track of editors.

In other words, the syntax element may be indicative of, or may distinguish between, two cases, namely a first case in which the video data stream comprises a URI leading to the content provider of the video data stream 14, either directly, or by pointing into a register of content providers, and a second case in which the video data stream 14 comprises the indication 55 of the external resource comprising the track of editors 55.

Accordingly, for example, the same syntax element may be used for either signaling the URI or signaling the indication 55, wherein the syntax element which indicates or distinguishes between, the two cases indicates how to read the syntax element which either signals the URI or the indication 55 of the external resource comprising the track of editors.

According to an embodiment, the syntax element and, if present, the indication 55 of the external resource comprising the track of editors, or transmitted in an SEI message of the video data stream, e.g., the trustworthy_content_initialization SEI message described below.

According to an embodiment, if present, the indication 55 of the external resource comprising the track of editors is transmitted in an SEI message of the video data stream, e.g., referred to as first SEI message, e.g., the trustworthy_content_initialization SEI message. Additionally, according to the present embodiment, apparatus 16, e.g., the verification information deriver 53, is configured for, if the indication 55 of the external resource is present, deriving a further digital signature from the external resource 280, and checking whether a payload of the SEI message, i.e., the first SEI message, or a predetermined portion thereof, fits to the further digital signature.

For example, the external resource 280 is a metadata structure, e.g., a manifest file, at an external resource or, in other words, the external resource may comprise a metadata structure, e.g., a manifest file. For example, the metadata structure may comprise information on the content provider, or on a plurality of content providers that have added the video data stream 14. For example, the track of editors 231 may be a track of records of editors or amendments performed from generation to the current version of the video data stream 14 and/or the corresponding editors identifiers. For example, the metadata structure may comprise, e.g., for each of the editors, information on an identity of the editor and optionally further information such as a location associated with the video data stream and/or a time of editing the video data stream.

By checking whether the payload of the first SEI message, or a predetermined portion thereof, fits to the further digital signature, it is possible to not only verify that the video data stream originates from the content provider identified by the certificate of the public key 57, but it is possible to additionally verify that metadata indicated in the external resource, which metadata extends beyond the identity of the content provider, such as location and time of editing the video data stream, relates to a video data stream 14. For example, the SEI message, or the predetermined portion thereof, which is checked against a further digital signal signature, may be unique, e.g., unique with respect to further video data stream, e.g., further data streams of the same content providers and optionally with respect to further content providers. Thus, by taking the further digital signature against the payload of the first SEI message, or the predetermined portion thereof, prevents the erroneous metadata associated to the video data stream, e.g., by exchanging the indication of the external resource so as to point to another resource of the same content provider.

According to an embodiment, the predetermined portion of the payload of the first SEI message, or the first SEI message, comprises a unique identifier, e.g., a payload portion that is specification to the video data stream. Checking the predetermined portion of the SEI message, or the SEI message against the further digital signature, the external resource, and thereby the information, e.g., a manifest file stored in the external resource, is securely associated to the specific video data stream.

According to an embodiment, the predetermined portion of the payload of the SEI message excludes the indication of the external resource comprising the track of editors.

Excluding the indication 55 of the external resource from the predetermined portion of the payload of the first SEI message allows for changing a location at which the external resource is provided without having to recalculate the further digital signature.

According to an embodiment, the syntax structure further comprises a media component identifier. For example, the media component identifier identifies the video data stream 14 among a plurality of media components of the media message. According to this embodiment, the apparatus 16 is configured for using the media component identifier for selecting the further digital signature out of a set of one or more digital signatures comprised in the external resource 280. For example, each of the one or more digital signatures is associated with a media component, e.g., audio, video, subtitles. According to an embodiment, the syntax structure further comprises one or more of an indication of the hash function 31, and an indication of a number of portions of the video data stream, for which a digital signature for verifying the trustworthiness of the video data stream 14 is available, e.g., the syntax structure is the trustworth_content_initialization SEI message.

Figure 8:
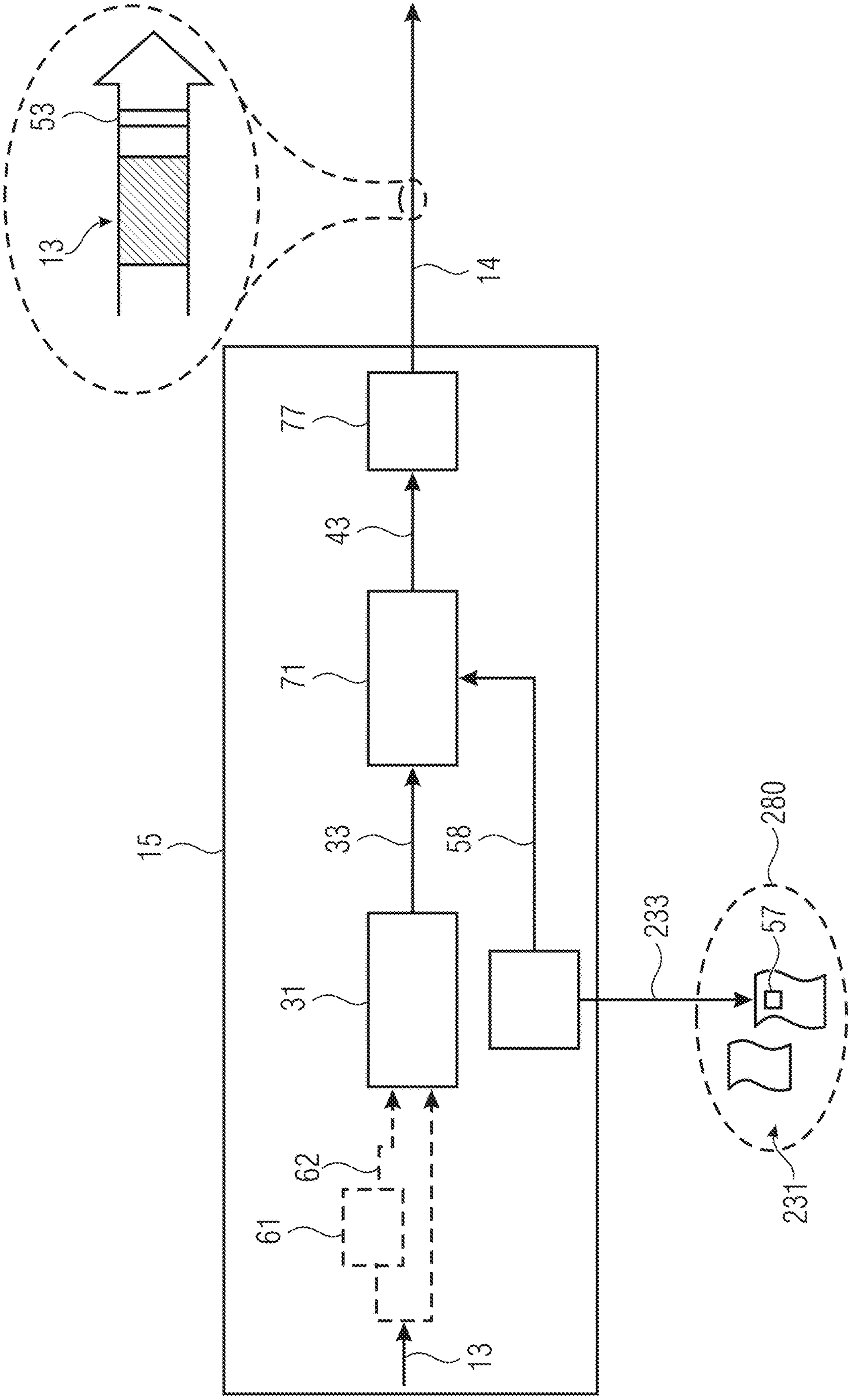
FIG. 8 illustrates an apparatus for rendering a video data stream checkable on trustworthiness according to an embodiment of the second aspect.

FIG. 8 illustrates an apparatus 15 for rendering a video data stream 14 checkable in trustworthiness according to an embodiment of the second aspect of the invention. Apparatus 15 of FIG. 8 may optionally correspond to apparatus 15 of FIG. 4, that is, apparatus 15 of FIG. 8 may be based on any of the embodiments described with respect to FIG. 4. According to embodiments described with respect to FIG. 8, apparatus 15 signs the hash value 33 using a private key 58 of an asymmetric encryption scheme to obtain the digital signature 43. Apparatus 15 according to this embodiment provides, in a track of editors 231 of the video data stream 14, the track of editors being provided on an external resource 280, a certificate 233 of a content provider, e.g., the content provider of the video data stream 14, e.g., identifying the apparatus 15. The certificate 233 comprises, or points to, a public key 57 for the asymmetric encryption scheme. According to this embodiment, apparatus 15 is configured for providing the digital signature 43 in the video data stream 14, or to the external resource 280, e.g., by inserting the digital signature 43 in the metadata structure or a further metadata structure and provide same on the external resource 280. Even alternatively, apparatus 15 may provide the digital signature 43 to a further external resource which is different from the external resource 280.

Figure 9:
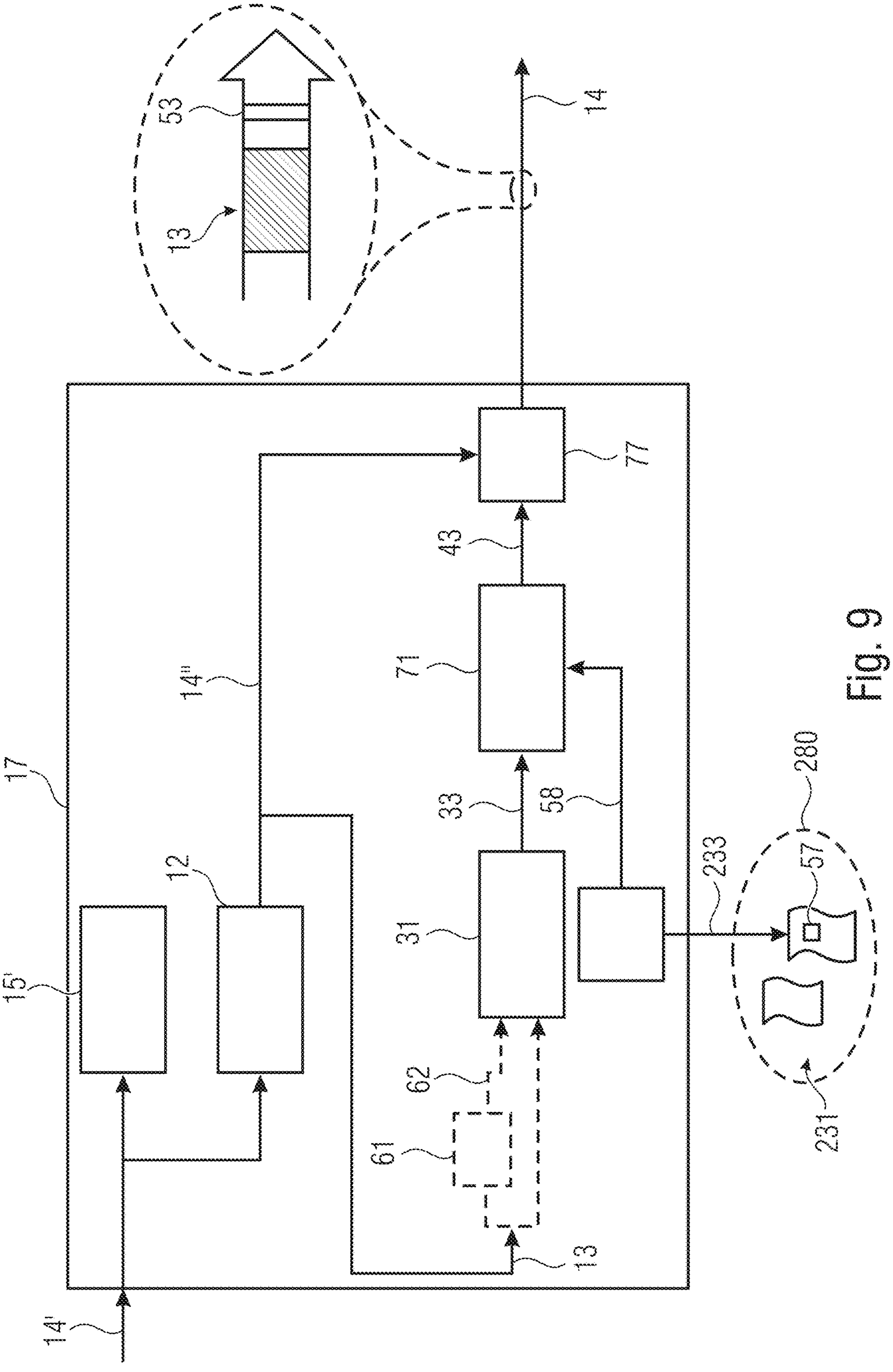
FIG. 9 illustrates a transcoder according to an embodiment of the second aspect.

FIG. 9 illustrates an apparatus 17 for transcoding a video data stream according to an embodiment of the second aspect of the invention. Apparatus 17 is configured for receiving an input video data stream 14' and checking the input video data stream 14' on trustworthiness. To this end, apparatus 17 may comprise an apparatus 15' for checking a video data stream on trustworthiness. Apparatus 15' may correspond to any of the apparatuses 15 described herein. Apparatus 17 further comprises a transcoder 12, which transcodes the input data stream 14'. Doing so, transcoder 12 provides a data stream 14" based on which apparatus 17 derives an output data stream 14. For example, in transcoding the input data stream 14', transcoder 12 may extract a portion of the input data stream 14' to be forwarded in the data stream 14. For example, transcoder 12 may selective forward the portion to be forwarded in data stream 14. That is, transcoder 12 may drop a portion of the input data stream 14'. For example, transcoder 12 may select one or more substreams of the input video data stream 14' to be forwarded in the data stream 14. Additionally, transcoder 12 may adapt information to be forwarded, e.g., supplemental enhancement information. For example, transcoder 12 may adapt the verification information 53. However, in alternative examples, input video data stream 14' is not necessarily verifiable. Thus, in examples, apparatus 17 may add the verification information 53 in the output video data stream 14.

Apparatus 17 renders the output video data stream 14 checkable on trustworthiness, e.g., as described with respect to any of the apparatuses 15 according to embodiments of the second aspect described with respect to FIG. 8. In other words, apparatus 17 subjects a predetermined portion 13 of the output video data stream 14, or data 62 from which the output data stream 14 is derived to a hash function 31 to obtain a hash value 33. Apparatus 17 signs the hash value 33 using a private key 58 of an asymmetric encryption scheme to obtain a digital signature 43. Apparatus 17 further provides, in a track of editors of the output video data stream 14, the track of edits being provided on an external resource 280, a certificate 233 of a content provider, the certificate 233 comprising, or pointing to, a public key for the asymmetric encryption scheme. Inserter 77 of apparatus 17 provides the digital signature 43 in the output video data stream 14 or to the extended resource 280 or a further external resource.

Any optional features and details described with respect to apparatus 15 of FIG. 8 may optionally apply to apparatus 17 of FIG. 9. In particular, equivalent reference signs of FIGS. 8 and 9 may represent equivalent functionalities and features.

Embodiments of the third aspect of the invention are described in the following with respect to FIG. 1, FIG. 2, and FIG. 4. Embodiments of the third aspect of the invention may be combined with any of the features and details described with respect to any of the previously described embodiments of FIGS. 1 to 9.

Making reference to FIG. 1, according to embodiments of a first type of the third aspect of the invention, apparatus 16 is configured for determining the predetermined portion 13 based on one or more of

- A temporal layer identifier, e.g., temporal_ID, associated with a picture of the video data stream. The temporal layer identifier identifies a subset of time frames of the video data stream to which subsets of a respective picture belongs,
- One or more layer identifiers associated with a picture of the video data stream.
- A combination of the temporal layer identifier and the layer identifier,
- A time frame identifier,
- A priority level identifier indicating a priority level of a picture,
- The syntax element nal_ref_id of H.264/AVC.

For example, a temporal layer of the video data stream may comprise a subset of time frames of the video data stream, wherein time frames of different temporal layers are interleaved with each other in a temporal order of pictures of the video data stream, e.g., a presentation order among the pictures. Thus, for example, a single temporal layer may represent the video at a first frame rate, while the combination of multiple temporal layers may represent the video at a second frame rate, which is higher than the first frame rate. In other words, the pictures of two temporal layers of the video data stream may be arranged alternatingly in the temporal order of pictures of the video data stream.

As far as the layer identifiers are concerned, a layer identifier identifies a layer of the video data stream, to which layer the picture associated with the layer identifier belongs.

For example, the video data stream may comprise, for a time stamp, e.g., in one access unit, multiple pictures associated with different layers of the video data stream, the pictures of the multiple layers representing the picture of the time stamp in different resolutions or qualities, or providing different perspectives for the time stamp, or providing different types of information.

For example, the video data stream may be a layered video data stream, e.g., comprising multiple layers, e.g., a base layer and one or more enhancement layers, representing the video in different resolutions, or multiple layers representing the video from different perspectives. For example, the layer identifier may refer to the syntax element layer_id in HAV/VVC and to one of, or a combination of the two syntax elements, dependency_id and quality_id in AVC.

The above-mentioned time frame identifier may, for example, indicate a position of the picture, to which the time frame identifier is associated, within a temporal order defined among the pictures, e.g., a presentation order, e.g., referred to as picture order count, POC.

The above-mentioned priority level identifier may refer to the syntax element priority_ID of AVC.

According to an embodiment, apparatus 16 is configured for deriving an indication from the video data stream 14, which indication indicates a manner of determining the predetermined portion 13.

For example, the indication may be part of the verification information 53.

For example, the indication may be signaled in a syntax structure, for example, the first syntax structure. For example, the indication may be signaled in a sample enhancement information message.

According to an embodiment, the indication indicating the manner of determining the predetermined portion 13 differentiates between one or more of

- An indication, which is associated with a time frame, e.g., an access unit, of the video data stream, the indication indicating whether the time frame belongs to the predetermined portion 13,
- The temporal layer identifier,
- The one or more layer identifiers,
- The combination of the temporal layer identifier and the layer identifier,
- The time frame identifier,
- The priority level identifier,
- The NAL_REF_ID of AVC.

In other words, the indication indicating the manner of determining the predetermined portion may indicate which of the above syntax elements or indications is used for determining the predetermined portion.

For example, the indication, which is associated with a time frame of the video data stream, may refer to a dedicated signalization of the predetermined portion, e.g., provided by one or more SEI messages signaled in the video data stream, which SEI messages indicate, which part of the video data stream belongs to the predetermined portion 13. For example, the indication indicating where the time frame belongs to the predetermined portion may be provided by the trustworthy_content_initialization SEI message and/or the trustworthy_content_selection SEI message, e.g., as described below.

For example, apparatus 16 may perform the verification of the video data stream 14 in units of portions, e.g., referred to as substreams, e.g., verification substreams. To this end, apparatus 16 may determine, for each of the verification substreams, a portion of the video data stream, which is used for the verification of the respective verification substream, that is, which is part of the portion subjected to the hash function 31 for the verification of the respective verification substream.

For example, apparatus 16 may decide for each picture of the video data stream or for a subset of the pictures of the video data stream, to which of the one or more verification substreams a respective picture belongs, and include the picture, e.g., coded video payload packets of the picture, to the portion to be subjected to the hash function 31.

According to embodiments, apparatus 16 performs the decision, to which verification substream a picture is to be associated, in dependence on one of the above-mentioned syntax elements/indications.

According to an embodiment, apparatus 16 determines the predetermined portion 13 based on the temporal layer identifier, the layer identifier, or the time frame identifier. According to this embodiment, the apparatus 16 derives a range of values from the video data stream, the range of values indicating values for the respective identifier, i.e., the temporal layer identifier, the layer identifier, or the time frame identifier, which values are associated to the predetermined portion 13. In other words, for example, pictures, for which the respective identifier has a value within the signal range of values belong to the predetermined portion 13.

According to further embodiments of the first type of the third aspect of the invention, apparatus 15 of FIG. 4 may determine, or select, the predetermined portion 13 to be subjected to the hash function 31 based on the same criterion as described with respect to apparatus 16. As far as the indication, which indicates the manner of determining the predetermined portion 13 is concerned, apparatus 15 may provide this indication in the video data stream 14, e.g., in an SEI message, e.g., in the first syntax structure.

According to embodiments of a second type of the third aspect of the invention, apparatus 16 derives an indication (e.g., twci_substream_selection_idc described below) from the video data stream, which indication indicates a manner of determining the predetermined portion 13.

In other words, according to embodiments, apparatus 16 may determine the predetermined portion 13 of the video data stream 14 in dependence on the indication which indicates the manner of determining a predetermined portion.

According to an embodiment, the indication, which indicates the manner of determining the predetermined portion 13 differentiates between one or more of

- an indication, which is associated with a time frame, e.g., an access unit, of the video data stream, the indication indicating whether the time frame belongs to the predetermined portion 13,
- The temporal layer identifier,
- The one or more layer identifiers,
- The combination of the temporal layer identifier and the layer identifier,
- The time frame identifier,
- The priority level identifier,
- The nal_ref_id of AVC.

Details with respect to these indications and identifiers and the way of signaling the indication which indicates the manner of determining the predetermined portion as described with respect to embodiments of the first type of the third aspect of the invention may optionally apply to the second type of embodiments of the third aspect of the invention in an equivalent manner.

In other words, according to an embodiment, the indication which indicates the manner of determining the predetermined portion n is a syntax element, which differentiates between a plurality of modes of determining the predetermined portion.

For example, the plurality of modes may comprise a first mode and/or a second mode. In one embodiment, the plurality of modes may consist of the first mode and the second mode.

Thus, for example, the syntax element which indicates the manner of deriving the predetermined portion may be a flag having exactly two states.

For example, the first mode may be a mode, in which, for a predetermined picture, the decision of whether or not to include the picture into the predetermined portion may depend on an assignment of the picture to one of the layers. In other words, the decision may depend on the layer, e.g., an index of the layer, to which the predetermined picture belongs. For example, the predetermined portion may be associated with one of multiple layers of the video data stream, and if the layer, to which the predetermined picture belongs, corresponds to the layer, which is associated with the predetermined portion, the predetermined picture is included in the predetermined portion, and otherwise, it is not included in the predetermined portion.

For example, the video data stream may be checkable on trustworthiness in units of portions, e.g., referred to as verification substreams, e.g., each of which identified using a substream id, e.g., as in the syntax example provided below. For example, in the first mode, a predetermined picture of the video data stream may be associated with one of the verification substreams, or portions, in dependence on one of the above described attributes of the predetermined picture, such as a layer index or layer identifier of the layer, to which the picture belongs and/or an index or identifier of a temporal layer, to which the picture belongs. For example, in the first mode, the predetermined picture may be assigned to the verification substream associated with the layer and/or temporal layer, to which the predetermined picture belongs.

According to an embodiment, in the second mode, the predetermined picture may be assigned to a predefined one of the plurality of verification substreams, e.g., a default one, e.g., the substream with substream id equal to zero, which may be predetermined portion 13.

As already mentioned above, and as it will be described in more detail below, the video data stream may additionally comprise a dedicated indication for a picture, which indicates the verification substream to which the picture belongs, see, e.g., the content selection SEI message. According to an embodiment, the manner of determining the predetermined portion may depend, in addition to the mode indicated by the indication of the manner of determining the predetermined portion, on the presence of a dedicated indication, such as an SEI message, for the picture. For example, if such a dedicated indication is present for the picture, the picture may be assigned to the verification substream indicated in the dedicated indication, e.g., the substream id indicated in the content selection SEI message present for the picture, and if no such dedicated indication is present, the assignment of the picture to one of the verification substreams may be performed in accordance with the mode indicated by the indication of the manner of determining the predetermined portion, e.g., according to the first mode or the second mode.

In other words, for example, the above-mentioned predetermined picture may be a picture, for which no dedicated identification of the verification substream, to which the picture is associated, is signaled in the data stream.

According to further embodiments of the second type of the third aspect of the invention, apparatus 15 inserts the indication into the video data stream 14, which indication indicates a manner of determining the predetermined portion 13.

For example, apparatus 15 may determine, or select, the predetermined portion according to any of the criterions described with respect to the third aspect of the invention, and apparatus 15 may indicate the manner used for determining the predetermined portion 13 in the video data stream 14.

Embodiments of the fourth aspect of the invention are described in the following.

Figure 10:
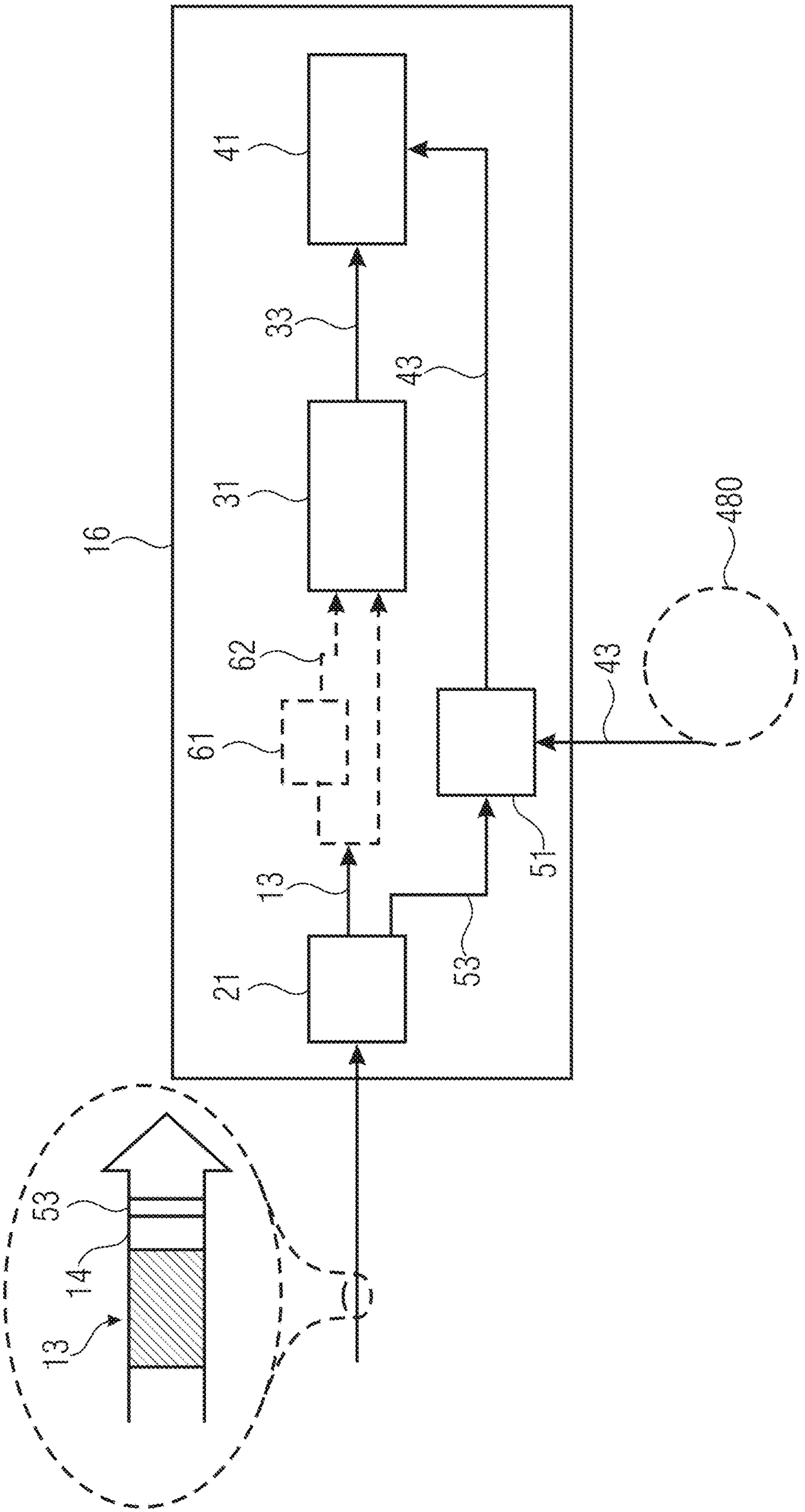
FIG. 10 illustrates an apparatus for checking a video data stream on trustworthiness according to an embodiment of the fourth aspect.

FIG. 10 illustrates an apparatus 16 according to embodiments of the fourth aspect of the invention. Apparatus 16 of FIG. 10 may optionally correspond to apparatus 16 of FIG. 12, that is, any of the features and details described with respect to FIG. 12 may optionally apply to apparatus 16 of FIG. 10.

Apparatus 16 according to FIG. 10 is configured for subjecting a predetermined portion 13 of the video data stream, or data 62 derived therefrom, to a hash function 31 to obtain a hash value 33. For example, according to embodiments of the fourth aspect, the predetermined portion 13 may be a time frame, e.g., coded video associated with one time frame of the video data stream, e.g., the predetermined portion 13 may be an access unit. Apparatus 16 according to FIG. 10 is configured for deriving a digital signature 43 from an external resource 480, e.g., a server. The digital signature 43 may be associated with a predetermined portion 13, that is, e.g., the digital signature 43 may include, or being derived based on a hash value derived from the predetermined portion. Apparatus 16 according to FIG. 10 is configured for checking whether the hash value 33 fits to the digital signature 43 to determine whether the video data stream is trustworthy.

According to embodiments, apparatus 16 is configured for deriving reference to the external resource from the video data stream. For example, apparatus 16 may derive the reference to the external resource 480 from a syntax structure, e.g., the first syntax structure, e.g., an SEI message of the video data stream, for example, the trustworthy_content_initialization SEI message.

Figure 14:
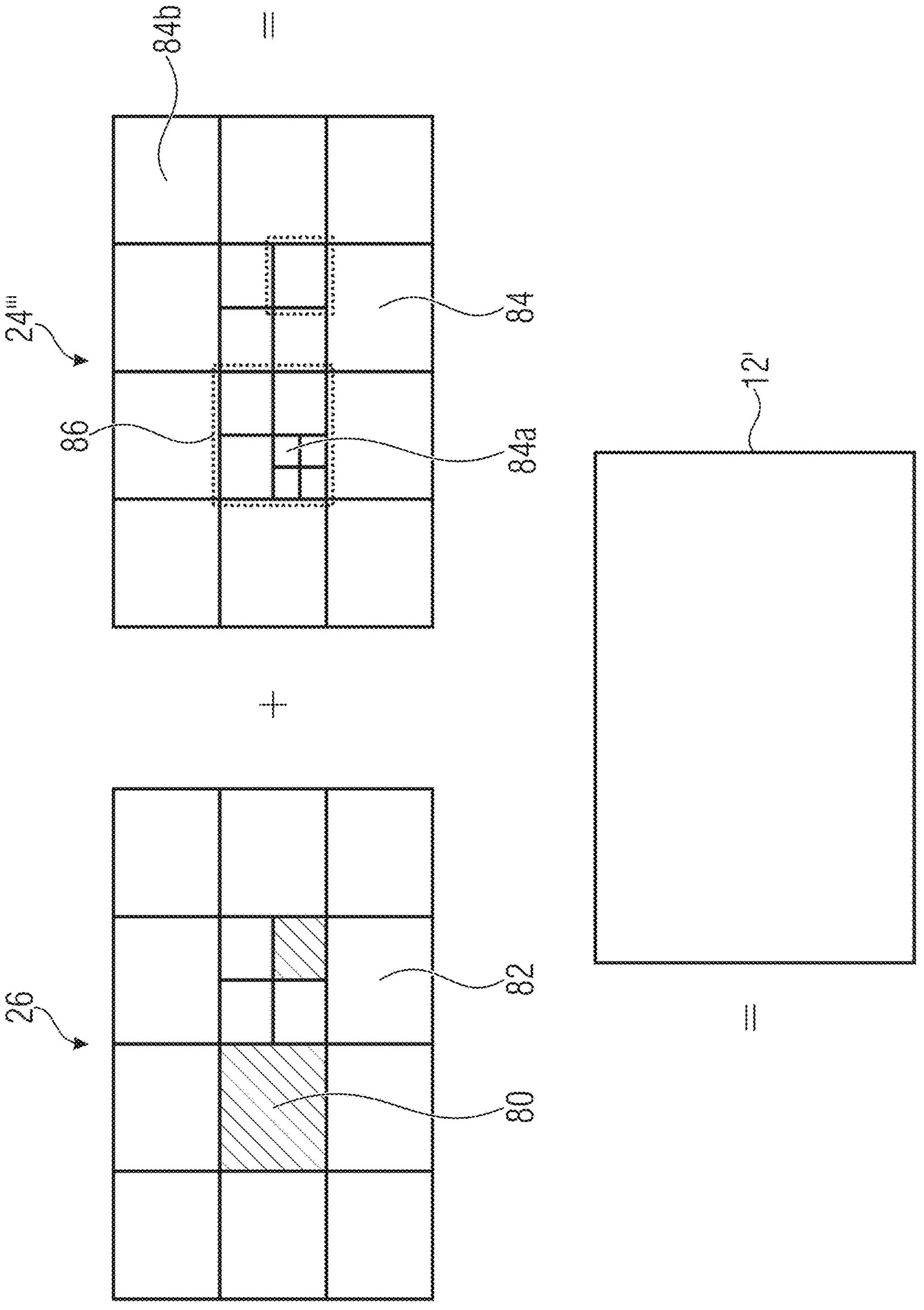
FIG. 14 illustrates block partitions of a picture of a video according to an embodiment.

According to an embodiment, apparatus 16 decrypts the digital signature 43 using a public key of an asymmetric decryption scheme to obtain a check value 47, e.g., as described with respect to decrypting block 46 of FIG. 14. Apparatus 16 may check whether the hash value fits too, or matches, the check value 47, e.g., as described with respect to the verification block 49.

For example, the check value 47 here refers to a portion of a value obtained by decrypting the digital signature 43. For example, the check value may be a portion of the value obtained by decrypting the digital signature, which portion is associated with the predetermined portion 13 of the video data stream 14. In other words, according to embodiments, decrypting the digital signature 43 may yield a value, which is a combination, or concretization of a plurality of hash values obtained from a plurality of portions of the video data stream. In other words, according to embodiments of the fourth aspect, the digital signature 43 stored at the external resource may be a signed version of a combination or concretization of a plurality of hash values each of which is associated with a respective portion of the video data stream. For example, the signing of the combination or concretization of the hash values may be performed without a further hashing, so that the decrypting yields the originally signed combination or concretization of hashes.

According to an embodiment, apparatus 16 derives a portion identifier from the video data stream 14, the portion identifier being associated with the predetermined portion 13. For example, the portion identifier is s a hash identifier or hash index, e.g., twcs_associated_hash_IDX, which identifies a portion of the digital signature, which is associated with the predetermined portion. For example, the portion identifier may be associated with a predetermined portion in the sense that the portion identifier is signaled for the predetermined portion. For example, the portion identifier may be signaled in a syntax structure, e.g., an SEI message, signaled ahead of the predetermined portion, e.g., an access unit, to which the portion identifier refers.

According to an embodiment, apparatus 16 uses the portion identifier for identifying a portion of the check value. In checking whether the hash value fits to the check value, apparatus 16 may check whether the hash value 33 fits to the portion of the check value identified by the portion identifier.

According to an embodiment, apparatus 16 derives a media component identifier, e.g., twcs_associated_hash_group_ID from the video data stream 14, the media component identify indicating a media type of the predetermined portion 13. For example, the media type may be of one of video, audio, subtitles. Apparatus 16 may use the media component identifier for identifying the portion of the check value, i.e., the portion which is compared to the hash value 33 in checking whether the hash value fits to the check value. For example, apparatus 16 may use the media component identifier in addition to the portion identifier for identifying the portion of the check value, which is compared to the hash value 33 to check whether the hash value 33 fits to the check value.

Figure 11:
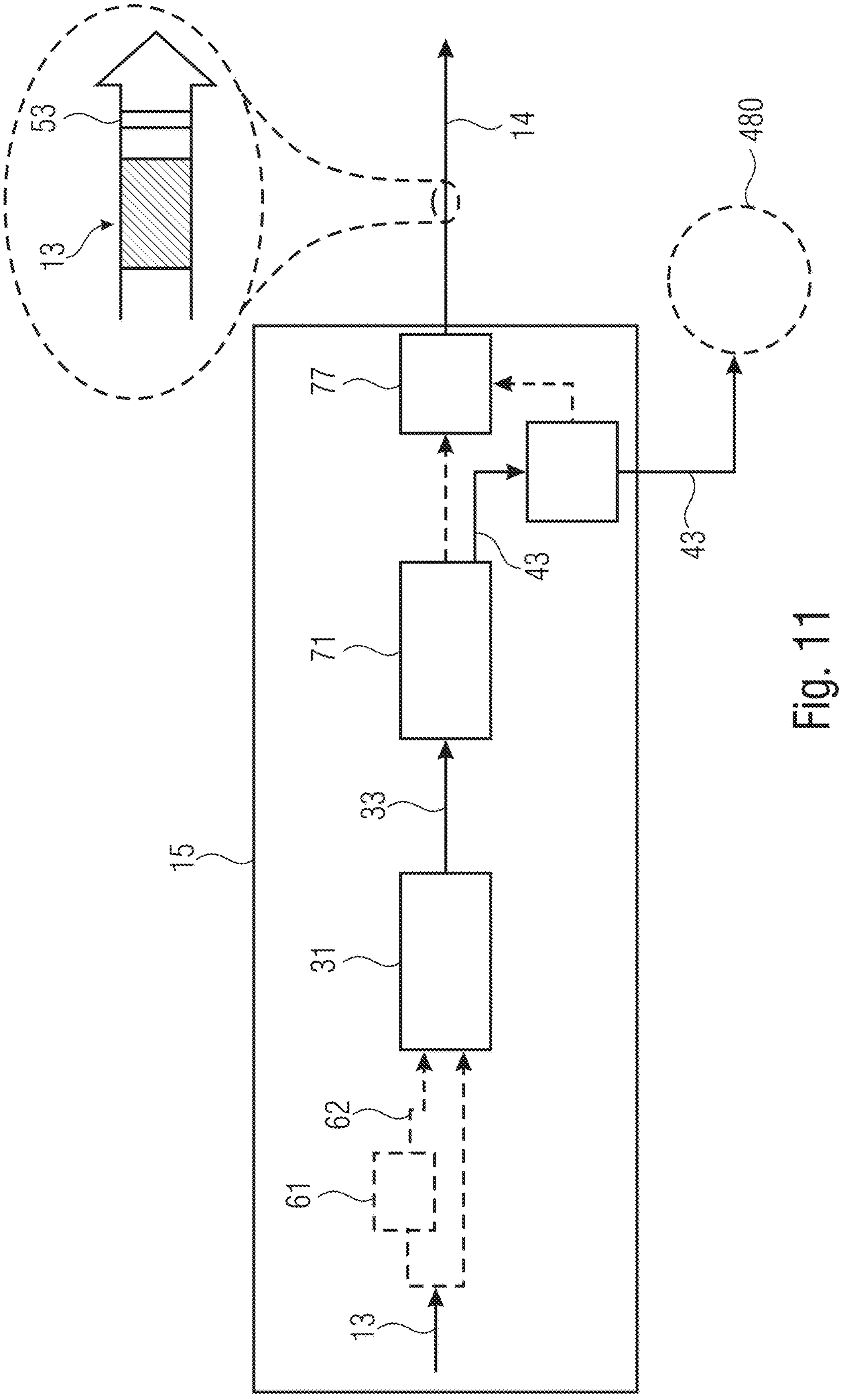
FIG. 11 illustrates an apparatus for rendering a video data stream checkable on trustworthiness according to an embodiment of the fourth aspect.

FIG. 11 illustrates an apparatus 15 according to an embodiment of the fourth aspect of the invention. Apparatus 15 of FIG. 11 may correspond to apparatus 15 of FIG. 4, that is, any of the features and details described with respect to FIG. 4 may optionally apply to the apparatus 15 of FIG. 11.

Apparatus 15 of FIG. 11 is configured for subjecting a predetermined portion 13 of the video data stream, or of data 62 from which the predetermined portion 13 of the video data stream is derived, to a hash function 31 to obtain a hash value 33. Apparatus 15 of FIG. 11 signs the hash value 33 to obtain a digital signature 43, e.g., by use of a private key of an asymmetric encryption scheme. Apparatus 16 provides the digital signature 43 in an external resource 480. Apparatus 16 further asserts indication of the external resource 480 into the video data stream. For example, apparatus 16 may insert a reference to the digital signature 43 on the external resource 480 into the video data stream 14, e.g., a URI of the external resource or the digital signature.

It is noted that the signing of the hash value to obtain the digital signature 43 by apparatus 16 may be optional. Instead, apparatus 16 may provide the hash value 33 to the external resource, and the signing may be performed on the external resource, e.g., a server.

According to embodiments of the fourth aspect, the signing of the hash value 33 may be performed in combination with further hash values, that is, a combination, or concretization, of hash values of a plurality of portions of the video data stream 14 may be formed, and the combination may be jointly assigned to provide the digital signature 43. In that manner, the combination of portions of the video data stream is verifiable. This aspect applies independently of whether the signing is performed by apparatus 15 or by the external resource 480.

Further details and aspects described with respect to the fourth aspect of the invention in relation to apparatus 16 may optionally apply to apparatus 15 in a corresponding manner, e.g., in a sense that apparatus 15 inserts information into video data stream 14, which is derived from the video data stream 14 by apparatus 16.

In the following, aspects of the invention are described again in other words, and specific implementations and further embodiments of the invention will be described. The embodiments described with respect to FIGS. 1 to 11 may be considered generalizations of the embodiments described in the following, however, the following description may further contain additional embodiments of the invention.

Embodiments of the first aspect of the invention may rely on the finding that a first problem arises with the fact that:

1) A media asset might consist of several components: audio, video, subtitles
2) Each of these components might be available at several bitrates, or resolutions, languages Given that, the hashes or signatures cannot be provided for the whole consumed content jointly; i.e. it cannot be provided over the potential different combinations that each different receiver might get (e.g. receiver 1 might consume 4K+English audio, receiver 2 8 k+German, etc.). Validating these different components together is important, since otherwise audio and video of different videos could be mixed and this could lead to faking media.

As a first embodiment, in order to solve this problem, a solution without hashing/signing the different components jointly consist in adding a unique identifier to a SEI message (in the examples below twci_content_uuid in the trustworthy content initialization SEI message) which is a unique identifier for a particular media asset (same for each component such as video, audio, subtitles) that is used during hashing/signing. For instance, once the hash value is computed for a particular set of coded pictures, the hash+the unique identifier is signed together. Alternatively, the hash of a previous or dependent set of coded pictures together with the hash value of current set of coded pictures and a hash method type value and the unique identifier are composed into a string that is signed with the key of the content provider. The further media components use as well the unique identifier similarly.

As an alternative, instead of adding the unique identifier to the SEI message, the unique identifier could be included in the reference that includes the public key (pointer or metadata including the certificate used for signing) and this would be used for computing the hashes or digital signatures as described above.

Embodiments of the second aspect of the invention may rely on the finding that a problem, which arises when transmitting a media stream, is that changes in the transmission chain might be needed.

For instance, if the bandwidth in the network is not enough, a trusted transcoder might need to change the resolution of the video or the bitrate of the video and re-encode it. When this happens, authentication of the original media stream cannot happen, since this might have changed. However, if each entity in the chain is trustworthy, each entity authenticates the incoming data and digitally signs the outgoing data while still providing metadata keeping track of the changes, the receiver could track back all changes and validate with the key of the last entity the data, while still being sure that the data has not been tampered but only "allowed" changes have been performed (e.g., bitrate reduction by transcoding). In the following embodiment an URI is provided that identifies the metadata indicating the changes (e.g. a C2PA Manifest) and further providing within that metadata the certificate of the last signing entity. However, a "man in the middle" could take a stream and link an erroneous on non-authentic link to such a metadata file. A further embodiment, generates and SEI message pointing to that metadata-URI with additionally payload that makes such an SEI unique with a hashed/digitally signed value included into the metadata computed by the unique payload of such an SEI. Note that the link achieved by hashing unique SEI payload being included into the indicated metadata could be optional and indicated by an addition flag in an SEI message (not present in the example below but the Trustworthy content initialization SEI message could include a syntax element twci_payload_hash_in_c2pa_flag).

In the following, an exemplary syntax for implementations of embodiments of the first and the second aspect of the invention is described. Although, these are shown in a joint syntax example, embodiments of the first and second aspects may be implemented independently from each other.

1. 1 Trustworthy Content Initialization SEI Message

1.1.1 Trustworthy Content Initialization SEI Message Syntax

| | Descriptor |
|---|---|
| trustworthy_content_initialization( payloadSize ) { | |
| twci_hash_method_type | u(8) |
| twci_key_source_uri | st(v) |
| twci_num_verification_substreams_minus1 | ue(v) |
| twci_content_uuid_present_flag | u(1) |
| twci_key_retrieval_mode_idc | u(1) |
| if( twci_key_retrieval_mode_idc = = 1) | |
| twci_use_key_register_idx_flag | u(1) |
| if( twci_use_key_register_idx_flag ) | |
| twci_key_register_idx | ue(v) |
| if( twci_content_uuid_present_flag) | |
| twci_content_uuid | b(128) |
| } | |

For example, twci_content_uuid_present_flag should be 1 when mode_idc is 0.

For example, twci_key_retrieval_mode_idc is used to differentiate the modes when the certificate is within a C2PA Manifest Store identified by the URI and when the URI (+idx) identify a certificate directly.

The unique identifier 45 may be signaled using twci_content_uuid. In other words, embodiments of the first aspect may introduce syntax element twci_content_uuid, and optionally, twci_content_uuid_present_flag compared to previous implementations.

The indication 55 described with respect to the second aspect may be signaled by twci_key_source_uri, if twci_key_retrieval_mode_idc=0, optionally in combination with a further syntax element twci_c2pa_hash_idx (see below). Thus, in the above implementation, embodiments of the second aspect may introduce syntax element twci_key_retrieval_mode compared to previous implementations.

Thus, lines 5-7 and 12 of the above syntax may represent changes to previous implementations.

1.1.2 Trustworthy Content Initialization SEI Message Semantics

The trustworthy content initialization SEI message, trustworthy content selection SEI message, and trustworthy content verification SEI message provide a mechanism for verifying that the coded video has been produced by a trustworthy content provider. The trustworthy content initialization SEI message provides information about the secure hash algorithm used for calculating message digests, which are used together with the digital signature present in trustworthy content verification SEI messages to verify the trustworthiness of the VCL NAL units present in the coded video sequence. It further provides information about the digital signature algorithm used and the public key of the content provider. The trustworthy content initialization SEI message may provide the public key of the content provider either by providing an URI that identifies a C2PA Manifest Store that contains the certificate with the public key of the content provider or by providing an URI that directly identifies the certificate.

If any trustworthy content initialization SEI message, trustworthy content selection SEI message, or trustworthy content verification SEI message is present in a coded video sequence, it is a requirement of bitstream conformance that a trustworthy content initialization SEI message is present in the IDR access unit and all access units of the coded video sequence that contain a CRA picture. It is a requirement of bitstream conformance that any trustworthy content selection and trustworthy content verification SEI message in an access unit is preceded by a trustworthy content initialization SEI message.

The trustworthy content initialization SEI message applies to the current coded picture and all following coded pictures until one or more of the following conditions are true:

The bitstream ends.

A new coded video sequence begins.

A new trustworthy content initialization SEI message is received.

twci_hash_method_type indicates the secure hash algorithm that is used to calculate message digests for subsets of VCL NAL units of the coded video sequence. Based on these message digests and the digital signatures present in trustworthy content verification SEI messages, a decoder can verify that the coded video was produced by the content originator indicated by the syntax elements twci_use_key_register_idx_flag, twci_key_source_uri, and, if twci_key_register_idx flag is equal to 1, twci_key_register_idx. The supported values for the syntax element twci_hash_method_type, the block size used for calculating the message digest, and the size of the calculated message digests are specified in Table 1. Values of twci_hash_method_type that are not listed in the table are reserved for future use by ITU-T|ISO/IEC and shall not be present in payload data conforming to this version of this Specification. Decoders shall ignore trustworthy initialization SEI messages that contain reserved values for twci_hash_method_type. The secure hash algorithms listed in Table 1 are specified in the "Secure Hash Standard" FIPS PUB 180-4.

TABLE 1

Supported values of twci_hash_method_type

| twci_hash_method_type | Hash method | Block size (bits) | Message digest size (bits) |
|---|---|---|---|
| 0 | SHA-1 | 512 | 160 |
| 1 | SHA-224 | 512 | 224 |
| 2 | SHA-256 | 512 | 256 |
| 3 | SHA-384 | 1024 | 384 |
| 4 | SHA-512 | 1024 | 512 |
| 5 | SHA-512/224 | 1024 | 224 |
| 6 | SHA-512/256 | 1024 | 256 |

twci_num_verification_substreams_minus1 plus 1 indicates the number of substreams for which message digests are calculated and signatures may be present in following trustworthy content verification SEI messages.

The variable NumVerificationSubstream is derived as:

NumVerificationSubstream=twci_num_verification_substreams_minus1+1.

Twci_use_key_register_idx_flag equal to 1 indicates that the URI contained in twci_key_source_uri specifies a register of certificates and the syntax element twci_key_register_idx is present in the SEI message. twci_use_key_register_idx_flag equal to 0 indicates that the URI contained in twci_key_source_uri specifies a certificate and the syntax element twci_key_register_idx is not present in the SEI message.

twci_content_uuid_present_flag equal to 1 specifies that the syntax element twci_content_uuid is present. twci_content_uuid_present_flag equal to 0 specifies that the syntax element twci_content_uuid is not present.

twci_key_source_uri contain a URI with syntax and semantics as specified in IETF Internet Standard 66. If twci_use_key_register_idx_flag is equal to 0, the URI identifies the certificate of the content provider that can be used for verifying the signatures present in following trustworthy verification SEI messages; otherwise (if twci_use_key_register_idx_flag is equal to 1), the URI identifies a register of certificates and the certificate of the content provider that can be used for verifying the signatures present in following trustworthy verification SEI messages is indicated by twci_key_register_idx.

twci_key_retrieval_mode_idc equal to 0 indicates that the URI contained in twci_key_source_uri specifies a C2PA Manifest Store as specified in C2PA Technical Specification. twci_key_retrieval_mode_idc equal to 1 indicates that the URI contained in twci_key_source_uri and, when present, twci_key_register_idx specify a certificate.

twci_c2pa_hash_idx, when present, contains an index that specifies the entry in the c2pa.hash.data of the Active Manifest, as specified in C2PA Technical Specification, associated with the current trustworthy content initialization SEI message.

When twci_key_retrieval_mode_idc equal to 0, the media asset for which Active Manifest, as specified in C2PA Technical Specification, provides content binding is the trustworthy content initialization SEI message. The following constraints apply to the C2PA Manifest Store identified by the twci_key_source_uri:

The Active Manifest shall contain exactly one c2pa.hash.data, as specified in C2PA Technical Specification, hard binding to content assertion.

For example, this allows verifying the UUID of the SEI that is used for signing the VCL NAL units.

The exclusion range indicated in the c2pa.hash.data shall match the twci_key_source_uri bytes in the trustworthy content initialization SEI message.

For example, by not hashing the URI one could modify the location of the manifest without having to change the Manifest.

twci_key_register_idx contains an index that specifies the certificate of the content provider, in the certificate register indicated by twci_key_source_uri, which can be used for verifying the signatures present in following trustworthy verification SEI messages.

The certificate indicated by the syntax elements twci_key_retrieval_mode_idc, twci_use_key_register_idx_flag, twci_key_source_uri, and, if twci_use_key_register_idx_flag is equal to 1, twci_key_register_idx shall specify a digital signature method, with associated parameters (if applicable), and the public key of the content provider.

When twci_key_retrieval_mode_idc is equal to 1, the format in which this information is provided is outside the scope of this specification. It is suggested that a digital signature algorithm conforming to the "Digital Signature Standard" FIPS 186-5 is used.

twci_content_uuid, when present, indicates an identifier for the video content and shall have a value specified as a UUID according to the procedures of ISO/IEC 11578:1996, Annex A.

When a trustworthy content initialization SEI message is received, the calculation of NumVerificationSubstream message digests is initialized according to the specification in FIPS PUB 180-4 for the specified twci_hash_method_type. Each VCL NAL unit following the trustworthy content initialization SEI message is associated to one of the NumVerificationSubstream message digests; the verification substream id is either indicated by the trustworthy content selection SEI message or, if no trustworthy content selection SEI message is present for a coded picture, inferred to be equal to 0. The message used for calculating the k-th message digest, with k being in the range from 0 to twci_num_verification_substreams_minus1, inclusive, is obtained by concatenating all VCL NAL units associated with the k-th verification substream. The calculation of the message digests is conducted based on blocks, where the block size is specified in Table 1 depending on the value of twci_hash_method_type. For each VCL NAL unit, the associated message digest is updated according to the algorithm specified in FIPS PUB 180-4 for the specified twci_hash_method_type. Note that, since the message digests are calculated for the concatenation of all VCL NAL units for a verification substream, some of the processing blocks typically span over two or more successive VCL NAL units.

1.2 Trustworthy Content Selection SEI Message

1.2.1 Trustworthy Content Selection SEI Message Syntax

| | Descriptor |
|---|---|
| trustworthy__content__selection( payloadSize ) { | |
| twcs__verification__substream__id | ue(v) |
| } | |

1.2.2 Trustworthy Content Selection SEI Message Semantics

The trustworthy content selection SEI message provides a mechanism for associating coded pictures with one of the verification substreams indicated in a trustworthy content initialization SEI message.

It is a requirement of bitstream conformance that any trustworthy content selection SEI message is preceded by a trustworthy content initialization SEI message in the same coded video sequence.

twcs_verification_substream_id indicates the verification substream to which the VCL NAL units of the current coded picture are assigned to. When a trustworthy content initialization SEI message was present in the current coded video sequence, but no trustworthy content selection SEI message is present for a coded picture, the value of twcs_verification_substream_id is inferred to be equal to 0. The value of twcs_verification_substream_id shall from 0 be in the range to twci_num_verification_substreams_minus1, inclusive.

As specified in section 1.1.2, the message digest for the verification substream with id equal to twcs_verification_substream_id is updated with the VCL NAL units of the current coded picture according to the twci_hash_method_type specified in the preceding trustworthy content initialization SEI message.

1.3 Trustworthy Content Verification SEI Message

1.3.1 Trustworthy Content Verification SEI Message Syntax

| | Descriptor |
|---|---|
| trustworthy__content__verification( payloadSize ) { | |
| twcs__verification__substream__id | ue(v) |
| twcv__signature__length__in__octets__minus1 | ue(v) |
| twcv__signature | u(v) |
| } | |

1.3.2 Trustworthy Content Verification SEI Message Semantics

The trustworthy content verification SEI message provides a mechanism for verifying the trustworthiness of video content.

It is a requirement of bitstream conformance that any trustworthy content verification SEI message is preceded by a trustworthy content initialization SEI message in the same coded video sequence.

When the coded video sequence includes a trustworthy content initialization SEI message, it is a requirement of bitstream conformance that the last coded picture of a verification substream in the coded video sequence is associated with a trustworthy content verification SEI message.

twcs_verification_substream_id indicates the verification substream to which the SEI message applies.

twcv_signature_length_in_octets_minus1 plus 1 specifies the length of the syntax element twcv_signature in octets (one octet consists of 8 bits).

twcv_signature contains the digital signature for the verification substream indicated by twcs_verification_substream_id, which is either transmitted in a trustworthy content selection SEI message preceding the trustworthy content verification SEI message in the same access unit or inferred to be equal to 0.

With VerificationSubstreamId being the value of twcs_verification_substream_id associated with the trustworthy content verification SEI message, the verification consists of the following ordered steps:

1. The calculation of the message digest referred to as CurrDigest is finalized as follows:
   The concatenation of the VCL NAL units for the verification substream with id equal to VerificationSubstreamId is padded according to the specification in FIPS PUB 180-4. Note that it is sufficient to pad the last VCL NAL unit of the verification substream.
   The calculation of the message digest CurrDigest is finalized according to the specification in FIPS PUB 180-4. The length (in bits) of the message digest is given in Table 1.
2. The reference message digest RefDigest is determined as follows:
   If VerificationSubstreamId is greater than 0, the reference message digest RefDigest is the last calculated message digest for the verification substream with id equal to VerificationSubstreamId−1. It is a requirement of bitstream conformance that any trustworthy content verification SEI associated with verification substream id equal to VerificationSubstreamId−1 is present before the trustworthy content verification SEI message with verification substream id equal to VerificationSubstreamId.

Otherwise, if the current trustworthy content verification SEI message is the first trustworthy content verification SEI with verification id equal to 0 in the coded video sequence and the preceding coded video sequence did not contain any trustworthy content initialization SEI message (this includes the case that the current coded video sequence is the first coded video sequence in the bitstream), the RefDigest is set equal to a bitstring that consists of DigestSize bits equal to 1, where DigestSize is the size of the message digest as specified in Table 1.

Otherwise, the reference message digest RefDigest is the last calculated message digest for the verification substream with id equal to 0.

3. The identification string IdString is constructed by concatenating the binary representations of the reference message digest RefDigest, the current message digest, and the twci_hash_method_type and, when present, the twci_content_uuid as illustrated in FIG. 15. The number of bits for RefDigest is determined by the value of twci_hash_method_type which was valid when calculating the value of RefDigest, the number of bits for CurrDigest is determined by the current value of twci_hash_method_type, the value of twci_hash_method_type is represented with 8 bits and, when present, the value of twci_content_uuid is represented with 128 bits.

4. The identification string IdString represents the message used for verifying the signature. The signature verification algorithm and the public key used for verifying the signature are indicated by the syntax elements twci_use_key_register_idx_flag, twci_key_source_uri, and, if twci_use_key_register_idx_flag is equal to 1, twci_key_register_idx.

NOTE 1—Since the bitstring used for signature verification includes the RefDigest, it cannot only be verified that the VCL NAL units used for calculated the current message digest are correct, but it can additionally be verified that neither additional VCL NAL units were added to the bitstream nor VCL NAL units were removed from the bitstream.

NOTE 2—When a decoder tunes into a bitstream, the IdString constructed for the first trustworthy content verification SEI message cannot be verified, because the value of RefDigest cannot be calculated correctly. But starting from the second trustworthy content verification SEI message, the signatures can be verified.

After verification, the message digest for the verification substream with id equal to VerificationSubstreamId is reinitialized according to the specification in FIPS PUB 180-4 for the specified twci_hash_method_type.

Embodiments of the third aspect of the invention rely on the finding that a third problem is how to identify which coded pictures are used for a particular hash/digital signature value. Identifying coded pictures used for a particular hash/digital signature can require a high overhead if an indication needs to be sent per picture The association of NAL units to substreams that are hashed/digitally signed can be achieved by:

Default: If no association is indicated, a pre-selected substream is used, e.g. the substream with ID 0.

Prefix SEI: a "substream selection" SEI is signalled for each access unit, which contains the ID of the substream to be used.

When a single bitstream is used, no indication needs to be sent since a single substream would be used. However, if substreams would be generated for each temporal layer or scalable layer, many coded pictures would require a substream indication. As a further embodiment, a more compact indication that does not require sending a indication per picture could be performed by sending for a group of pictures (e.g., all pictures in a CVS or all pictures for the current picture onwards up to a new indication) an indication that binds temporal layers, scalable layer or combinations thereof to substreams.

For instance, in the following an idc indication is shown.

| | Descriptor |
|---|---|
| trustworthy_content_initialization( payloadSize ) { | |
| twci_hash_method_type | u(8) |
| twci_num_verification_substreams_minus1 | ue(v) |
| twci_substream_selection_idc | ue(v) |
| twci_use_key_register_idx_flag | u(1) |
| twci_key_source_uri | st(v) |
| if( twci_use_key_register_idx_flag ) | |
| twci_key_register_idx | ue(v) |
| } | |

twci_substream_selection_idc indicates how the VCL NAL units are associated with substreams.

TABLE A

Supported values of twci_substream_selection_idc

| twci_substream_selection_idc | Used selection method |
|---|---|
| 0 | When a TWC selection SEI message is present in the each access unit, the syntax element twcs_verification_substream_id is used to select the substream. Otherwise twcs_verification_substream_id is inferred equal to 0. |
| 1 | substream_id is inferred equal to the value of temporal_id. |
| 2 | substream_id is inferred equal to the value of layer_id. |
| 3 | In case of H.264/AVC dependency_id is used. |
| 4 | In case of H.264/AVC DQId is used. |
| 5 | In case of H.264/AVC priority_id is used |

In case of H.264 dependency_id, DQId and priority_id, these syntax elements and variables are defined in the NAL unit header SVC extension. If the NAL unit header SVC extension is not available in the bitstream, the default substream (e.g. ID 0) is used. Further values could be used such as:

TABLE A

Supported values of twci_substream_selection_idc

| twci_substream_selection_idc | Used selection method |
|---|---|
| 0 | TWC selection SEI messages are present in each access unit. The substream is indicated by twcs_verification_substream_id. |
| 1 | When a TWC selection SEI message is present in the each access unit, the syntax element twcs_verification_substream_idis used to select the substream. Otherwise twcs_verification_substream_id is inferred equal to 0. |

TABLE A-continued

| Supported values of twci_substream_selection_idc | |
|---|---|
| twci_substream_selection_idc | Used selection method |
| 2 | substream_id is inferred equal to the value of temporal_id. |
| 3 | substream_id is inferred equal to the value of layer_id. |
| 4 | A combination of temporal_id and layer_id is used. |
| 5 | In case of H.264/AVC, nal_ref_idc is used. |
| 6 | In case of H.264/AVC dependency_id is used. |
| 7 | In case of H.264/AVC DQId is used. |
| 8 | In case of H.264/AVC priority_id is used |

Temporal Layer ID (temporal_id) for temporal scalability

The substream is inferred directly from the signalled temporal sublayer, e.g. the value of temporal_id is used.

Layer ID (layer_id) for spatial scalability, multi-view or SNR scalability

The substream is inferred directly from the signalled (spatial, SNR, multi-view, 3D) layer, e.g. the value of layer_id is used.

A combination of Layer ID and temporal ID

The substream is inferred directly from the signalled temporal sub-layer and the (spatial, SNR, multi-view, 3D) layer, e.g. the value of N*layer_id+temporal_id is used, where N is the maximum allowed number of temporal sublayers.

Dependency ID/DQId for H.264/AVC

The substream is inferred directly from the signalled Dependency ID or the calculated DQId value in H.264/AVC. If the NAL unit header SVC extension is not available in the bitstream, the default substream (e.g. ID 0) is used.

nal_ref_idc for H.264/AVC

The substream is inferred directly from the signalled nal_ref_idc value in H.264/AVC.

priority_id for H.264/AVC

The substream is inferred directly from the signalled priority_id value in H.264/AVC. If the NAL unit header SVC extension is not available in the bitstream, the default substream (e.g. ID 0) is used.

As an alternative a range could be provided for different substream ids for each of the modes (shown only for temporal ids and layers id-same applies for further modes and even combinations thereof for particular idc-s):

| | Descriptor |
|---|---|
| trustworthy_content_initialization( payloadSize ) { | |
| twci_hash_method_type | u(8) |
| twci_num_verification_substreams_minus1 | ue(v) |
| twci_substream_grouping_idc | ue(v) |
| if( twci_substream_grouping_idc = = 1 ){ // temporal ids | |
| for( i = 0; i < twci_num_verification_substreams_minus1 + 1; i++ ) { | |
| twci_substream_min_temporal_id[ i ] | u(3) |
| twci_substream_max_temporal_id[ i ] | u(3) |
| } | |
| } | |
| if( twci_substream_grouping_idc = = 2 ){// layer ids | |
| for( i = 0; i < twci_num_verification_substreams_minus1 + 1; i++ ) { | |
| twci_substream_min_layer_id[ i ] | u(5) |
| twci_substream_max_layer_id[ i ] | u(5) |
| } | |
| } | u(1) |
| twci_key_source_uri | st(v) |
| if( twci_use_key_register_idx_flag ) | |
| twci_key_register_idx | ue(v) |
| } | |

A similar problem arises when indicating the span of substreams in time domain, i.e. how many pictures are used for a particular segment/chunk used for computing a hash/digital signature. Instead of providing such an indication for each picture, in a further embodiment the content initialization SEI message could indicate a mode for defining which pictures are used for computing it. An example is shown in the following where POC is used for this purpose based on the previous semantics.

| | Descriptor |
|---|---|
| trustworthy_content_initialization( payloadSize ) { | |
| twci_hash_method_type | u(8) |
| twci_num_verification_substreams_minus1 | ue(v) |
| twci_substream_selection_idc | ue(v) |
| twci_use_key_register_idx_flag | u(1) |
| twci_key_source_uri | st(v) |
| if( twci_use_key_register_idx_flag ) | |
| twci_key_register_idx | ue(v) |
| } | |

twci_substream_selection_idc indicates how the VCL NAL units are associated with substreams.

TABLE A

| Supported values of twci_substream_selection_idc | |
|---|---|
| twci_substream_selection_idc | Used selection method |
| 0 | TWC selection SEI messages are present in each access unit. The substream is indicated by twcs_verification_substream_id. |
| 1 | When a TWC selection SEI message is present in the each access unit, the syntax element twcs_verification_substream_idis used to select the substream. Otherwise twcs_verification_substream_id is inferred equal to 0. |
| 2 | POC is used to select the substream. |
| 3 | substream_id is inferred equal to the value of temporal_id. |
| 4 | substream_id is inferred equal to the value of layer_id. |
| 5 | A combination of temporal_id and layer_id is used. |
| 6 | In case of H.264/AVC, nal_ref_idc is used. |
| 7 | In case of H.264/AVC dependency_id is used. |

TABLE A-continued

| Supported values of twci_substream_selection_idc | |
|---|---|
| twci_substream_selection_idc | Used selection method |
| 8 | In case of H.264/AVC DQId is used. |
| 9 | In case of H.264/AVC priority_id is used |

If POC mapping is used, a list is signalled in the "initialization" SEI message. The list contains POC ranges and their association with a substream. An example syntax is shown below.

| | Descriptor |
|---|---|
| trustworthy_content_initialization( payloadSize ) { | |
| twci_hash_method_type | u(8) |
| twci_num_verification_substreams_minus1 | ue(v) |
| twci_substream_selection_idc | ue(v) |
| if (twci_substream_selection_idc == POC) { | |
| num_poc_mappings | ue(v) |
| for (i=0; i<num_poc_mappings; i++) { | |
| target_substream[i] | ue(v) |
| start_poc[i] | ue(v) |
| end_poc[i] | ue(v) |
| } | |
| } | |
| twci_use_key_register_idx_flag | u(1) |
| twci_key_source_uri | st(v) |
| if( twci_use_key_register_idx_flag ) | |
| twci_key_register_idx | ue(v) |
| } | |

Start and end POC can be transmitted as absolute values, or as relative difference, e.g.

| | Descriptor |
|---|---|
| trustworthy_content_initialization( payloadSize ) { | |
| twci_hash_method_type | u(8) |
| twci_num_verification_substreams_minus1 | ue(v) |
| twci_substream_selection_idc | ue(v) |
| if (twci_substream_selection_idc == POC) { | |
| num_poc_mappings | ue(v) |
| for (i=0; i<num_poc_mappings; i++) { | |
| target_substream[i] | ue(v) |
| start_poc[i] | ue(v) |
| end_poc_diff[i] | ue(v) |
| } | |
| } | |
| twci_use_key_register_idx_flag | u(1) |
| twci_key_source_uri | st(v) |
| if( twci_use_key_register_idx_flag ) | |
| twci_key_register_idx | ue(v) |
| } | |

An alternative signalling is as follows:

In each list entry, only the end POC is signalled. The start POC is inferred to be equal to the end POC of the previous list entry plus 1. In the first list entry the start POC is inferred equal to 0.

| | Descriptor |
|---|---|
| trustworthy_content_initialization( payloadSize ) { | |
| twci_hash_method_type | u(8) |
| twci_num_verification_substreams_minus1 | ue(v) |
| twci_substream_selection_idc | ue(v) |
| if (twci_substream_selection_idc == POC) { | |
| num_poc_mappings | ue(v) |
| for (i=0; i<num_poc_mappings; i++) { | |
| target_substream[i] | ue(v) |
| end_poc [i] | ue(v) |
| } | |
| } | |
| twci_use_key_register_idx_flag | u(1) |
| twci_key_source_uri | st(v) |
| if( twci_use_key_register_idx_flag ) | |
| twci_key_register_idx | ue(v) |
| } | |

Embodiments of the fourth aspect of the invention rely on the finding that a further problem is digitally signing together two "segments" for avoiding removal of parts of the media or adding additional media leads to a problem in adaptive bitrate streaming.

Adaptive bitrate streaming (e.g. DASH) is currently performed by encoding several versions of the content and leading the receiver decide, at each segment, which version to download. When the encoded media contains already signatures that span over more than one segments (at each of the version), when the client changes from one version to another the hashes/signatures that span over that switch for two segments will not match with the one computed at the client.

An alternative to jointly signing the hashes of the segments together for avoiding segment removal or insertion or changing the order consists of computing hashes of each segment separately and storing them externally into some metadata (e.g. as C2PA does in a C2PA manifest). Those hashes are then signed within the manifest and can be used for comparing the computed hash with the corresponding value in the manifest.

However, since a video coding streaming is not a file, the identification of the corresponding hash would require some mapping. As a further embodiment the information is included in the video stream to assign a value that expresses the index of the hash value in the additional metadata to which the NAL units are associated.

| | Descriptor |
|---|---|
| trustworthy_content_selection( payloadSize ) { | |
| twcs_associated_hash_idx | ue(v) |
| } | |

In some cases, hashes for different types of media (e.g. video, audio) might be stored in the same metadata and therefore, some identifier would be required as well for identifying which hashes should be used (twcs_associated_hash_group_id in the example below—with for instance a value of 0 for audio and 1 for video when hashes for both streams are stored in the same C2PA manifest). An example is shown in the following.

| | Descriptor |
|---|---|
| trustworthy_content_selection( payloadSize ) { | |
| twcs_associated_hash_group_id | ue(v) |
| twcs_associated_hash_idx | ue(v) |
| } | |

Note that this alternative does not required to send the signatures within the stream in a SEI message as they are stored in an external metadata but can only be done for video on demand, since in a live scenario it would not be possible to store all hashes and refer to them in the external metadata as they are being computed as the content is encoded and sent.

In the following, a video coding scheme will be described, into which embodiments of the invention may optionally be implemented. In other words, decoder 20 of FIG. 14 may optionally be implemented according to any of the embodiments of decoder 20 described in the following. Similarly, apparatus 15 may optionally be an encoder according to any of the embodiments of encoder 10 that will be described in the following.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIG. 12, FIG. 13, and FIG. 14. Thereinafter the description of embodiments of the concept of the present invention is presented along with a description as to how such concepts could be built into the encoder and decoder of FIG. 12, and FIG. 13, respectively, although the embodiments described with the subsequent Figures and following, may also be used to form encoders and decoders not operating according to the coding framework underlying the encoder and decoder of FIG. 12, and FIG. 13 and FIG. 14.

Figure 12:
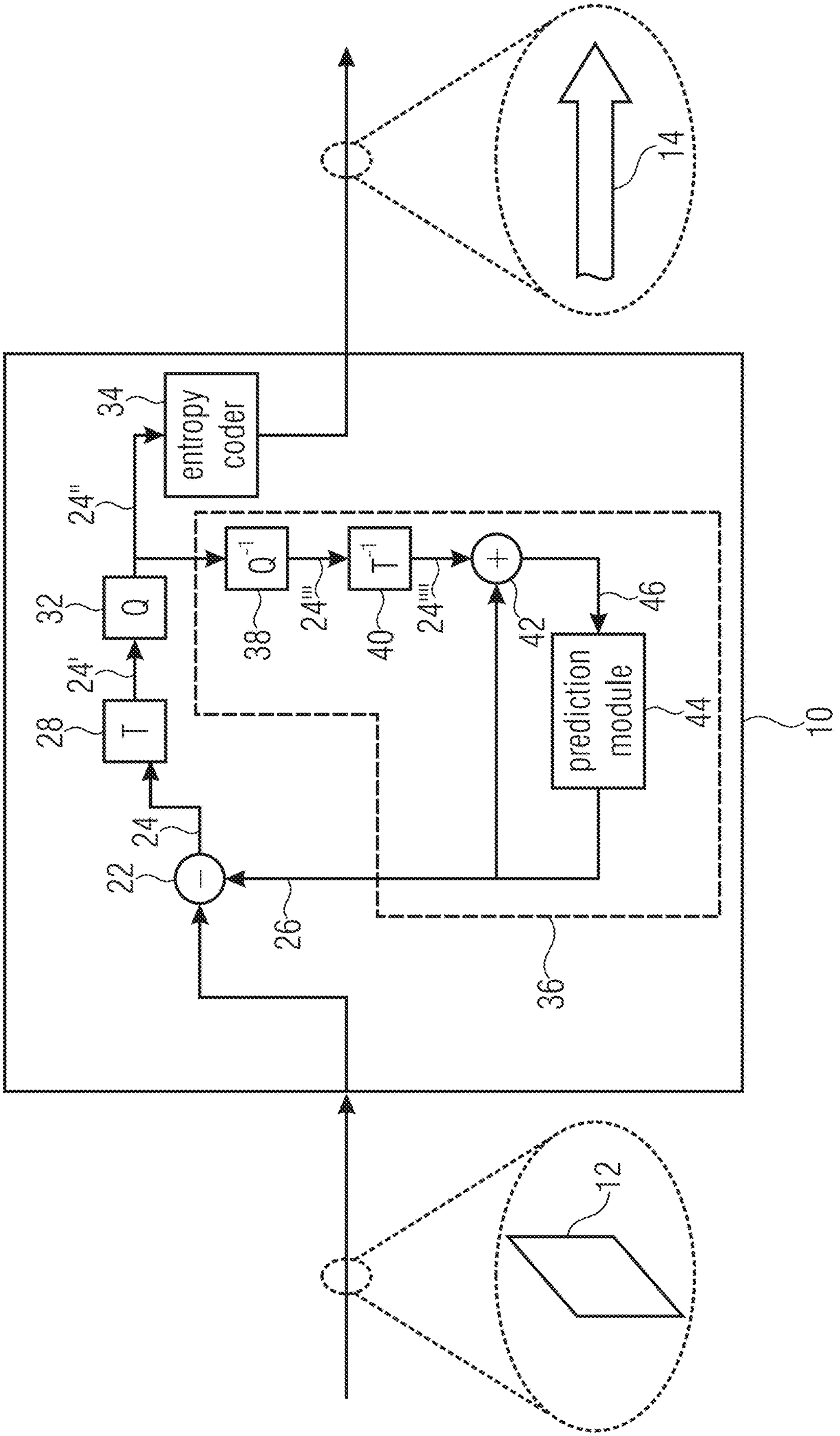
FIG. 12 illustrates a video encoder according to an embodiment.
Figure 13:
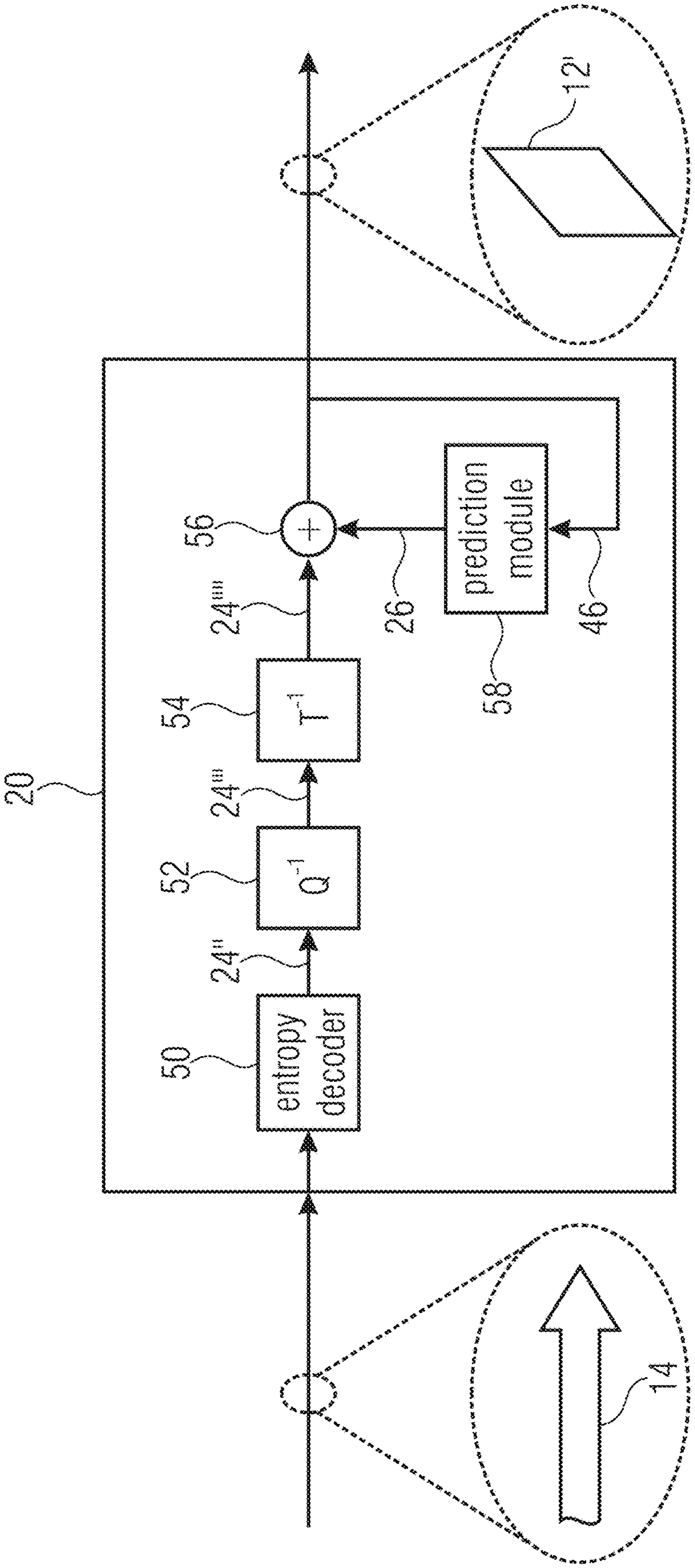
FIG. 13 illustrates a video decoder according to an embodiment.

FIG. 12 shows an apparatus for predictively coding a picture 12 into a data stream 14 exemplarily using transform-based residual coding. The apparatus, or encoder, is indicated using reference sign 10. FIG. 13 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 12 and FIG. 13 exemplarily use transform based prediction residual coding, although embodiments of the present application are not restricted to this kind of prediction residual coding. This is true for other details described with respect to FIG. 12, and FIG. 13, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24'' is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24'' encoded into, and decodable from, data stream 14. To this end, the prediction stage 36 may internally, as is shown in FIG. 12, comprise a dequantizer 38 which dequantizes prediction residual signal 24'' so as to gain spectral-domain prediction residual signal 24'', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'', which corresponds to the original prediction residual signal 24 except for quantization loss. A combiner 42 of the prediction stage 36 then recombines, such as by addition, the prediction signal 26 and the prediction residual signal 24'' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 13, may be internally composed of components corresponding to, and interconnected in a manner corresponding to, prediction stage 36. In particular, entropy decoder 50 of decoder 20 may entropy decode the quantized spectral-domain prediction residual signal 24'' from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24'' so that, as shown in FIG. 13, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

FIG. 14 illustrates the relationship between the reconstructed signal, i.e. the reconstructed picture 12', on the one hand, and the combination of the prediction residual signal 24" as signaled in the data stream 14, and the prediction signal 26, on the other hand. As already denoted above, the combination may be an addition. The prediction signal 26 is illustrated in FIG. 14 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 14 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24" in FIG. 14 is also illustrated as a subdivision of the picture area into blocks 84. These blocks might be called transform blocks in order to distinguish same from the coding blocks 80 and 82. In effect, FIG. 14 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 14 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 14 further illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 14, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform

DST-IV, where DST stands for Discrete Sine Transform

DCT-IV

DST-VII

Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)

Inverse DST-IV

Inverse DCT-IV

Inverse DST-VII

Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIG. 12, FIG. 13 and FIG. 14 have been presented as an example where the inventive concept described further below may be implemented in order to form specific examples for encoders and decoders according to the present application. Insofar, the encoder and decoder of FIG. 12, and FIG. 13, respectively, may represent possible implementations of the encoders and decoders described herein below. FIG. 12, and FIG. 13 are, however, only examples. An encoder according to embodiments of the present application may, however, perform block-based encoding of a picture 12 using the concept outlined in more detail below and being different from the encoder of FIG. 12 such as, for instance, in that same is no video encoder, but a still picture encoder, in that same does not support inter-prediction, or in that the sub-division into blocks 80 is performed in a manner different than exemplified in FIG. 14. Likewise, decoders according to embodiments of the present application may perform block-based decoding of picture 12' from data stream 14 using the coding concept further outlined below, but may differ, for instance, from the decoder 20 of FIG. 13 in that same is no video decoder, but a still picture decoder, in that same does not support intra-prediction, or in that same sub-divides picture 12' into blocks in a manner different than described with respect to FIG. 14 and/or in that same does not derive the prediction residual from the data stream 14 in transform domain, but in spatial domain, for instance.

Different examples for coding residual blocks and their transform blocks, respectively, which represent the spatial residual blocks in transform domain, are presented below. The codec may support merely one of them, but it may also be that the video data stream contains entropy coding mode indicator indicating whether a prediction residual data of a residual block is to be decoded from the video data stream using a context adaptive variable length coding mode, or using a context adaptive binary arithmetic coding mode with examples of these modes being derivable from the subsequent description.

Context-Based Adaptive Variable Length Coding (CAVLC)

This is the method used to encode residual, zig-zag ordered 4×4 (and 2×2) blocks of transform coefficients. CAVLC is designed to take advantage of several characteristics of quantized 4×4 blocks:

1. After prediction, transformation and quantization, blocks are typically sparse (containing mostly zeros). CAVLC uses run-level coding to compactly represent strings of zeros.
2. The highest non-zero coefficients after the zig-zag scan are often sequences of +/−1. CAVLC signals the number of high-frequency+/−1 coefficients ("Trailing 1s" or "T1s") in a compact way.
3. The number of non-zero coefficients in neighbouring blocks is correlated. The number of coefficients is encoded using a look-up table; the choice of look-up table depends on the number of non-zero coefficients in neighbouring blocks.
4. The level (magnitude) of non-zero coefficients tends to be higher at the start of the reordered array (near the DC coefficient) and lower towards the higher frequencies. CAVLC takes advantage of this by adapting the choice of VLC look-up table for the "level" parameter depending on recently-coded level magnitudes.

CAVLC encoding of a block of transform coefficients proceeds as follows.

1. Code the Number of Coefficients and Trailing Ones (Coeff_Token).

The first VLC, coeff_token, encodes both the total number of non-zero coefficients (TotalCoeffs) and the number of trailing+/−1 values (T1). TotalCoeffs can be anything from 0 (no coefficients in the 4×4 block) 1 to 16 (16 non-zero coefficients). T1 can be anything from 0 to 3; if there are more than 3 trailing+/−1s, only the last 3 are treated as "special cases" and any others are coded as normal coefficients. Note: coded_block_pattern (described earlier) indicates which 8×8 blocks in the macroblock contain nonzero coefficients; however, within a coded 8×8 block, there may be 4×4 sub-blocks that do not contain any coefficients, hence TotalCoeff may be 0 in any 4×4 sub-block. In fact, this value of TotalCoeff occurs most often and is assigned the shortest VLC.

There are 4 choices of look-up table to use for encoding coeff_token, described as Num-VLC0, Num-VLC1, Num-VLC2 and Num-FLC (3 variable-length code tables and a fixed-length code). The choice of table depends on the number of non-zero coefficients in upper and left-hand previously coded blocks Nu and NL. A parameter N is calculated as follows:

If blocks U and L are available (i.e. in the same coded slice), N=(Nu+NL)/2

If only block U is available, N=NU; if only block L is available, N-NL; if neither is available, N=0.

N selects the look-up table (Table 34) and in this way the choice of VLC adapts depending on the number of coded coefficients in neighbouring blocks (context adaptive). Num-VLC0 is "biased" towards small numbers of coefficients; low values of TotalCoeffs (0 and 1) are assigned particularly short codes and high values of TotalCoeff particularly long codes. Num-VLC1 is biased towards medium numbers of coefficients (TotalCoeff values around 2-4 are assigned relatively short codes), Num-VLC2 is biased towards higher numbers of coefficients and FLC assigns a fixed 6-bit code to every value of TotalCoeff.

TABLE 34

Choice of lookup table for coeff_token

| N | Table for coeff_token |
|---|---|
| 0, 1 | Num-VLC0 |
| 2, 3 | Num-VLC1 |
| 4, 5, 6, 7 | Num-VLC2 |
| 8 or above | FLC |

2. Code the Sign of Each T1.

For each T1 (trailing+/−1) signalled by coeff_token, a single bit encodes the sign (0=+, 1=−). These are encoded in reverse order, starting with the highest-frequency T1.

3. Code the Levels of the Remaining Non-Zero Coefficients.

The level (sign and magnitude) of each remaining non-zero coefficient in the block is encoded in reverse order, starting with the highest frequency and working back towards the DC coefficient. The choice of VLC table to encode each level adapts depending on the magnitude of each successive coded level (context adaptive). There are 7 VLC tables to choose from, Level_VLC0 to Level_VLC6. Level_VLC0 is biased towards lower magnitudes; Level_VLC1 is biased towards slightly higher magnitudes and so on. The choice of table is adapted in the following way:

(a) Initialise the table to Level_VLC0 (unless there are more than 10 non-zero coefficients and less than 3 trailing ones, in which case start with Level_VLC1).

(b) Encode the highest-frequency non zero coefficient.

(c) If the magnitude of this coefficient is larger than a pre-defined threshold, move up to the next VLC table.

In this way, the choice of level is matched to the magnitude of the recently-encoded coefficients. The thresholds are listed in Table 35; the first threshold is zero which means that the table is always incremented after the first coefficient level has been encoded.

TABLE 35

Thresholds for determining whether to increment level table number

| Current VLC Table | Threshold to increment table |
|---|---|
| VLC0 | 0 |
| VLC1 | 3 |
| VLC2 | 6 |
| VLC3 | 12 |
| VLC4 | 24 |
| VLC5 | 48 |
| VLC6 | N/A (highest table) |

4. Code the Total Number of Zeros Before the Last Coefficient.

TotalZeros is the sum of all zeros preceding the highest non-zero coefficient in the reordered array. This is coded with a VLC. The reason for sending a separate VLC t indicate TotalZeros is that many blocks contain a number of non-zero coefficients at the start of the array and (as will be seen later) this approach means that zero-runs at the start of the array need not be encoded.

5. Code Each Run of Zeros.

The number of zeros preceding each non-zero coefficient (run_before) is encoded in reverse order. A run_before parameter is encoded for each non-zero coefficient, starting with the highest frequency, with two exceptions:

(a) If there are no more zeros left to encode (i.e. Σ[run_before]=TotalZeros), it is not necessary to encode any more run_before values.

(b) It is not necessary to encode run_before for the final (lowest frequency) non-zero coefficient.

The VLC for each run of zeros is chosen depending on (a) the number of zeros that have not yet been encoded (ZerosLeft) and (b) run_before. For example, if there are only 2 zeros left to encode, run_before can only take 3 values (0, 1 or 2) and so the VLC need not be more than 2 bits long; if there are 6 zeros still to encode then run_before can take 7 values (0 to 6) and the VLC table needs to be correspondingly larger.

CAVLC Examples

In all the following examples, we assume that table Num-VLC0 is used to encode coeff_token.

Example 1

4 × 4 block:

| | | | |
|---|---|---|---|
| 0 | 3 | −1 | 0 |
| 0 | −1 | 1 | 0 |

-continued

| | | | |
|---|---|---|---|
| 1 | 0 | 0 | 0 |
| 0 | 0 | 0 | 0 |

Reordered block:
0, 3, 0, 1, −1, −1, 0, 1, 0 . . .
TotalCoeff = 5 (indexed from highest frequency [4] to lowest frequency [0])
TotalZeros = 3
T1s = 3 (in fact there are 4 trailing ones but only 3 can be encoded as a "special case")

Encoding:

| Element | Value | Code |
|---|---|---|
| Coeff_token | TotalCoeffs = 5, T1 = 3 | 0000100 |
| T1 sign (4) | + | 0 |
| T1 sign (3) | − | 1 |
| T1 sign (2) | − | 1 |
| Level (1) | +1 (use Level_VLC0) | 1 |
| Level (0) | +3 (use Level_VLC1) | 0010 |
| TotalZeros | 3 | 111 |
| run_before(4) | ZerosLeft = 3; run_before = 1 | 10 |
| run_before(3) | ZerosLeft = 2; run_before = 0 | 1 |
| run_before(2) | ZerosLeft = 2; run_before = 0 | 1 |
| run_before(1) | ZerosLeft = 2; run_before = 1 | 01 |
| run_before(0) | ZerosLeft = 1; run_before = 1 | No code required; last coefficient. |

The transmitted bitstream for this block is 000010001110010111101101.

Decoding:

The output array is "built up" from the decoded values as shown below. Values added to the output array at each stage are underlined.

| Code | Element | Value | Output array |
|---|---|---|---|
| 0000100 | coeff_taken | TotalCoeffs = 5, T1s = 3 | Empty |
| 0 | T1 sign | + | 1 |
| 1 | T1 sign | − | −1, 1 |
| 1 | T1 sign | − | −1, −1, 1 |
| 1 | Level | +1 | 1, −1, −1, 1 |
| 0010 | Level | +3 | 3, 1, −1, −1, 1 |
| 111 | TotalZeros | 3 | 3, 1, −1, −1, 1 |
| 10 | run_before | 1 | 3, 1, −1, −1, 0, 1 |
| 1 | run_before | 0 | 3, 1, −1, −1, 0, 1 |
| 1 | run_before | 0 | 3, 1, −1, −1, 0, 1 |
| 01 | run_before | 1 | 3, 0, 1, −1, −1, 0, 1 |

The decoder has inserted two zeros; however, TotalZeros is equal to 3 and so another 1 zero is inserted before the lowest coefficient, making the final output array:

0, 3, 0, 1, −1, −1, 0, 1

Example 2

4 × 4 block:

| | | | |
|---|---|---|---|
| −2 | 4 | 0 | −1 |
| 3 | 0 | 0 | 0 |

-continued

| | | | |
|---|---|---|---|
| −3 | 0 | 0 | 0 |
| 0 | 0 | 0 | 0 |

Reordered block:
−2, 4, 3, −3, 0, 0, −1, . . .
TotalCoeffs = 5 (indexed from highest frequency [4] to lowest frequency [0])
TotalZeros = 2
T1s = 1

Encoding:

| Element | Value | Code |
|---|---|---|
| Coeff_token | TotalCoeffs = 5, T1 = 3 | 0000000110 |
| T1 sign (4) | − | 1 |
| Level (3) | Sent as −2 (see note 1) (use Level_VLC0) | 0001 |
| Level (2) | 3 (use Level_VLC1) | 0010 |
| Level (1) | 4 (use Level_VLC1) | 00010 |
| Level (0) | −2 (use Level_VLC2) | 111 |
| TotalZeros | 2 | 0011 |
| run_before(4) | ZerosLeft = 2; run_before = 2 | 00 |
| run_before(3 . . . 0) | 0 | No code Required |

The transmitted bitstream for this block is 000000011010001001000010111001100.

Note 1: Level (3), with a value of −3, is encoded as a special case. If there are less than 3 T1s, then the first non-T1 level will not have a value of +/−1 (otherwise it would have been encoded as a T1). To save bits, this level is incremented if negative (decremented if positive) so that +/−2 maps to +/−1, +/−3 maps to +/−2, and so on. In this way, shorter VLCs are used.

Note 2: After encoding level (3), the level_VLC table is incremented because the magnitude of this level is greater than the first threshold (which is 0). After encoding level (1), with a magnitude of 4, the table number is incremented again because level (1) is greater than the second threshold (which is 3). Note that the final level (−2) uses a different code from the first encoded level (also −2).

Decoding:

| Code | Element | Value | Output array |
|---|---|---|---|
| 0000000110 | coeff_taken | TotalCoeffs = 5, T1s = 3 | Empty |
| 1 | T1 sign | − | 1 |
| 0001 | Level | −2 decoded as −3 | −3, 1 |
| 0010 | Level | +3 | +3, −3, −1 |
| 00010 | Level | +4 | +4, 3, −3, −1 |
| 111 | Level | −2 | −2, 4, 3, −3, −1 |
| 0011 | TotalZeros | 2 | −2, 4, 3, −3, −1 |
| 00 | run_before | 2 | −2, 4, 3, −3, 0, 0, −1 |

All zeros have now been decoded and so the output array is:

−2, 4, 3, −3, 0, 0, −1

(This example illustrates how bits are saved by encoding Total Zeros: only a single run needs to be coded even though there are 5 non-zero coefficients).

CABAC

In CABAC, the coding and decoding may done as follows:

1) the position of the non-zero transform coefficient encountered first when traversing the transform coefficients along a predetermined scan order is coded/decoded.
2) Transform coefficients following, in the scan order, and including the non-zero transform coefficient at the coded/decoded position are coded/decoded from the data stream.

In CABAC, alternatively, the coding and decoding may done as follows:

1) a significance map is coded/decoded which indicates the positions of the non-zero transform coefficients by use of significance flags and last-significance flags: in a forward scan traversing the positions of the transform coefficients, a significance flag is coded/decoded which indicates whether a non-zero transform coefficient is positioned at the respective position, and, if so, and if the position is not the last in the forward scan, a last-significance flag is coded/decoded which indicates whether the non-zero transform coefficient positioned at the respective position is the last non-zero transform coefficient in the forward scan order, and
2) The non-zero transform coefficients values are sequentially coded/decoded in a reverse scan order, reversing the forward scan order.

It is noted that any of the embodiments described with respect to FIGS. 1 to 11 are combinable with any of the embodiments described with respect to FIGS. 12 to 14. In other words, the implementation of the video codec used by an encoder or decoder may be independent from the implementation of the trustworthiness check of the video data stream/the rendering of the video data stream checkable on trustworthiness.

Although the description of FIGS. 1 to 14 relates to apparatuses, the block diagrams of FIGS. 1 to 14 may alternatively be considered as flow diagrams of respective methods, in which each of the blocks represents a step of the respective method. Thus, what is further disclosed in the above description is:

A method 16 for checking a video data stream 14, having a video encoded thereinto, on trustworthiness, wherein the method comprises: subjecting 31 a predetermined portion 13 of the video data stream, or data 62 derived therefrom, to a hash function 31 to obtain a hash value 33; obtaining 51 a unique identifier 45 (e.g., from the video data stream or from a reference, e.g., using a URI), which uniquely identifies a media asset to which the predetermined portion 13 belongs; obtaining 51 a digital signature 43 based on the video data stream (e.g., from the video data stream, e.g., twcv_signature, or from a metadata file or manifest file, e.g., a C2PA file); and checking 41 whether a combination of the hash value 33 and the unique identifier 45 (e.g., a combination of multiple pieces of information comprising the hash value and the unique identifier 45) fits to the digital signature 43 to determine whether the video data stream is trustworthy.

A method 20 for decoding a video data stream, having a video encoded thereinto, wherein the method comprises: decoding 21 a syntax structure from the video data stream, which comprises information for checking the video data stream for trustworthiness based on a predetermined portion 13 of the video data stream, which predetermined portion is to be subjected to a hash function 31, or is to be used to derive data to be subjected to a hash function 31, for deriving a hash value 33 to serve for checking the trustworthiness of the video data stream; decoding 21 a unique identifier 45, or a reference which points to a unique identifier 45, from the video data stream, the unique identifier 45 uniquely identifying a media asset to which the predetermined portion 13 belongs; decoding 21 an indication of a digital signature 43 from the video data stream (e.g., from the video data stream, e.g., twcv_signature, or from a metadata file or manifest file, e.g., a C2PA file), the digital signature 43 being based on a combination of the hash value 33 and the unique identifier (e.g., a combination of multiple pieces of information comprising the hash value and the unique identifier 45).

A method 15 for rendering a video data stream 14 having a video encoded thereinto checkable on trustworthiness, wherein the method comprises: subjecting 31 a predetermined portion 13 of the video data stream 14, or of data 62 from which the video data stream 14 is derived, to a hash function 31 to obtain a hash value 33; assigning a unique identifier 45 to the predetermined portion 13, which uniquely identifies a media asset to which the predetermined portion 13 belongs; signing 71 a combination of the hash value 33 and the unique identifier 45 (e.g., a combination of multiple pieces of information comprising the hash value 33 and the unique identifier 45) to obtain a digital signature 43.

A method 16 for checking a video data stream 14 having a video encoded thereinto on trustworthiness, wherein the method comprises: subjecting 31 a predetermined portion 13 of the video data stream, or data 62 derived therefrom, to a hash function 31 to obtain a hash value 33; checking 41 whether the hash value 33 fits to a digital signature 43 (e.g., derived from the video data stream of derived from a reference indicated in the video data stream) to determine whether the video data stream is trustworthy by decrypting 46 the digital signature 43 using a public key 57 of an asymmetric decryption scheme to obtain a check value 47, and by checking 49 whether the hash value 33 matches the check value 47; wherein the method comprises checking whether the video data stream comprises an indication 55 of an external resource 280 (e.g., a metadata structure, e.g., a manifest file, at an external resource) comprising a track 231 of editors (e.g., a track or record of editions or amendments performed from generation to the current version of the video data stream and/or the corresponding editor's identities) of the video data stream, and if the video data stream comprises an indication of an external resource comprising a track of editors of the video data stream, querying (or looking up) the track of editors for a certificate 233 of a content provider being the last editor of the video data stream and deriving the public key based on the certificate of the content provider.

A method 17 for transcoding a video data stream having a video encoded thereinto, wherein the method comprises: receiving an input video data stream 14' and checking 15' the input video data stream 14' on trustworthiness; transcoding 12 the input video data stream 14' to derive an output data stream 14; subjecting 31 a predetermined portion 13 of the output video data stream 14, or data 62 from which the output data stream is derived, to a hash function 31 to obtain a hash value 33; signing 71 the hash value using a private key 58 of an asymmetric encryption scheme to obtain a digital signature 43; providing, in a track of editors 231 (e.g., a track or record of editions or amendments performed from generation to the current version of the video data stream and/or the corresponding editor's identities) of the output video data stream, the track of editors being provided on an external resource 280 (e.g., a metadata structure, e.g., a manifest file, at an external resource), a certificate 233 of a content provider (e.g., identifying the apparatus), the certificate comprising, or pointing to, a public key 57 for the asymmetric encryption scheme; providing the digital signature 43 in the output video data stream 14 (e.g., in an SEI message) or to the external resource 280 (e.g., inserting the digital signature in the metadata structure or a further metadata structure and provide same on the external resource) or a further external resource.

A method 15 for rendering a video data stream 14 having a video encoded thereinto checkable on trustworthiness, wherein the method comprises: subjecting a predetermined portion 13 of the video data stream 14, or of data 62 from which the video data stream 14 is derived, to a hash function 31 to obtain a hash value 33; signing the hash value 33 using a private key 58 of an asymmetric encryption scheme to obtain a digital signature 43; providing, in a track of editors 231 (e.g., a track or record of editions or amendments performed from generation to the current version of the video data stream and/or the corresponding editor's identities) of the video data stream, the track of editors being provided on an external resource 280 (e.g., a metadata structure, e.g., a manifest file, at an external resource), a certificate 233 of a content provider (e.g., identifying the apparatus), the certificate comprising, or pointing to, a public key for the asymmetric encryption scheme; providing the digital signature 43 in the video data stream (e.g., in an SEI message) or to the external resource 280 (e.g., inserting the digital signature in the metadata structure or a further metadata structure and provide same on the external resource) or a further external resource.

A method for checking a video data stream 14 having a video encoded thereinto on trustworthiness, wherein the method comprises: subjecting a predetermined portion 13 of the video data stream, or data derived therefrom, to a hash function 31 to obtain a hash value 33; checking whether the hash value 33 fits to a digital signature 43 (e.g., derived from the video data stream of derived from a reference indicated in the video data stream) to determine whether the video data stream is trustworthy; wherein the method comprises determining the predetermined portion 13 based on one or more of: a temporal layer (e.g., temporal_id) identifier associated with a picture of the video data stream, the temporal layer identifier identifying a subset of time frames of the video data stream to which subset the respective picture belongs; one or more layer identifiers (e.g., layer_id in HEVC/VVC; dependency_id and/or quality_id in AVC) associated with a picture of the video data stream, the layer identifier identifying a layer of the video data stream, to which layer the respective picture belongs (e.g., the video data stream is a layered video data stream, e.g., comprising multiple layers, e.g. a base layer and one or more enhancement layers, representing the video in different resolutions, or representing the video from different perspectives); a combination of the temporal layer identifier and the layer identifier; a time frame identifier (e.g., the picture order count, POC); a priority level identifier (e.g., AVC priority_id) indicating a priority level of a picture; nal_ref_id of AVC.

A method 16 for checking a video data stream 14 having a video encoded thereinto on trustworthiness, wherein the method comprises: subjecting a predetermined portion 13 of the video data stream, or data derived therefrom, to a hash function 31 to obtain a hash value 33; checking whether the hash value 33 fits to a digital signature 43 (e.g., derived from the video data stream of derived from a reference indicated in the video data stream) to determine whether the video data stream is trustworthy; deriving an indication from the video data stream, which indication indicates a manner of determining the predetermined portion 13.

A method 20 for decoding a video data stream 14 having a video encoded thereinto, wherein the method comprises: deriving a syntax structure from the video data stream, which comprises information for checking the video data stream for trustworthiness based on a predetermined portion 13 of the video data stream (e.g., which predetermined portion 13 is to be subjected to a hash function, or is to be used to derive data to be subjected to a hash function for deriving a hash value 33 to serve for checking the trustworthiness of the video data stream), wherein the syntax structure comprises an indication, which indicates a manner of determining the predetermined portion 13 of the video data stream.

A method 15 for rendering a video data stream 14 having a video encoded thereinto checkable on trustworthiness, wherein the method comprises: subjecting a predetermined portion 13 of the video data stream, or of data 62 from which the further portion of the video data stream is derived, to a hash function 31 to obtain a hash value 33; signing the hash value 33 to obtain a digital signature 43 (e.g. by use of a private key of an asymmetric encryption scheme); wherein the method comprises determining the predetermined portion 13 based on one or more of: a temporal layer (e.g., temporal_id) identifier associated with a picture of the video data stream, the temporal layer identifier identifying a subset of time frames of the video data stream to which subset the respective picture belongs; one or more layer identifiers (e.g., layer_id in HEVC/VVC; dependency_id and/or quality_id in AVC) associated with a picture of the video data stream, the layer identifier identifying a layer of the video data stream, to which layer the respective picture belongs (e.g., the video data stream is a layered video data stream, e.g., comprising multiple layers, e.g. a base layer and one or more enhancement layers, representing the video in different resolutions, or representing the video from different perspectives); a combination of the temporal layer identifier and the layer identifier; a time frame identifier (e.g., the picture order count, POC); a priority level identifier (e.g., AVC priority_id) indicating a priority level of a picture; nal_ref_id of AVC.

A method 15 for rendering a video data stream 14 having a video encoded thereinto checkable on trustworthiness, wherein the method comprises: subjecting a predetermined portion 13 of the video data stream, or of data 62 from which the further portion of the video data stream is derived, to a hash function 31 to obtain a hash value 33; signing the hash value 33 to obtain a digital signature 43 (e.g. by use of a private key of an asymmetric encryption scheme); inserting an indication into the video data stream, which indication indicates a manner of determining the predetermined portion 13.

A method 16 for checking a video data stream 14 having a video encoded thereinto on trustworthiness, wherein the method comprises: subjecting a predetermined portion 13 (e.g., an access unit, e.g., video data associated with a time frame) of the video data stream, or data derived therefrom, to a hash function 31 to obtain a hash value 33; deriving a digital signature 43 associated with the predetermined portion 13 from an external resource (e.g., a server); checking whether the hash value 33 fits to the digital signature 43 to determine whether the video data stream is trustworthy.

A method 16 for checking a video data stream 14 having a video encoded thereinto on trustworthiness, wherein the method comprises: subjecting a predetermined portion 13 (e.g., an access unit, e.g., video data associated with a time frame) of the video data stream, or data derived therefrom, to a hash function 31 to obtain a hash value 33; deriving a check value (e.g., a signed check value, e.g., signed with a private key of an asymmetric encryption scheme) associated with the predetermined portion 13 from an external resource (e.g., a server); checking whether the hash value 33 fits to the check value to determine whether the video data stream is trustworthy.

A method 20 for decoding a video data stream 14 having a video encoded thereinto, the method comprising: deriving a syntax structure from the video data stream, which comprises information for checking the video data stream for trustworthiness based on a predetermined portion 13 of the video data stream (e.g., which predetermined portion 13 is to be subjected to a hash function, or is to be used to derive data to be subjected to a hash function for deriving a hash value 33 to serve for checking the trustworthiness of the video data stream); wherein the syntax structure comprises a reference to an external resource (e.g., a metadata structure or a manifest file) for retrieving a digital signature 43 associated with the predetermined portion 13.

A method 20 for decoding a video data stream 14 having a video encoded thereinto, the method comprising: deriving a syntax structure from the video data stream, which comprises information for checking the video data stream for trustworthiness based on a predetermined portion 13 of the video data stream (e.g., which predetermined portion 13 is to be subjected to a hash function, or is to be used to derive data to be subjected to a hash function for deriving a hash value 33 to serve for checking the trustworthiness of the video data stream); wherein the syntax structure comprises a reference to an external resource (e.g., a metadata structure or a manifest file) for retrieving a check value (e.g., a check value signed with a digital signature) associated with the predetermined portion 13.

A method 15 for rendering a video data stream 14 having a video encoded thereinto checkable on trustworthiness, wherein the method comprises: subjecting a predetermined portion 13 13 of the video data stream, or of data 62 from which the predetermined portion 13 of the video data stream is derived, to a hash function 31 to obtain a hash value 33; signing the hash value 33 to obtain a digital signature 43 (e.g. by use of a private key of an asymmetric encryption scheme), and providing the digital signature 43 in an external resource; inserting an indication of the external resource (e.g., a reference to the digital signature on the external resource) (e.g., a URI of the external resource or the digital signature) into the video data stream.

A method 15 for rendering a video data stream 14 having a video encoded thereinto checkable on trustworthiness, wherein the method comprises: subjecting a predetermined portion 13 of the video data stream, or of data 62 from which the further portion of the video data stream is derived, to a hash function 31 to obtain a hash value 33; signing the hash value 33 to obtain a digital signature 43 (e.g. by use of a private key of an asymmetric encryption scheme), and providing the hash value 33 and the digital signature 43 in an external resource; inserting an indication of the external resource (e.g., a reference to the digital signature on the external resource) (e.g., a URI of the external resource or the digital signature) into the video data stream.

FURTHER EMBODIMENTS

Please note: text in brackets is not intended to be necessarily part of the embodiments but provides explanations, examples, or optional features, which may optionally be integrated to the embodiments.

The different aspects are combinable, i.e., any feature defined with respect to any of the aspects may be combined with any of the further aspects.

Embodiments of the First Aspect

1. Apparatus (16) for checking a video data stream (14), having a video encoded thereinto, on trustworthiness, wherein the apparatus is configured for
   subjecting (31) a predetermined portion (13) of the video data stream, or data (62) derived therefrom, to a hash function (31) to obtain a hash value (33);
   obtaining a unique identifier (45) [e.g., from the video data stream or from a reference, e.g., using a URI], which uniquely identifies a media asset to which the predetermined portion (13) belongs;
   obtaining a digital signature (43) based on the video data stream [e.g., from the video data stream, e.g., twcv_signature, or from a metadata file or manifest file, e.g., a C2PA file]; and
   checking (41) whether a combination of the hash value (33) and the unique identifier (45) [e.g., a combination of multiple pieces of information comprising the hash value and the unique identifier (45)] fits to the digital signature (43) to determine whether the video data stream is trustworthy.
2. Apparatus according to embodiment 1, configured for, in checking whether the combination of the hash value (33) and the unique identifier (45) fits to the digital signature (43),
   decrypting the digital signature (43) to obtain a check value [e.g., by use of an asymmetric decryption scheme using a public key]; and
   checking whether the combination of the hash value (33) and the unique identifier (45) matches the check value.
3. Apparatus according to any of embodiment 1 or 2, configured for, in checking whether the combination of the hash value (33) and the unique identifier (45) fits to the digital signature (43),
   forming a verification string based on the hash value (33) and the unique identifier (45),
   comparing the verification string to the digital signature (43) using a public key [e.g., using a verification algorithm].
4. Apparatus according to any of embodiments 1 to 3, configured for deriving an indication of an external resource [e.g., a URI] for retrieving the public key from the video data stream, and deriving the public key from the external resource.
5. Apparatus according to embodiment 4, configured for deriving the unique identifier (45) from the external resource.
6. Apparatus according to any of embodiments 1 to 5, configured for checking, whether the unique identifier (45) matches a unique identifier (45) associated with one or more further media components [e.g. audio or subtitles] [e.g., a further media component signaled in a data stream comprising the video data stream].
7. Apparatus according to any of embodiments 1 to 6, configured for deriving the digital signature (43) from the video data stream [e.g., from a payload packet which is interspersed in the video data stream between video payload packets carrying encoded video data] [e.g., from a supplemental enhancement information (SEI) message of the video data stream, e.g., trustworthy_content_verification].
8. Apparatus according to any of embodiments 1 to 7, configured for deriving an indication of an external resource [e.g., a URI] from the video data stream [e.g., from a SEI message of the video data stream, e.g., trustworthy_content_verification], and deriving the digital signature (43) from the external resource.
9. Apparatus according to embodiment 8, wherein the indication of the external resource is a uniform resource identifier (URI) pointing to a manifest file stored on a server.
10. Apparatus according to any of embodiments 1 to 9, configured for deriving the unique identifier (45) from the video data stream.
11. Apparatus according to any of embodiments 1 to 10, configured for deriving the unique identifier (45) from a payload packet signaled in the video data stream.
12. Apparatus according to embodiment 11, wherein the payload packet further comprises one or more of
    an indication of the hash function (31),
    an indication of a number of portions of the video data stream, for which a digital signature (43) for verifying the trustworthiness of the video data stream is available,
    an indication, which indicates a manner for retrieving a public key for checking whether the combination of the hash value (33) and the unique identifier (45) fits to the digital signature (43).
13. Apparatus according to any of embodiments 1 to 12, configured for, in subjecting the predetermined portion (13) of the video data stream, or data derived therefrom, to a hash function (31) to obtain the hash value (33),
    reconstructing the video with respect to the predetermined portion (13) to obtain a reconstructed portion of the video, and
    subjecting the reconstructed portion to the hash function (31).
14. Apparatus according to any of embodiments 1 to 13, the apparatus being a decoder configured for
    decoding the video from the video data stream, and
    decoding an indication of the digital signature (43) from the video data stream.
15. Apparatus according to embodiment 14, configured for
    decoding the digital signature (43) from a supplemental enhancement information message of the video data stream.
16. Apparatus according to any of embodiments 1 to 15, configured for
    performing the checking the video data stream on trustworthiness sequentially with respect to a plurality of portions of the video data stream, and further by
    subjecting a predetermined portion (13) of the video data stream, or data derived therefrom, to a hash function (31) to obtain a hash value (33);
    subjecting a further portion of the video data stream, or data derived therefrom, to the hash function (31) to obtain a further hash value [e.g., the further portion being a previous portion with respect to the predetermined portion (13)];
    checking whether a combination of the hash value (33), the further hash value, and the unique identifier (45) fits to the digital signature (43) [e.g., the combination of multiple pieces of information comprises the hash value, the further hash value, and the unique identifier (45)].

17. Apparatus according to any of embodiments 1 to 16, configured for checking whether a combination of multiple pieces of information comprising the hash value (33), the unique identifier (45), and an indication of the hash function (31) fits to the digital signature (43) to determine whether the video data stream is trustworthy.
18. Apparatus (20) for decoding a video data stream, having a video encoded thereinto, wherein the apparatus is configured for
    decoding a syntax structure (55) from the video data stream, which comprises information for checking the video data stream for trustworthiness based on a predetermined portion (13) of the video data stream, which predetermined portion is to be subjected to a hash function (31), or is to be used to derive data to be subjected to a hash function (31), for deriving a hash value (33) to serve for checking the trustworthiness of the video data stream,
    decoding a unique identifier (45), or a reference which points to a unique identifier (45), from the video data stream, the unique identifier (45) uniquely identifying a media asset to which the predetermined portion (13) belongs;
    decoding an indication of a digital signature (43) from the video data stream [e.g., from the video data stream, e.g., twcv_signature, or from a metadata file or manifest file, e.g., a C2PA file], the digital signature (43) being based on a combination of the hash value (33) and the unique identifier (45) [e.g., a combination of multiple pieces of information comprising the hash value and the unique identifier (45)].
19. Apparatus according to embodiment 18, wherein the unique identifier (45) is signaled in the syntax structure.
20. Apparatus (15) for rendering a video data stream (14) having a video encoded thereinto checkable on trustworthiness, wherein the apparatus is configured for
    subjecting a predetermined portion (13) of the video data stream (14), or of data (62) from which the video data stream (14) is derived, to a hash function (31) to obtain a hash value (33);
    assigning a unique identifier (45) to the predetermined portion (13), which uniquely identifies a media asset to which the predetermined portion (13) belongs;
    signing a combination of the hash value (33) and the unique identifier (45) [e.g., a combination of multiple pieces of information comprising the hash value (33) and the unique identifier (45)] to obtain a digital signature (43).
21. Apparatus according to embodiment 20, configured for
    forming a verification string based on the hash value (33) and the unique identifier (45),
    signing the verification string using a private key [e.g., using a signing algorithm] to obtain the digital signature (43).
22. Apparatus according to any of embodiment 20 or 21, configured for providing a indication of an external resource, which holds or indicates the private key, in the video data stream.
23. Apparatus according to embodiment 22, configured for providing the unique identifier (45) in the external resource.
24. Apparatus according to any of embodiments 20 to 23, configured for providing the digital signature (43) in the video data stream [e.g., in a payload packet which is interspersed in the video data stream between video payload packets carrying encoded video data] [e.g., in a supplemental enhancement information (SEI) message of the video data stream, e.g., trustworthy_content_verification].
25. Apparatus according to any of embodiments 20 to 23, configured for
    providing an indication of an external resource [e.g., a URI] in the video data stream [e.g., from a SEI message of the video data stream, e.g., trustworthy_content_verification], and
    providing the digital signature (43) in the external resource.
26. Apparatus according to embodiment 25, wherein the indication of the external resource is a uniform resource identifier (URI) pointing to a manifest file stored on a server.
27. Apparatus according to any of embodiments 20 to 26, configured for inserting the unique identifier (45) into the video data stream.
28. Apparatus according to any of embodiments 20 to 27, configured for inserting the unique identifier (45) into a payload packet, e.g. a SEI message, signaled in the video data stream.
29. Apparatus according to embodiment 28, further configured for inserting into the SEI message one or more of
    an indication of the hash function (31),
    an indication of a number of portions of the video data stream, for which a digital signature (43) for verifying the trustworthiness of the video data stream is available,
    an indication, which indicates a manner for retrieving a public key for checking whether the combination of the hash value (33) and the unique identifier (45) fits to the digital signature (43).
30. Apparatus according to any of embodiments 20 to 29, the apparatus being an encoder configured for
    encoding the video into the video data stream, and
    encoding an indication of the digital signature (43) into the video data stream.
31. Apparatus according to embodiment 30, configured for
    encoding the digital signature (43) into a supplemental enhancement information message of the video data stream.
32. Apparatus according to any of embodiments 20 to 31, configured for
    performing the rendering the video data stream checkable on trustworthiness sequentially with respect to a plurality of portions of the video data stream, and further by
    subjecting a predetermined portion (13) of the video data stream, or data derived therefrom, to a hash function (31) to obtain a hash value (33);
    subjecting a further portion of the video data stream, or data derived therefrom, to the hash function (31) to obtain a further hash value [e.g., the further portion being a previous portion with respect to the predetermined portion (13)];
    signing a combination of the hash value (33), the further hash value and the unique identifier (45) [e.g., a combination of multiple pieces of information comprising the hash value (33), the further hash value and the unique identifier (45)] to obtain a digital signature (43).
33. Apparatus according to any of embodiments 20 to 32, configured for signing a combination of multiple pieces of information comprising the hash value (33), the unique identifier (45), and an indication of the hash function (31) to obtain the digital signature (43).

Embodiments of the Second Aspect

34. Apparatus (16) for checking a video data stream (14) having a video encoded thereinto on trustworthiness, wherein the apparatus is configured for
 subjecting a predetermined portion (13) of the video data stream, or data (62) derived therefrom, to a hash function (31) to obtain a hash value (33);
 checking (41) whether the hash value (33) fits to a digital signature (43) [e.g., derived from the video data stream of derived from a reference indicated in the video data stream] to determine whether the video data stream is trustworthy, by
 decrypting (46) the digital signature (43) using a public key (57) of an asymmetric decryption scheme to obtain a check value (47), and
 checking (49) whether the hash value (33) matches the check value (47);
 wherein the apparatus is configured for checking whether the video data stream comprises an indication (55) of an external resource (280) [e.g., a metadata structure, e.g., a manifest file, at an external resource] comprising a track (231) of editors [e.g., a track or record of editions or amendments performed from generation to the current version of the video data stream and/or the corresponding editor's identities] of the video data stream, and if the video data stream comprises an indication of an external resource comprising a track of editors of the video data stream, querying [or looking up] the track of editors for a certificate (233) of a content provider being the last editor of the video data stream and deriving the public key based on the certificate of the content provider.
35. Apparatus according to embodiment 34, configured for, in checking whether the video data stream comprises an indication of an external resource comprising a track of editors of the video data stream, deriving a syntax element from the video data stream, which indicates, whether
 (1) the video data stream comprises
 a URI directly pointing to the certificate of the content provider or a URI pointing to a register of certificates of content providers and an index into the register pointing to the content provider of the video data stream, or
 (2) the video data stream comprises the indication of the external resource comprising the track of editors.
36. Apparatus according to embodiment 35, wherein the syntax element and, if present, the indication of the external resource comprising the track of editors, are transmitted in a SEI message of the video data stream.
37. Apparatus according to any of embodiments 34 to 36, wherein, if present, the indication of the external resource comprising the track of editors is transmitted in a SEI message [e.g., the SEI message] of the video data stream, and wherein the apparatus is configured for
 if the indication of the external resource comprising the track of editors is present, deriving a further digital signature (43) from the external resource; and
 checking whether a payload of the SEI message, or a predetermined portion (13) thereof, fits to the further digital signature (43).
38. Apparatus according to embodiment 37, configured for, in checking whether the payload, or the predetermined portion (13) thereof, fits to the further digital signature (43),
 subjecting the payload, or the predetermined portion (13) thereof, to a further hash function to obtain a further hash value; and
 checking, whether the further hash value fits to the further digital signature (43).
39. Apparatus according to embodiment 37 or 38, wherein the predetermined portion (13) excludes the indication of the external resource comprising the track of editors.
40. Apparatus according to any of embodiments 37 to 39, wherein the predetermined portion (13) of the payload of the SEI message comprises a unique identifier [e.g., a payload portion that is specific to the video data stream].
41. Apparatus according to any of embodiments 37 to 40, wherein the syntax structure further comprises a media component identifier, and wherein the apparatus is configured for using the media component identifier for selecting the further digital signature (43) out of a set of one or more digital signatures comprised in the external resource [e.g., each of the one or more digital signatures being associated with a media component, e.g., audio, video, subtitles].
42. Apparatus according to any of embodiments 37 to 41, wherein the syntax structure further comprises one or more of
 an indication of the hash function (31),
 an indication of a number of portions of the video data stream, for which a digital signature for verifying the trustworthiness of the video data stream is available.
43. Apparatus (17) for transcoding a video data stream having a video encoded thereinto, configured for
 receiving an input video data stream (14') and checking (15') the input video data stream (14') on trustworthiness;
 transcoding (12) the input video data stream (14') to derive an output data stream (14);
 subjecting (31) a predetermined portion (13) of the output video data stream (14), or data (62) from which the output data stream is derived, to a hash function (31) to obtain a hash value (33);
 signing (71) the hash value using a private key (58) of an asymmetric encryption scheme to obtain a digital signature (43);
 providing, in a track of editors (231) [e.g., a track or record of editions or amendments performed from generation to the current version of the video data stream and/or the corresponding editor's identities] of the output video data stream, the track of editors being provided on an external resource (280) [e.g., a metadata structure, e.g., a manifest file, at an external resource], a certificate (233) of a content provider [e.g., identifying the apparatus], the certificate comprising, or pointing to, a public key (57) for the asymmetric encryption scheme;
 providing the digital signature (43) in the output video data stream (14) [e.g., in an SEI message] or to the external resource (280) [e.g., inserting the digital signature in the metadata structure or a further metadata structure and provide same on the external resource] or a further external resource.

44. Apparatus according to embodiment 43, configured for inserting into the output video data stream [e.g., into the SEI message] an indication of an external resource comprising a track of editors of the video data stream and providing in the output video data stream [e.g., in the SEI message] a syntax element which indicates that the output video data stream comprises the indication of the external resource comprising the track of editors.
45. Apparatus according to embodiment 44, wherein the syntax element and, if present, the indication of the external resource comprising the track of editors, are transmitted in a syntax structure [e.g., a SEI message] of the output video data stream.
46. Apparatus according to any of embodiments 43 to 45, configured for inserting the indication of the external resource comprising the track of editors in a syntax structure [e.g., a SEI message] of the output video data stream, and wherein the apparatus is configured for
    subjecting a payload of the syntax structure, or a predetermined portion (13) thereof, to a further hash function to obtain a further hash value;
    storing the further hash value at the external resource [e.g., in the track of editors].
47. Apparatus according to embodiment 46, configured for inserting the indication of the external resource comprising the track of editors in a syntax structure [e.g., a SEI message] of the output video data stream, and wherein the apparatus is configured for
    subjecting a payload of the syntax structure, or a predetermined portion (13) thereof, to a further hash function to obtain a further hash value;
    signing the syntax structure, or the payload of the syntax structure, or the predetermined portion (13) thereof, using the private key to obtain a further digital signature;
    storing the further digital signature at the external resource [e.g., in the track of editors].
48. Apparatus according to embodiment 46 or 47, wherein the predetermined portion (13) excludes the indication of the external resource comprising the track of editors.
49. Apparatus according to any of embodiments 46 to 48, wherein the predetermined portion (13) of the payload of the SEI message comprises a unique identifier [e.g., a payload portion that is specific to the output video data stream].
50. Apparatus according to any of embodiments 46 to 49, configured for inserting into the syntax structure a media component identifier, and wherein the apparatus is configured for storing at the external resource, e.g., in the track of editors, an association between the further digital signature or the further hash value and the media component identifier.
51. Apparatus according to any of embodiments 46 to 50, configured for inserting into the syntax structure one or more of
    an indication of the hash function (31),
    an indication of a number of portions of the output video data stream, for which a digital signature for verifying the trustworthiness of the output video data stream is available.
52. Apparatus (15) for rendering a video data stream (14) having a video encoded thereinto checkable on trustworthiness, wherein the apparatus is configured for subjecting a predetermined portion (13) of the video data stream (14), or of data (62) from which the video data stream (14) is derived, to a hash function (31) to obtain a hash value (33);
    signing the hash value (33) using a private key (58) of an asymmetric encryption scheme to obtain a digital signature (43);
    providing, in a track of editors (231) [e.g., a track or record of editions or amendments performed from generation to the current version of the video data stream and/or the corresponding editor's identities] of the video data stream, the track of editors being provided on an external resource (280) [e.g., a metadata structure, e.g., a manifest file, at an external resource], a certificate (233) of a content provider [e.g., identifying the apparatus], the certificate comprising, or pointing to, a public key for the asymmetric encryption scheme;
    providing the digital signature (43) in the video data stream [e.g., in an SEI message] or to the external resource (280) [e.g., inserting the digital signature in the metadata structure or a further metadata structure and provide same on the external resource] or a further external resource.
53. Apparatus according to embodiment 52, configured for inserting into the video data stream [e.g., into the SEI message] an indication of an external resource comprising a track of editors of the video data stream and providing in the video data stream [e.g., in the SEI message] a syntax element which indicates that the video data stream comprises the indication of the external resource comprising the track of editors.
54. Apparatus according to embodiment 53, wherein the syntax element and, if present, the indication of the external resource comprising the track of editors, are transmitted in a syntax structure [e.g., a SEI message] of the video data stream.
55. Apparatus according to any of embodiments 52 to 54, configured for inserting the indication of the external resource comprising the track of editors in a syntax structure [e.g., a SEI message] of the video data stream, and wherein the apparatus is configured for
    subjecting a payload of the syntax structure, or a predetermined portion (13) thereof, to a further hash function to obtain a further hash value;
    storing the further hash value at the external resource [e.g., in the track of editors].
56. Apparatus according to embodiment 55, configured for inserting the indication of the external resource comprising the track of editors in a syntax structure [e.g., a SEI message] of the video data stream, and wherein the apparatus is configured for
    subjecting a payload of the syntax structure, or a predetermined portion (13) thereof, to a further hash function to obtain a further hash value;
    signing the syntax structure, or the payload of the syntax structure, or the predetermined portion (13) thereof, using the private key to obtain a further digital signature;
    storing the further digital signature at the external resource [e.g., in the track of editors].
57. Apparatus according to embodiment 55 or 56, wherein the predetermined portion (13) excludes the indication of the external resource comprising the track of editors.
58. Apparatus according to any of embodiments 55 to 57, wherein the predetermined portion (13) of the payload of the SEI message comprises a unique identifier [e.g., a payload portion that is specific to the video data stream].
59. Apparatus according to any of embodiments 55 to 58, configured for inserting into the syntax structure a media component identifier, and wherein the apparatus is configured for storing at the external resource, e.g., in the track of editors, an association between the further digital signature or the further hash value and the media component identifier.

60. Apparatus according to any of embodiments 55 to 59, configured for inserting into the syntax structure one or more of
 an indication of the hash function (31),
 an indication of a number of portions of the video data stream, for which a digital signature for verifying the trustworthiness of the video data stream is available.

Embodiments of the Third Aspect

61. Apparatus for checking a video data stream (14) having a video encoded thereinto on trustworthiness, wherein the apparatus is configured for
 subjecting a predetermined portion (13) of the video data stream, or data derived therefrom, to a hash function (31) to obtain a hash value (33);
 checking whether the hash value (33) fits to a digital signature (43) [e.g., derived from the video data stream of derived from a reference indicated in the video data stream] to determine whether the video data stream is trustworthy;
 wherein the apparatus is configured for determining the predetermined portion (13) based on one or more of
  a temporal layer [e.g., temporal_id] identifier associated with a picture of the video data stream, the temporal layer identifier identifying a subset of time frames of the video data stream to which subset the respective picture belongs;
  one or more layer identifiers [e.g., layer_id in HEVC/VVC; dependency_id and/or quality_id in AVC] associated with a picture of the video data stream, the layer identifier identifying a layer of the video data stream, to which layer the respective picture belongs [e.g., the video data stream is a layered video data stream, e.g., comprising multiple layers, e.g. a base layer and one or more enhancement layers, representing the video in different resolutions, or representing the video from different perspectives];
  a combination of the temporal layer identifier and the layer identifier,
  a time frame identifier [e.g., the picture order count, POC],
  a priority level identifier [e.g., AVC priority_id] indicating a priority level of a picture;
  nal_ref_id of AVC.

62. Apparatus according to embodiment 61, configured for deriving an indication from the video data stream, which indication indicates a manner of determining the predetermined portion (13).

63. Apparatus according to embodiment 62, wherein the indication indicating the manner of determining the predetermined portion (13) differentiates between one or more of
 an indication, which is associated with a time frame [e.g., an access unit], of the video data stream, the indication indicating whether the time frame belongs to the predetermined portion (13),
 the temporal layer identifier associated with a picture of the video data stream, the temporal layer identifier identifying a subset of time frames of the video data stream to which subset the respective picture belongs,
 the one or more layer identifiers [e.g., layer_id in HEVC/VVC; dependency_id and/or quality_id in AVC] associated with a picture of the video data stream, the layer identifier identifying a layer of the video data stream, to which layer the respective picture belongs [e.g., the video data stream is a layered video data stream, e.g., comprising multiple layers, e.g. a base layer and one or more enhancement layers, representing the video in different resolutions, or representing the video from different perspectives];
 the combination of the temporal layer identifier and the layer identifier,
 the time frame identifier [e.g., the picture order count, POC],
 the priority level identifier [e.g., AVC priority_id] indicating a priority level of a picture;
 the nal_ref_id of AVC.

64. Apparatus according to embodiment 62 or 63, configured for deriving the indication indicating the manner of determining the predetermined portion (13) from a syntax structure, e.g. a SEI message.

65. Apparatus according to embodiment 64, wherein the syntax structure further comprises one or more of
 an indication of the hash function (31),
 an indication of a number of portions of the video data stream, for which portion a respective digital signature for checking, whether the video data stream is trustworthy, is provided [e.g., in the video data stream or in a reference indicated in the video data stream].

66. Apparatus according to embodiment 62, wherein the apparatus is configured for determining the predetermined portion (13) based on the temporal layer identifier, the layer identifier, or the time frame identifier, and wherein the apparatus is configured for deriving a range of values from the video data stream, the range of values indicating values for the respective identifier, which values are associated to the predetermined portion (13) [so that, e.g., pictures, the respective identifier of which assume a value in the range belong to the predetermined portion].

67. Apparatus (16) for checking a video data stream (14) having a video encoded thereinto on trustworthiness, wherein the apparatus is configured for
 subjecting a predetermined portion (13) of the video data stream, or data derived therefrom, to a hash function (31) to obtain a hash value (33);
 checking whether the hash value (33) fits to a digital signature (43) [e.g., derived from the video data stream of derived from a reference indicated in the video data stream] to determine whether the video data stream is trustworthy;
 deriving an indication from the video data stream, which indication indicates a manner of determining the predetermined portion (13).

68. Apparatus according to embodiment 67, wherein the indication is a syntax element, which differentiates between a plurality of modes of determining the predetermined portion.

69. Apparatus according to embodiment 68, wherein the plurality of modes comprises a first mode, wherein the apparatus is configured for determining the predetermined portion by in the first mode, deciding whether to include a predetermined picture [e.g., predetermined in terms of currently considered, e.g., a picture or access unit, which does not include a content selection SEI message] of the video data stream into the predetermined portion [or whether to assign the predetermined picture to the predetermined portion] depending on which layer out of a plurality of layers of the video data stream the predetermined picture belongs to [e.g., in dependence on a value of a layer identifier of the layer, the predetermined picture belongs to].

70. Apparatus according to embodiment 69, wherein the plurality of modes further comprises a second mode, wherein the apparatus is configured for determining the predetermined portion by in the second mode, including the predetermined picture [e.g., predetermined in terms of currently considered, e.g., a picture or access unit, which does not include a content selection SEI message] of the video data stream into the predetermined portion [e.g., by default] [e.g., the predetermined portion is verification substream with substream id equal to 0].

71. Apparatus according to embodiment 70, wherein the plurality of modes consists of the first mode and the second mode [e.g., the indication is a syntax element [e.g., a flag], which differentiates between a first mode and a second mode].

72. Apparatus according to embodiment 67, configured for checking the video data stream on trustworthiness in units of one or more portions [e.g., verification substreams], wherein the one or more portions comprise the predetermined portion, wherein the apparatus is configured for determining the one or more portions in the manner indicated by the indication.

73. Apparatus according to embodiment 72, wherein the plurality of modes comprises a first mode, wherein the apparatus is configured for in the first mode, assigning a predetermined picture to one of the one or more portions [e.g., including the predetermined picture into the assigned portion] in dependence on which layer out of a plurality of layers of the video data stream the predetermined picture belongs to [e.g., in dependence on a value of a layer identifier associated with the predetermined picture (e.g., in dependence on a value of a layer identifier of the layer, the predetermined picture belongs to)].

74. Apparatus according to embodiment 73, wherein the plurality of modes further comprises a second mode, wherein the apparatus is configured for in the second mode, assigning the predetermined picture to a predefined one of the one or more portions [e.g., to the predetermined portion].

75. Apparatus according to embodiment 73, wherein the plurality of modes further comprises a second mode, wherein the apparatus is configured for in the second mode, in absence of a dedicated signalization, which signals to which of the one or more portions the predetermined pictures is to be assigned, in the video data stream, assigning the predetermined picture to a predefined one of the one or more portions [e.g., to the predetermined portion].

76. Apparatus according to any of embodiments 67 to 75, wherein the indication indicating the manner of determining the predetermined portion (13) differentiates between one or more of an indication, which is associated with a time frame [e.g., an access unit], of the video data stream, the indication indicating whether the time frame belongs to the predetermined portion (13), a temporal layer identifier associated with a picture of the video data stream, the temporal layer identifier identifying a subset of time frames of the video data stream to which subset the respective picture belongs, one or more layer identifiers [e.g., layer_id in HEVC/VVC; dependency_id and/or quality_id in AVC] associated with a picture of the video data stream, the layer identifier identifying a layer of the video data stream, to which layer the respective picture belongs [e.g., the video data stream is a layered video data stream, e.g., comprising multiple layers, e.g. a base layer and one or more enhancement layers, representing the video in different resolutions, or representing the video from different perspectives];

a combination of the temporal layer identifier and the layer identifier, a time frame identifier [e.g., the picture order count, POC], a priority level identifier [e.g., AVC priority_id] indicating a priority level of a picture;

the nal_ref_id of AVC.

77. Apparatus according to any of embodiments 67 to 76, configured for deriving the indication indicating the manner of determining the predetermined portion (13) from a syntax structure, e.g. a SEI message.

78. Apparatus according to embodiment 77, wherein the syntax structure further comprises one or more of an indication of the hash function (31), an indication of a number of portions of the video data stream, for which portion a respective digital signature for checking, whether the video data stream is trustworthy, is provided [e.g., in the video data stream or in a reference indicated in the video data stream].

79. Apparatus according to any of embodiments 67 to 78, wherein the apparatus is configured for determining the predetermined portion (13) based on the temporal layer identifier, the layer identifier, or the time frame identifier, and wherein the apparatus is configured for deriving a range of values from the video data stream, the range of values indicating values for the respective identifier, which values are associated to the predetermined portion (13) [so that, e.g., pictures, the respective identifier of which assume a value in the range belong to the predetermined portion].

80. Apparatus (20) for decoding a video data stream (14) having a video encoded thereinto, configured for deriving a syntax structure from the video data stream, which comprises information for checking the video data stream for trustworthiness based on a predetermined portion (13) of the video data stream [e.g., which predetermined portion (13) is to be subjected to a hash function, or is to be used to derive data to be subjected to a hash function for deriving a hash value (33) to serve for checking the trustworthiness of the video data stream], wherein the syntax structure comprises an indication, which indicates a manner of determining the predetermined portion (13) of the video data stream.

81. Apparatus according to embodiment 80, wherein the indication indicating the manner of determining the predetermined portion (13) differentiates between one or more of a temporal layer [e.g., temporal_id] identifier associated with a picture of the video data stream, the temporal layer identifier identifying a subset of time frames of the video data stream to which subset the respective picture belongs;

one or more layer identifiers [e.g., layer_id in HEVC/VVC; dependency_id and/or quality_id in AVC] associated with a picture of the video data stream, the layer identifier identifying a layer of the video data stream, to which layer the respective picture belongs [e.g., the video data stream is a layered video data stream, e.g., comprising multiple layers, e.g. a base layer and one or more enhancement layers, representing the video in different resolutions, or representing the video from different perspectives];

a combination of the temporal layer identifier and the layer identifier, a time frame identifier [e.g., the picture order count, POC], a priority level identifier [e.g., AVC priority_id] indicating a priority level of a picture;

nal_ref_id of AVC.

the nal_ref_id of AVC.

82. Apparatus according to embodiment 81, configured for decoding the indication indicating the manner of determining the predetermined portion (13) from a syntax structure, e.g. a SEI message.

83. Apparatus according to embodiment 82, wherein the syntax structure further comprises one or more of an indication of the hash function (31), an indication of a number of portions of the video data stream, for which portion a respective digital signature for checking, whether the video data stream is trustworthy, is provided [e.g., in the video data stream or in a reference indicated in the video data stream].

84. Apparatus according to embodiment 81, wherein the apparatus is configured for deriving a range of values from the video data stream, the range of values indicating values for the temporal layer identifier, the layer identifier, or the time frame identifier, which values are associated to the predetermined portion (13) [so that, e.g., pictures, the respective identifier of which assume a value in the range belong to the predetermined portion (13)].

85. Apparatus (15) for rendering a video data stream (14) having a video encoded thereinto checkable on trustworthiness, wherein the apparatus is configured for subjecting a predetermined portion (13) of the video data stream, or of data (62) from which the further portion of the video data stream is derived, to a hash function (31) to obtain a hash value (33);

signing the hash value (33) to obtain a digital signature (43) [e.g. by use of a private key of an asymmetric encryption scheme];

wherein the apparatus is configured for determining the predetermined portion (13) based on one or more of a temporal layer [e.g., temporal_id] identifier associated with a picture of the video data stream, the temporal layer identifier identifying a subset of time frames of the video data stream to which subset the respective picture belongs;

one or more layer identifiers [e.g., layer_id in HEVC/VVC; dependency_id and/or quality_id in AVC] associated with a picture of the video data stream, the layer identifier identifying a layer of the video data stream, to which layer the respective picture belongs [e.g., the video data stream is a layered video data stream, e.g., comprising multiple layers, e.g. a base layer and one or more enhancement layers, representing the video in different resolutions, or representing the video from different perspectives];

a combination of the temporal layer identifier and the layer identifier, a time frame identifier [e.g., the picture order count, POC], a priority level identifier [e.g., AVC priority_id] indicating a priority level of a picture;

nal_ref_id of AVC.

86. Apparatus according to embodiment 85, configured for inserting an indication into the video data stream, which indication indicates a manner of determining the predetermined portion (13).

87. Apparatus according to embodiment 86, wherein the indication indicating the manner of determining the predetermined portion (13) differentiates between one or more of the indication, which is associated with a time frame [e.g., an access unit], of the video data stream, the indication indicating whether the time frame belongs to the predetermined portion (13), the temporal layer identifier associated with a picture of the video data stream, the temporal layer identifier identifying a subset of time frames of the video data stream to which subset the respective picture belongs, the one or more layer identifiers [e.g., layer_id in HEVC/VVC; dependency_id and/or quality_id in AVC] associated with a picture of the video data stream, the layer identifier identifying a layer of the video data stream, to which layer the respective picture belongs [e.g., the video data stream is a layered video data stream, e.g., comprising multiple layers, e.g. a base layer and one or more enhancement layers, representing the video in different resolutions, or representing the video from different perspectives];

the combination of the temporal layer identifier and the layer identifier, the time frame identifier [e.g., the picture order count, POC], the priority level identifier [e.g., AVC priority_id] indicating a priority level of a picture;

the nal_ref_id of AVC.

88. Apparatus according to embodiment 86 or 87, configured for inserting the indication indicating the manner of determining the predetermined portion (13) into a syntax structure, e.g. a SEI message.

89. Apparatus according to embodiment 88, further configured for inserting, into the syntax structure, one or more of an indication of the hash function (31), an indication of a number of portions of the video data stream, for which portion a respective digital signature for checking, whether the video data stream is trustworthy, is provided [e.g., in the video data stream or in a reference indicated in the video data stream].

90. Apparatus according to embodiment 86, wherein the apparatus is configured for determining the predetermined portion (13) based on the temporal layer identifier, the layer identifier, or the time frame identifier, and wherein the apparatus is configured for inserting a range of values into the video data stream, the range of values indicating values for the respective identifier, which values are associated to the predetermined portion (13) [so that, e.g., pictures, the respective identifier of which assume a value in the range belong to the predetermined portion (13)].

91. Apparatus (15) for rendering a video data stream (14) having a video encoded thereinto checkable on trustworthiness, wherein the apparatus is configured for
  subjecting a predetermined portion (13) of the video data stream, or of data (62) from which the further portion of the video data stream is derived, to a hash function (31) to obtain a hash value (33);
  signing the hash value (33) to obtain a digital signature (43) [e.g. by use of a private key of an asymmetric encryption scheme];
  inserting an indication into the video data stream, which indication indicates a manner of determining the predetermined portion (13).

92. Apparatus according to embodiment 91, wherein the indication is a syntax element, which differentiates between a plurality of modes of determining the predetermined portion.

93. Apparatus according to embodiment 92, wherein the plurality of modes comprises a first mode, wherein the apparatus is configured for determining the predetermined portion by
  in the first mode, deciding whether to include a predetermined picture [e.g., predetermined in terms of currently considered, e.g., a picture or access unit, which does not include a content selection SEI message] of the video data stream into the predetermined portion [or whether to assign the predetermined picture to the predetermined portion] depending on which layer out of a plurality of layers of the video data stream the predetermined picture belongs to [e.g., in dependence on a value of a layer identifier of the layer, the predetermined picture belongs to].

94. Apparatus according to embodiment 93, wherein the plurality of modes further comprises a second mode, wherein the apparatus is configured for determining the predetermined portion by
  in the second mode, including the predetermined picture [e.g., predetermined in terms of currently considered, e.g., a picture or access unit, which does not include a content selection SEI message] of the video data stream into the predetermined portion [e.g., by default] [e.g., the predetermined portion is verification substream with substream id equal to 0].

95. Apparatus according to embodiment 94, wherein the plurality of modes consists of the first mode and the second mode [e.g., the indication is a syntax element [e.g., a flag], which differentiates between a first mode and a second mode].

96. Apparatus according to embodiment 91, configured for rendering the video data stream checkable on trustworthiness in units of one or more portions [e.g., verification substreams], wherein the one or more portions comprise the predetermined portion, wherein the apparatus is configured for selecting a manner of determining the one or more portions and indicating the selected manner of determining the one or more portions in the data stream by means of the indication.

97. Apparatus according to embodiment 96, wherein the plurality of modes comprises a first mode, wherein the apparatus is configured for
  in the first mode, assigning a predetermined picture to one of the one or more portions [e.g., including the predetermined picture into the assigned portion] in dependence on which layer out of a plurality of layers of the video data stream the predetermined picture belongs to [e.g., in dependence on a value of a layer identifier associated with the predetermined picture (e.g., in dependence on a value of a layer identifier of the layer, the predetermined picture belongs to)].

98. Apparatus according to embodiment 97, wherein the plurality of modes further comprises a second mode, wherein the apparatus is configured for
  in the second mode, assigning the predetermined picture to a predefined one of the one or more portions [e.g., to the predetermined portion].

99. Apparatus according to embodiment 97, wherein the plurality of modes further comprises a second mode, wherein the apparatus is configured for
  in the second mode, assigning the predetermined picture to a predefined one of the one or more portions [e.g., to the predetermined portion], or providing a dedicated signalization, which signals to which of the one or more portions the predetermined pictures is assigned, in the video data stream.

100. Apparatus according to any of embodiments 91 to 99, wherein the indication indicating the manner of determining the predetermined portion (13) differentiates between one or more of
  the indication, which is associated with a time frame [e.g., an access unit], of the video data stream, the indication indicating whether the time frame belongs to the predetermined portion (13),
  the temporal layer identifier associated with a picture of the video data stream, the temporal layer identifier identifying a subset of time frames of the video data stream to which subset the respective picture belongs,
  the one or more layer identifiers [e.g., layer_id in HEVC/VVC; dependency_id and/or quality_id in AVC] associated with a picture of the video data stream, the layer identifier identifying a layer of the video data stream, to which layer the respective picture belongs [e.g., the video data stream is a layered video data stream, e.g., comprising multiple layers, e.g. a base layer and one or more enhancement layers, representing the video in different resolutions, or representing the video from different perspectives];
  the combination of the temporal layer identifier and the layer identifier,
  the time frame identifier [e.g., the picture order count, POC],
  the priority level identifier [e.g., AVC priority_id] indicating a priority level of a picture;
  the nal_ref_id of AVC.

101. Apparatus according to any of embodiments 91 to 100, configured for inserting the indication indicating the manner of determining the predetermined portion (13) into a syntax structure, e.g. a SEI message.

102. Apparatus according to embodiment 101, further configured for inserting, into the syntax structure, one or more of an indication of the hash function (31), an indication of a number of portions of the video data stream, for which portion a respective digital signature for checking, whether the video data stream is trustworthy, is provided [e.g., in the video data stream or in a reference indicated in the video data stream].

103. Apparatus according to any of embodiments 91 to 102, wherein the apparatus is configured for determining the predetermined portion (13) based on the temporal layer identifier, the layer identifier, or the time frame identifier, and wherein the apparatus is configured for inserting a range of values into the video data stream, the range of values indicating values for the respective identifier, which values are associated to the predetermined portion (13) [so that, e.g., pictures, the respective identifier of which assume a value in the range belong to the predetermined portion (13)].

Embodiments of the Fourth Aspect

104. Apparatus (16) for checking a video data stream (14) having a video encoded thereinto on trustworthiness, wherein the apparatus is configured for subjecting a predetermined portion (13) [e.g., an access unit, e.g., video data associated with a time frame] of the video data stream, or data derived therefrom, to a hash function (31) to obtain a hash value (33);

deriving a digital signature (43) associated with the predetermined portion (13) from an external resource [e.g., a server];

checking whether the hash value (33) fits to the digital signature (43) to determine whether the video data stream is trustworthy.

105. Apparatus according to embodiment 104, configured for deriving a reference to the external resource from the video data stream.

106. Apparatus according to embodiment 104 or 105. configured for decrypting the digital signature (43) using a public key of an asymmetric decryption scheme to obtain a check value, and checking whether the hash value (33) fits to the check value.

107. Apparatus according to embodiment 106, configured for deriving a portion identifier [e.g., identifying a temporal portion of the video data stream, e.g., a time frame, e.g., an access unit] [e.g., a hash identifier or hash index, e.g. twcs_associated_hash_idx] from the video data stream, the portion identifier being associated with the predetermined portion (13), and using the portion identifier for identifying a portion of the check value, and in checking whether the hash value (33) fits to the check value, checking whether the hash value (33) fits to the portion of the check value.

108. Apparatus according to embodiment 107, configured for deriving a media component identifier [e.g., twcs_associated_hash_group_id] from the video data stream, the media component identifier indicating a media type of the predetermined portion (13) [e.g., video, audio, subtitles], and using the media component identifier for identifying the portion of the check value.

109. Apparatus (16) for checking a video data stream (14) having a video encoded thereinto on trustworthiness, wherein the apparatus is configured for subjecting a predetermined portion (13) [e.g., an access unit, e.g., video data associated with a time frame] of the video data stream, or data derived therefrom, to a hash function (31) to obtain a hash value (33);

deriving a check value [e.g., a signed check value, e.g., signed with a private key of an asymmetric encryption scheme] associated with the predetermined portion (13) from an external resource [e.g., a server];

checking whether the hash value (33) fits to the check value to determine whether the video data stream is trustworthy.

110. Apparatus according to embodiment 109, configured for deriving a reference to the external resource from the video data stream.

111. Apparatus according to embodiment 109 or 110. configured for deriving a digital signature (43) from the external resource; and verifying the check value [e.g., an origin of the check value or the identity of a provider of the check value] using the digital signature (43) [e.g., using a public key of an asymmetric encryption scheme].

112. Apparatus according to any of embodiments 109 to 111, configured for deriving a portion identifier [e.g., identifying a temporal portion of the video data stream, e.g., a time frame, e.g., an access unit] [e.g., a hash identifier or hash index, e.g. twcs_associated_hash_idx] from the video data stream, the portion identifier being associated with the predetermined portion (13), and using the portion identifier for retrieving the check value from the external resource.

113. Apparatus according to any of embodiments 109 to 112, configured for performing the checking the video data stream on trustworthiness sequentially with respect to a plurality of portions of the video data stream, and further by subjecting a further portion of the video data stream, or data derived therefrom, to the hash function (31) to obtain a further hash value [e.g., the further portion being a previous portion with respect to the predetermined portion (13)];

deriving a further check value [e.g., a signed check value, e.g., signed with a private key of an asymmetric encryption scheme] associated with the further portion from the external resource [e.g., a server];

deriving a digital signature (43) from the external resource; and verifying the check value and the further check value [e.g., an origin of the check value or the identity of a provider of the check value] using the digital signature (43) [e.g., using a public key of an asymmetric encryption scheme].

114. Apparatus (20) for decoding a video data stream (14) having a video encoded thereinto, configured for deriving a syntax structure from the video data stream, which comprises information for checking the video data stream for trustworthiness based on a predetermined portion (13) of the video data stream [e.g., which predetermined portion (13) is to be subjected to a hash function, or is to be used to derive data to be subjected to a hash function for deriving a hash value (33) to serve for checking the trustworthiness of the video data stream], wherein the syntax structure comprises a reference to an external resource [e.g., a metadata structure or a manifest file] for retrieving a digital signature (43) associated with the predetermined portion (13).

115. Apparatus according to embodiment 114, configured for deriving a portion identifier [e.g., identifying a temporal portion of the video data stream, e.g., a time frame, e.g., an access unit] [e.g., a hash identifier or hash index, e.g. twcs_associated_hash_idx] from the video data stream [e.g., from the syntax structure or from a further syntax structure], the portion identifier being associated with the predetermined portion (13), the portion identifier associating the predetermined portion (13) with one or more digital signatures comprised in the external resource.

116. Apparatus according to embodiment 114 or 115, configured for deriving a media component identifier [e.g., twcs_associated_hash_group_id] from the video data stream [e.g., from the syntax structure or from the further syntax structure], the media component identifier indicating a media type of the predetermined portion (13) [e.g., video, audio, subtitles].

117. Apparatus (20) for decoding a video data stream (14) having a video encoded thereinto, configured for deriving a syntax structure from the video data stream, which comprises information for checking the video data stream for trustworthiness based on a predetermined portion (13) of the video data stream [e.g., which predetermined portion (13) is to be subjected to a hash function, or is to be used to derive data to be subjected to a hash function for deriving a hash value (33) to serve for checking the trustworthiness of the video data stream], wherein the syntax structure comprises a reference to an external resource [e.g., a metadata structure or a manifest file] for retrieving a check value [e.g., a check value signed with a digital signature] associated with the predetermined portion (13).

118. Apparatus according to embodiment 117, configured for deriving a portion identifier [e.g., identifying a temporal portion of the video data stream, e.g., a time frame, e.g., an access unit] [e.g., a hash identifier or hash index, e.g. twcs_associated_hash_idx] from the video data stream [e.g., from the syntax structure or from a further syntax structure], the portion identifier being associated with the predetermined portion (13), the portion identifier associating the predetermined portion (13) with one or more check values comprised in the external resource.

119, Apparatus according to embodiment 117 or 118, configured for deriving a media component identifier [e.g., twcs_associated_hash_group_id] from the video data stream [e.g., from the syntax structure or from the further syntax structure], the media component identifier indicating a media type of the predetermined portion (13) [e.g., video, audio, subtitles].

120. Apparatus (15) for rendering a video data stream (14) having a video encoded thereinto checkable on trustworthiness, wherein the apparatus is configured for subjecting a predetermined portion (13) (13) of the video data stream, or of data (62) from which the predetermined portion (13) of the video data stream is derived, to a hash function (31) to obtain a hash value (33);

signing the hash value (33) to obtain a digital signature (43) [e.g. by use of a private key of an asymmetric encryption scheme], and providing the digital signature (43) in an external resource;

inserting an indication of the external resource [e.g., a reference to the digital signature on the external resource] [e.g., a URI of the external resource or the digital signature] into the video data stream.

121. Apparatus according to embodiment 120. configured for signing the hash value (33) using a private key of an asymmetric decryption scheme to obtain the digital signature (43).

122. Apparatus according to embodiment 120 or 121, configured for inserting a portion identifier [e.g., identifying a temporal portion of the video data stream, e.g., a time frame, e.g., an access unit] [e.g., a hash identifier or hash index, e.g. twcs_associated_hash_idx] into the video data stream, the portion identifier being associated with the predetermined portion (13); and providing, in the external resource, an association between the portion identifier and the digital signature (43).

123. Apparatus according to any of embodiments 120 to 122, configured for inserting a media component identifier [e.g., twcs_associated_hash_group_id] into the video data stream, the media component identifier indicating a media type of the predetermined portion (13) [e.g., video, audio, subtitles], and providing, in the external resource, an association between the media component identifier and the digital signature (43).

124 . . . . Apparatus (15) for rendering a video data stream (14) having a video encoded thereinto checkable on trustworthiness, wherein the apparatus is configured for subjecting a predetermined portion (13) of the video data stream, or of data (62) from which the further portion of the video data stream is derived, to a hash function (31) to obtain a hash value (33);

signing the hash value (33) to obtain a digital signature (43) [e.g. by use of a private key of an asymmetric encryption scheme], and providing the hash value (33) and the digital signature (43) in an external resource;

inserting an indication of the external resource [e.g., a reference to the digital signature on the external resource] [e.g., a URI of the external resource or the digital signature] into the video data stream.

125. Apparatus according to embodiment 124, configured for inserting a portion identifier [e.g., identifying a temporal portion of the video data stream, e.g., a time frame, e.g., an access unit] [e.g., a hash identifier or hash index, e.g. twcs_associated_hash_idx] into the video data stream, the portion identifier being associated with the predetermined portion (13); and providing, in the external resource, an association between the portion identifier and the digital signature (43).

126. Apparatus according to embodiment 124 or 125, configured for performing the rendering the video data stream checkable on trustworthiness sequentially with respect to a plurality of portions of the video data stream, and further by subjecting a further portion of the video data stream, or of data (62) from which the further portion of the video data stream is derived, to the hash function (31) to obtain a further hash value [e.g., the further portion being a previous portion with respect to the predetermined portion (13)];

jointly signing the hash value (33) and the further hash value to obtain the digital signature (43) [e.g. by use of a private key of an asymmetric encryption scheme], and providing the hash value (33), the further hash value and the digital signature in an external resource;

inserting an indication of the external resource [e.g., a reference to the digital signature on the external resource] [e.g., a URI of the external resource or the digital signature] into the video data stream.

Embodiments Relating to All of the Aspects

127. Apparatus according to any of the preceding embodiments, wherein the hash value (33) depends on every bit of the predetermined portion (13) of the video data stream.

128. Apparatus according to any of the preceding embodiments, wherein the hash value (33) depends on every bit of the predetermined portion (13) of the video data stream in an encoded domain [e.g., in a domain, in which at least a portion of the video data stream is entropy encoded].

129. Apparatus according to any of the preceding embodiments, wherein the predetermined portion (13) of the video data stream extends over more than one access unit [or time frame] of the video data stream so that the hash value (33) depends on bits of the more than one access unit, or wherein the predetermined portion (13) comprises video data of only one access unit [or time frame].

130. Apparatus according to any of the preceding embodiments, wherein the apparatus is a decoder for decoding the video data stream [e.g., a decoder compliant to H.264/AVC or H.265/HEVC or H.266/VVC] [e.g., the decoder is configured for decoding the video from the video data stream by block based predictive decoding and transform based residual decoding].

131. Apparatus according to embodiment 130, wherein the apparatus is configured for decoding the video from the video data stream by block based predictive and transform based residual decoding by decoding the prediction residual data of the residual block from the video data stream by use of context adaptive variable length decoding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients, or by use of context-adaptive binary arithmetic decoding by decoding a significance map which indicates positions of non-zero transform coefficients in a transform block representing the residual block by, in a forward scan traversing transform coefficients of the transform block, decoding a significance flag which indicates whether a non-zero transform coefficient is positioned at a current position, and, if so, and if the current position is not the last in the forward scan, decoding a last-significance flag which indicates whether the non-zero transform coefficient positioned at the current position is the last non-zero transform coefficient in the forward scan order, and decoding the non-zero transform coefficients' values sequentially in a reverse scan order, reversing the forward scan order.

132. Apparatus according to any of embodiments 20 to 33, 52 to 60, 85 to 90, 120 to 123, 91 to 103, and 124 to 126, wherein the apparatus is an encoder for encoding the video data stream [e.g., an encoder to encode the video data stream to be compliant to H.264/AVC or H.265/HEVC or H.266/VVC].

133. Apparatus according to any of embodiments 20 to 33, 52 to 60, 85 to 90, 120 to 123, 91 to 103, and 124 to 126, wherein the apparatus is an encoder configured for encoding the video into the video data stream by block based predictive coding and transform based residual coding by encoding the prediction residual data of the residual block into the video data stream by use of context adaptive variable length coding by using a first syntax element indicating a total number of non-zero transform coefficients in a transform block representing the residual block, and a trailing-one number, indicating a number of non-zero transform coefficients having an absolute value of one when traversing the coefficients along a scan order, one or more second syntax elements indicating a sign of the non-zero transform coefficients having an absolute value of one when traversing the coefficients along the scan order, one or more third syntax elements indicating a value of the non-zero transform coefficients except for the number of non-zero transform coefficients having an absolute value of one when traversing the coefficients along the scan order, a fourth syntax element indicating a total number of zero-valued transform coefficient levels in the transform block from a firstly-encountered non-zero transform coefficient in the scan order onwards, and one or more fifth syntax elements indicting positions of the non-zero transform coefficients along the scan order by indicating a number of consecutive zero-valued transform coefficients in the scan order between in the scan order consecutively encountered non-zero transform coefficients, or by use of context-adaptive binary arithmetic coding by encoding a significance map which indicates positions of non-zero transform coefficients in a transform block representing the residual block by, in a forward scan traversing transform coefficients of the transform block, encoding a significance flag which indicates whether a non-zero transform coefficient is positioned at a current position, and, if so, and if the current position is not the last in the forward scan, encoding a last-significance flag which indicates whether the non-zero transform coefficient positioned at the current position is the last non-zero transform coefficient in the forward scan order, and encoding the non-zero transform coefficients' values sequentially in a reverse scan order, reversing the forward scan order.

134. Method (16) for checking a video data stream (14), having a video encoded thereinto, on trustworthiness, wherein the method comprises:

subjecting (31) a predetermined portion (13) of the video data stream, or data (62) derived therefrom, to a hash function (31) to obtain a hash value (33);

obtaining (51) a unique identifier (45) [e.g., from the video data stream or from a reference, e.g., using a URI], which uniquely identifies a media asset to which the predetermined portion (13) belongs;

obtaining (51) a digital signature (43) based on the video data stream [e.g., from the video data stream, e.g., twcv_signature, or from a metadata file or manifest file, e.g., a C2PA file]; and checking (41) whether a combination of the hash value (33) and the unique identifier (45) [e.g., a combination of multiple pieces of information comprising the hash value and the unique identifier (45)] fits to the digital signature (43) to determine whether the video data stream is trustworthy.

135. Method (20) for decoding a video data stream, having a video encoded thereinto, wherein the method comprises:

decoding (21) a syntax structure from the video data stream, which comprises information for checking the video data stream for trustworthiness based on a predetermined portion (13) of the video data stream, which predetermined portion is to be subjected to a hash function (31), or is to be used to derive data to be subjected to a hash function (31), for deriving a hash value (33) to serve for checking the trustworthiness of the video data stream, decoding (21) a unique identifier (45), or a reference which points to a unique identifier (45), from the video data stream, the unique identifier (45) uniquely identifying a media asset to which the predetermined portion (13) belongs;

decoding (21) an indication of a digital signature (43) from the video data stream [e.g., from the video data stream, e.g., twcv_signature, or from a metadata file or manifest file, e.g., a C2PA file], the digital signature (43) being based on a combination of the hash value (33) and the unique identifier (45) [e.g., a combination of multiple pieces of information comprising the hash value and the unique identifier (45)].

136. Method (15) for rendering a video data stream (14) having a video encoded thereinto checkable on trustworthiness, wherein the method comprises:

subjecting (31) a predetermined portion (13) of the video data stream (14), or of data (62) from which the video data stream (14) is derived, to a hash function (31) to obtain a hash value (33);

assigning a unique identifier (45) to the predetermined portion (13), which uniquely identifies a media asset to which the predetermined portion (13) belongs;

signing (71) a combination of the hash value (33) and the unique identifier (45) [e.g., a combination of multiple pieces of information comprising the hash value (33) and the unique identifier (45)] to obtain a digital signature (43).

137. Method (16) for checking a video data stream (14) having a video encoded thereinto on trustworthiness, wherein the method comprises:

subjecting (31) a predetermined portion (13) of the video data stream, or data (62) derived therefrom, to a hash function (31) to obtain a hash value (33);

checking (41) whether the hash value (33) fits to a digital signature (43) [e.g., derived from the video data stream of derived from a reference indicated in the video data stream] to determine whether the video data stream is trustworthy, by decrypting (46) the digital signature (43) using a public key (57) of an asymmetric decryption scheme to obtain a check value (47), and checking (49) whether the hash value (33) matches the check value (47);

wherein the method comprises checking whether the video data stream comprises an indication (55) of an external resource (280) [e.g., a metadata structure, e.g., a manifest file, at an external resource] comprising a track (231) of editors [e.g., a track or record of editions or amendments performed from generation to the current version of the video data stream and/or the corresponding editor's identities] of the video data stream, and if the video data stream comprises an indication of an external resource comprising a track of editors of the video data stream, querying [or looking up] the track of editors for a certificate (233) of a content provider being the last editor of the video data stream and deriving the public key based on the certificate of the content provider.

138. Method (17) for transcoding a video data stream having a video encoded thereinto, wherein the method comprises receiving an input video data stream (14') and checking (15') the input video data stream (14') on trustworthiness;

transcoding (12) the input video data stream (14') to derive an output data stream (14);

subjecting (31) a predetermined portion (13) of the output video data stream (14), or data (62) from which the output data stream is derived, to a hash function (31) to obtain a hash value (33);

signing (71) the hash value using a private key (58) of an asymmetric encryption scheme to obtain a digital signature (43);

providing, in a track of editors (231) [e.g., a track or record of editions or amendments performed from generation to the current version of the video data stream and/or the corresponding editor's identities] of the output video data stream, the track of editors being provided on an external resource (280) [e.g., a metadata structure, e.g., a manifest file, at an external resource], a certificate (233) of a content provider [e.g., identifying the apparatus], the certificate comprising, or pointing to, a public key (57) for the asymmetric encryption scheme;

providing the digital signature (43) in the output video data stream (14) [e.g., in an SEI message] or to the external resource (280) [e.g., inserting the digital signature in the metadata structure or a further metadata structure and provide same on the external resource] or a further external resource.

139. Method (15) for rendering a video data stream (14) having a video encoded thereinto checkable on trustworthiness, wherein the method comprises:

subjecting a predetermined portion (13) of the video data stream (14), or of data (62) from which the video data stream (14) is derived, to a hash function (31) to obtain a hash value (33);

signing the hash value (33) using a private key (58) of an asymmetric encryption scheme to obtain a digital signature (43);

providing, in a track of editors (231) [e.g., a track or record of editions or amendments performed from generation to the current version of the video data stream and/or the corresponding editor's identities] of the video data stream, the track of editors being provided on an external resource (280) [e.g., a metadata structure, e.g., a manifest file, at an external resource], a certificate (233) of a content provider [e.g., identifying the apparatus], the certificate comprising, or pointing to, a public key for the asymmetric encryption scheme;

providing the digital signature (43) in the video data stream [e.g., in an SEI message] or to the external resource (280) [e.g., inserting the digital signature in the metadata structure or a further metadata structure and provide same on the external resource] or a further external resource.

140. Method for checking a video data stream (14) having a video encoded thereinto on trustworthiness, wherein the method comprises subjecting a predetermined portion (13) of the video data stream, or data derived therefrom, to a hash function (31) to obtain a hash value (33);

checking whether the hash value (33) fits to a digital signature (43) [e.g., derived from the video data stream of derived from a reference indicated in the video data stream] to determine whether the video data stream is trustworthy;

wherein the method comprises determining the predetermined portion (13) based on one or more of a temporal layer [e.g., temporal_id] identifier associated with a picture of the video data stream, the temporal layer identifier identifying a subset of time frames of the video data stream to which subset the respective picture belongs;

one or more layer identifiers [e.g., layer_id in HEVC/VVC; dependency_id and/or quality_id in AVC] associated with a picture of the video data stream, the layer identifier identifying a layer of the video data stream, to which layer the respective picture belongs [e.g., the video data stream is a layered video data stream, e.g., comprising multiple layers, e.g. a base layer and one or more enhancement layers, representing the video in different resolutions, or representing the video from different perspectives];

a combination of the temporal layer identifier and the layer identifier, a time frame identifier [e.g., the picture order count, POC], a priority level identifier [e.g., AVC priority_id] indicating a priority level of a picture;

nal_ref_id of AVC.

141. Method (16) for checking a video data stream (14) having a video encoded thereinto on trustworthiness, wherein the method comprises subjecting a predetermined portion (13) of the video data stream, or data derived therefrom, to a hash function (31) to obtain a hash value (33);

checking whether the hash value (33) fits to a digital signature (43) [e.g., derived from the video data stream of derived from a reference indicated in the video data stream] to determine whether the video data stream is trustworthy;

deriving an indication from the video data stream, which indication indicates a manner of determining the predetermined portion (13).

142. Method (20) for decoding a video data stream (14) having a video encoded thereinto, wherein the method comprises deriving a syntax structure from the video data stream, which comprises information for checking the video data stream for trustworthiness based on a predetermined portion (13) of the video data stream [e.g., which predetermined portion (13) is to be subjected to a hash function, or is to be used to derive data to be subjected to a hash function for deriving a hash value (33) to serve for checking the trustworthiness of the video data stream], wherein the syntax structure comprises an indication, which indicates a manner of determining the predetermined portion (13) of the video data stream.

143. Method (15) for rendering a video data stream (14) having a video encoded thereinto checkable on trustworthiness, wherein the method comprises subjecting a predetermined portion (13) of the video data stream, or of data (62) from which the further portion of the video data stream is derived, to a hash function (31) to obtain a hash value (33);

signing the hash value (33) to obtain a digital signature (43) [e.g. by use of a private key of an asymmetric encryption scheme];

wherein the method comprises determining the predetermined portion (13) based on one or more of a temporal layer [e.g., temporal_id] identifier associated with a picture of the video data stream, the temporal layer identifier identifying a subset of time frames of the video data stream to which subset the respective picture belongs;

one or more layer identifiers [e.g., layer_id in HEVC/VVC; dependency_id and/or quality_id in AVC] associated with a picture of the video data stream, the layer identifier identifying a layer of the video data stream, to which layer the respective picture belongs [e.g., the video data stream is a layered video data stream, e.g., comprising multiple layers, e.g. a base layer and one or more enhancement layers, representing the video in different resolutions, or representing the video from different perspectives];

a combination of the temporal layer identifier and the layer identifier, a time frame identifier [e.g., the picture order count, POC], a priority level identifier [e.g., AVC priority_id] indicating a priority level of a picture;

nal_ref_id of AVC.

144. Method (15) for rendering a video data stream (14) having a video encoded thereinto checkable on trustworthiness, wherein the method comprises subjecting a predetermined portion (13) of the video data stream, or of data (62) from which the further portion of the video data stream is derived, to a hash function (31) to obtain a hash value (33);

signing the hash value (33) to obtain a digital signature (43) [e.g. by use of a private key of an asymmetric encryption scheme];

inserting an indication into the video data stream, which indication indicates a manner of determining the predetermined portion (13).

145. Method (16) for checking a video data stream (14) having a video encoded thereinto on trustworthiness, wherein the method comprises subjecting a predetermined portion (13) [e.g., an access unit, e.g., video data associated with a time frame] of the video data stream, or data derived therefrom, to a hash function (31) to obtain a hash value (33);

deriving a digital signature (43) associated with the predetermined portion (13) from an external resource [e.g., a server];

checking whether the hash value (33) fits to the digital signature (43) to determine whether the video data stream is trustworthy.

146. Method (16) for checking a video data stream (14) having a video encoded thereinto on trustworthiness, wherein the method comprises subjecting a predetermined portion (13) [e.g., an access unit, e.g., video data associated with a time frame] of the video data stream, or data derived therefrom, to a hash function (31) to obtain a hash value (33);

deriving a check value [e.g., a signed check value, e.g., signed with a private key of an asymmetric encryption scheme] associated with the predetermined portion (13) from an external resource [e.g., a server];

checking whether the hash value (33) fits to the check value to determine whether the video data stream is trustworthy.

147. Method (20) for decoding a video data stream (14) having a video encoded thereinto, the method comprising deriving a syntax structure from the video data stream, which comprises information for checking the video data stream for trustworthiness based on a predetermined portion (13) of the video data stream [e.g., which predetermined portion (13) is to be subjected to a hash function, or is to be used to derive data to be subjected to a hash function for deriving a hash value (33) to serve for checking the trustworthiness of the video data stream], wherein the syntax structure comprises a reference to an external resource [e.g., a metadata structure or a manifest file] for retrieving a digital signature (43) associated with the predetermined portion (13).

148. Method (20) for decoding a video data stream (14) having a video encoded thereinto, the method comprising deriving a syntax structure from the video data stream, which comprises information for checking the video data stream for trustworthiness based on a predetermined portion (13) of the video data stream [e.g., which predetermined portion (13) is to be subjected to a hash function, or is to be used to derive data to be subjected to a hash function for deriving a hash value (33) to serve for checking the trustworthiness of the video data stream], wherein the syntax structure comprises a reference to an external resource [e.g., a metadata structure or a manifest file] for retrieving a check value [e.g., a check value signed with a digital signature] associated with the predetermined portion (13).

149. Method (15) for rendering a video data stream (14) having a video encoded thereinto checkable on trustworthiness, wherein the method comprises subjecting a predetermined portion (13) (13) of the video data stream, or of data (62) from which the predetermined portion (13) of the video data stream is derived, to a hash function (31) to obtain a hash value (33);

signing the hash value (33) to obtain a digital signature (43) [e.g. by use of a private key of an asymmetric encryption scheme], and providing the digital signature (43) in an external resource;

inserting an indication of the external resource [e.g., a reference to the digital signature on the external resource] [e.g., a URI of the external resource or the digital signature] into the video data stream.

150. Method (15) for rendering a video data stream (14) having a video encoded thereinto checkable on trustworthiness, wherein the method comprises subjecting a predetermined portion (13) of the video data stream, or of data (62) from which the further portion of the video data stream is derived, to a hash function (31) to obtain a hash value (33);

signing the hash value (33) to obtain a digital signature (43) [e.g. by use of a private key of an asymmetric encryption scheme], and providing the hash value (33) and the digital signature (43) in an external resource;

inserting an indication of the external resource [e.g., a reference to the digital signature on the external resource] [e.g., a URI of the external resource or the digital signature] into the video data stream.

151. Method for storing a video, the method comprising:

storing a data stream on a digital storage medium, the data stream being generated by the method according to any of embodiments 136, 139, 143, 144, 149 or 150.

152. Method for transmitting a data stream generated by a method according to any of embodiments 136, 139, 143, 144, 149 or 150.

153. Computer program [or computer program product, e.g., computer program stored on a non-transitory digital storage medium] for implementing the method of any of embodiments 134 to 152 when being executed on a computer or signal processor.

154. Video data stream [e.g., non-transitory digital storage medium comprising the video data stream] generated by the method of any of embodiments 136, 139, 143, 149 or 144, 150.

IMPLEMENTATION ALTERNATIVES

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus. In particular, block diagrams illustrating an apparatus may also be regarded as illustration of a respective method comprising the steps described by the blocks of the block diagram.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet. In other words, further embodiments provide a video bitstream product including the video bitstream according to any of the herein described embodiments, e.g. a digital storage medium having stored thereon the video bitstream.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for checking a video data stream having a video encoded thereinto on trustworthiness, wherein the apparatus comprises one or more processors configured for subjecting a predetermined portion of the video data stream, or data derived therefrom, to a hash function to obtain a hash value, wherein the predetermined portion comprises video data of one or more time frames of the video;

deriving a digital signature from the data stream; and checking whether the hash value fits to the digital signature to determine whether the video data stream is trustworthy, by decrypting the digital signature using a public key of an asymmetric decryption scheme to obtain a check value, and checking whether the hash value matches the check value;

wherein the one or more processors are further configured for checking whether a supplemental enhancement information, SEI, message of the video data stream comprises an indication of a metadata structure comprising a track of editors of the video data stream, and a further digital signature, wherein the further digital signature is for checking whether a predetermined portion of a payload of the SEI message fits to the further digital signature, wherein the predetermined portion of the payload of the SEI message comprises a unique identifier, and if the SEI message comprises an indication of a metadata structure comprising a track of editors of the video data stream, querying the track of editors for a certificate of a content provider being the last editor of the video data stream and deriving the public key based on the certificate of the content provider.

2. The apparatus according to claim 1, wherein the one or more processors are configured for, in checking whether the SEI message comprises an indication of metadata structure comprising a track of editors of the video data stream, deriving a syntax element from the video data stream, which indicates, whether (1) the SEI message comprises a uniform resource identifier, URI, directly pointing to the certificate of the content provider or a URI pointing to a register of certificates of content providers and an index into the register pointing to the content provider of the video data stream, or (2) the SEI message comprises the indication of the metadata structure comprising the track of editors.

3. The apparatus according to claim 1, wherein the checking whether the predetermined portion of the payload of the SEI message fits to the further digital signature comprises subjecting the predetermined portion of the payload of the SEI message to a further hash function to obtain a further hash value; and checking, whether the further hash value fits to the further digital signature.

4. The apparatus according to claim 1, wherein the predetermined portion of the payload of the SEI message excludes the indication of the metadata structure comprising the track of editors.

5. The apparatus according to claim 1, wherein the SEI message further comprises a media component identifier, and wherein the apparatus is configured for using the media component identifier for selecting the further digital signature out of a set of one or more digital signatures comprised in the metadata structure.

6. The apparatus according to claim 1, wherein the SEI message further comprises one or more of an indication of the hash function, an indication of a number of portions of the video data stream, for which a digital signature for verifying the trustworthiness of the video data stream is available.

7. The apparatus according to claim 1, wherein the hash value depends on every bit of the predetermined portion of the video data stream.

8. The apparatus according to claim 1, wherein the hash value depends on every bit of the predetermined portion of the video data stream in an encoded domain.

9. The apparatus according to claim 1, wherein the predetermined portion of the video data stream extends over more than one access unit of the video data stream so that the hash value depends on bits of the more than one access unit, or wherein the predetermined portion comprises video data of only one access unit.

10. A method for checking a video data stream having a video encoded thereinto on trustworthiness, wherein the method comprises:

subjecting a predetermined portion of the video data stream, or data derived therefrom, to a hash function to obtain a hash value, wherein the predetermined portion comprises video data of one or more time frames of the video;

deriving a digital signature from the data stream; and checking whether the hash value fits to the digital signature to determine whether the video data stream is trustworthy, by decrypting the digital signature using a public key of an asymmetric decryption scheme to obtain a check value, and checking whether the hash value matches the check value;

wherein the method further comprises checking whether a supplemental enhancement information, SEI, message of the video data stream comprises an indication of a metadata structure comprising a track of editors of the video data stream, and a further digital signature, wherein the further digital signature is for checking whether a predetermined portion of a payload of the SEI message fits to the further digital signature, wherein the predetermined portion of the payload of the SEI message comprises a unique identifier, and if the SEI message comprises an indication of a metadata structure comprising a track of editors of the video data stream, querying the track of editors for a certificate of a content provider being the last editor of the video data stream and deriving the public key based on the certificate of the content provider.

* * * * *